(12) United States Patent
Conrad

(10) Patent No.: US 11,154,169 B2
(45) Date of Patent: *Oct. 26, 2021

(54) CYCLONIC AIR TREATMENT MEMBER AND SURFACE CLEANING APPARATUS INCLUDING THE SAME

(71) Applicant: OMACHRON INTELLECTUAL PROPERTY INC., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,945

(22) Filed: Jun. 15, 2020

(65) Prior Publication Data

US 2020/0305668 A1    Oct. 1, 2020

Related U.S. Application Data

(63) Continuation-in-part of application No. 16/529,430, filed on Aug. 1, 2019, now Pat. No. 11,006,799, (Continued)

(51) Int. Cl.
*B01D 45/00* (2006.01)
*A47L 9/16* (2006.01)
(Continued)

(52) U.S. Cl.
CPC .............. *A47L 9/1608* (2013.01); *A47L 5/24* (2013.01); *A47L 9/165* (2013.01); *A47L 9/1641* (2013.01); *A47L 9/1658* (2013.01); *A47L 9/1683* (2013.01); *B01D 45/16* (2013.01); *B04C 5/185* (2013.01); *B04C 5/26* (2013.01); *B04C 9/00* (2013.01); *B04C 2009/008* (2013.01)

(58) Field of Classification Search
CPC .......... A47L 9/1608; A47L 9/165; A47L 5/24; A47L 9/1658; A47L 9/1683; A47L 9/1641; A47L 9/2884; A47L 9/1666; A47L 9/12; A47L 9/106; A47L 5/28; B04C 5/185; B04C 9/00; B04C 5/26; B04C 2009/008; B04C 3/06
See application file for complete search history.

(56) References Cited

U.S. PATENT DOCUMENTS 2,119,478 A  *  5/1938  Whiton, Jr. ............. B04C 11/00
                                                        96/397
2,461,677 A  *  2/1949  Burdock ................... B04C 5/28
                                                         55/348
(Continued)

*Primary Examiner* — Dung H Bui
(74) *Attorney, Agent, or Firm* — Philip C. Mendes da Costa; Bereskin & Parr LLP/ S.E.N.C.R.L., s.r.l.

(57) ABSTRACT

A surface cleaning apparatus comprising a first cyclonic cleaning stage having a first cyclone chamber and a first dirt collection chamber external to the first cyclone chamber. The first cyclone chamber has a cyclone first end, an opposed cyclone second end, a cyclone sidewall extending between the cyclone first end and the cyclone second end, a cyclone air inlet, a cyclone air outlet, a cyclone dirt outlet in communication with the first dirt collection chamber and a cyclone longitudinal axis extending from the cyclone first end to the cyclone second end. The dirt outlet comprises a plurality of apertures.

20 Claims, 57 Drawing Sheets

Related U.S. Application Data which is a continuation-in-part of application No. 16/101,770, filed on Aug. 13, 2018, now Pat. No. 11,013,384, application No. 16/901,945, which is a continuation-in-part of application No. 16/201,649, filed on Nov. 27, 2018, now Pat. No. 10,882,059.

(60) Provisional application No. 62/734,603, filed on Sep. 21, 2018.

(51) Int. Cl.
*A47L 5/24* (2006.01)
*B04C 5/185* (2006.01)
*B04C 9/00* (2006.01)
*B04C 5/26* (2006.01)
*B01D 45/16* (2006.01)

(56) References Cited

U.S. PATENT DOCUMENTS

| | | | | |
|---|---|---|---|---|
| 2,643,737 | A * | 6/1953 | Bowers | B04C 5/28 55/349 |
| 2,734,630 | A * | 2/1956 | Van Der Wal | B04C 5/081 209/728 |
| 2,867,290 | A * | 1/1959 | McGrane | B04C 5/28 55/344 |
| 6,334,234 | B1 * | 1/2002 | Conrad | A47L 5/30 15/347 |
| 6,406,505 | B1 * | 6/2002 | Oh | A47L 9/1666 55/337 |
| 7,811,349 | B2 * | 10/2010 | Nguyen | A47L 9/1658 55/426 |
| 8,282,697 | B2 * | 10/2012 | Oh | A47L 9/1641 55/345 |
| 2002/0011053 | A1 * | 1/2002 | Oh | B01D 50/002 55/426 |
| 2002/0134238 | A1 * | 9/2002 | Conrad | B03C 3/017 95/79 |
| 2003/0106182 | A1 * | 6/2003 | Lee | A47L 9/165 15/353 |
| 2003/0150324 | A1 * | 8/2003 | West | B01D 17/0211 95/268 |
| 2004/0103495 | A1 * | 6/2004 | Oh | B04C 5/187 15/352 |
| 2005/0252179 | A1 * | 11/2005 | Oh | A47L 9/1683 55/337 |
| 2006/0042039 | A1 * | 3/2006 | McDowell | A47L 5/362 15/353 |
| 2006/0162298 | A1 * | 7/2006 | Oh | A47L 7/0004 55/337 |
| 2006/0230719 | A1 * | 10/2006 | Han | A47L 9/1625 55/345 |
| 2007/0079585 | A1 * | 4/2007 | Oh | B04C 5/13 55/345 |
| 2007/0209334 | A1 * | 9/2007 | Conrad | A47L 9/1608 55/337 |
| 2007/0289267 | A1 * | 12/2007 | Makarov | A47L 9/1641 55/345 |
| 2008/0190080 | A1 * | 8/2008 | Oh | A47L 9/1683 55/343 |
| 2009/0113861 | A1 * | 5/2009 | Seo | A47L 9/1633 55/429 |
| 2009/0181841 | A1 * | 7/2009 | Conrad | B04C 5/28 494/32 |
| 2010/0139033 | A1 * | 6/2010 | Makarov | A47L 9/1641 15/353 |
| 2010/0213118 | A1 * | 8/2010 | Tandon | B04C 5/185 210/512.2 |
| 2010/0275561 | A1 * | 11/2010 | Lundquist | B04C 3/00 55/456 |
| 2012/0297740 | A1 * | 11/2012 | Cheng | B01D 46/10 55/326 |
| 2013/0031878 | A1 * | 2/2013 | Menssen | F02M 35/0223 55/345 |
| 2013/0152522 | A1 * | 6/2013 | Stippich | B01J 8/0055 55/398 |
| 2013/0247764 | A1 * | 9/2013 | Kvamsdal | B01D 45/16 96/188 |
| 2013/0255203 | A1 * | 10/2013 | Muenkel | B01D 46/0021 55/337 |
| 2013/0327002 | A1 * | 12/2013 | Ackermann | B04C 3/00 55/327 |
| 2016/0008741 | A1 * | 1/2016 | Beg | B04C 5/081 96/182 |
| 2016/0206169 | A1 * | 7/2016 | Hyun | A47L 9/165 |
| 2018/0043292 | A1 * | 2/2018 | Carroll | B01D 45/16 |
| 2019/0001348 | A1 * | 1/2019 | Ingram | B01D 45/12 |
| 2019/0003388 | A1 * | 1/2019 | Atsuchi | F02C 7/052 |
| 2019/0091703 | A1 * | 3/2019 | Hyun | A47L 9/165 |
| 2019/0099766 | A1 * | 4/2019 | Krishnamurthy | B04C 3/04 |
| 2019/0277227 | A1 * | 9/2019 | Larson | B01D 46/48 |
| 2020/0009487 | A1 * | 1/2020 | Vanaudenhove | F02M 35/10262 |

* cited by examiner

CYCLONIC AIR TREATMENT MEMBER AND SURFACE CLEANING APPARATUS INCLUDING THE SAME

CROSS-REFERENCE TO RELATED APPLICATION

This application is a continuation-in-part of U.S. patent application Ser. No. 16/529,430, filed Aug. 1, 2019, which is a continuation-in-part of U.S. patent application Ser. No. 16/101,770, filed Aug. 13, 2018; and is also a continuation-in-part of U.S. patent application Ser. No. 16/201,649, filed Nov. 27, 2018, which itself claims priority to U.S. Provisional Patent Application No. 62/734,603, filed Sep. 21, 2018, herein incorporated by reference for all purposes.

FIELD

This application relates to the field of cyclonic air treatment members and surface cleaning apparatus including the same.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic hand vacuum cleaners, including battery operated cyclonic hand vacuum cleaners, are known in the art.

Surface cleaning apparatus are known which utilize one or more cyclones. A cyclone has a dirt collection region. The dirt collection region may be internal of the cyclone chamber (e.g., the dirt collection region may be a lower end of the cyclone chamber. Alternately, the dirt collection region may be a separate dirt collection chamber that is external to the cyclone chamber and in communication with the cyclone chamber via a dirt outlet. The dirt out may be a slot formed in the sidewall of a cyclone chamber or a gap provided between the end of the cyclone wall and an end of the cyclone chamber.

SUMMARY

In accordance with one aspect of this disclosure, a cyclone chamber is provided with a dirt collection chamber that is in communication with the cyclone chamber by an axially extending dirt outlet. The dirt outlet may have a length dimension in the axial longitudinal direction of the cyclone chamber that is greater than its width dimension in the circumferential direction of the cyclone chamber. For example, the length of the dirt outlet may be 2, 4, 6, 8 or 10 times or more the width of the dirt outlet (i.e., the width in the direction around the perimeter of the cyclone sidewall in a plane transverse to the cyclone axis), An advantage of this design is that, as the air rotates in the cyclone chamber and dirt is disentrained, the disentrained dirt may be deposited into a dirt collection chamber without the disentrained dirt having to be conveyed along the cyclone sidewall to a dirt outlet at an axial end of the cyclone chamber. Accordingly, the tendency of dirt to be re-entrained in the air rotating in the cyclone chamber may be reduced.

In accordance with this aspect, there is provided a surface cleaning apparatus comprising an air flow path extending from a dirty air inlet to a clean air outlet with a cyclone and a suction motor positioned in the air flow path, the cyclone comprising:

(a) a cyclone chamber having a cyclone sidewall, a longitudinally extending cyclone axis of rotation, a cyclone first end, a cyclone second end spaced apart in a longitudinal axial direction from the cyclone first end, a cyclone air inlet proximate the cyclone first end, a cyclone air outlet located at the cyclone second end and a dirt outlet, wherein the dirt outlet has a length in the axial direction and a width in a circumferential direction and the length is greater than the width; and, (b) a dirt collection chamber external to the cyclone chamber and in communication with the cyclone chamber via the dirt outlet.

In any embodiment, the length may be at least twice as long as the width.

In any embodiment, the length may be at least four times as long as the width.

In any embodiment, the dirt outlet may extend from a position proximate the cyclone first end towards the cyclone second end.

In any embodiment, the dirt outlet may extend to a position proximate the cyclone second end.

In any embodiment, the cyclone air inlet may be a tangential air inlet terminating at an inlet port provided on the cyclone chamber sidewall.

In any embodiment, the cyclone front end may be openable wherein, when the cyclone front end is moved to an open position, the cyclone chamber and the dirt collection chamber may each be opened.

In any embodiment, the surface cleaning apparatus may further comprise a dirt outlet insert member which is removably receivable in a portion of the dirt outlet adjacent the cyclone first end and the dirt outlet insert member may be opened when the cyclone front end is moved to an open position.

In any embodiment, the surface cleaning apparatus may further comprise a screen member having an outlet end located at the cyclone second end and the screen member may extend to distal screen end located adjacent the cyclone first end.

In any embodiment, the distal end of the screen member may terminate 0.01-0.75 inches from the cyclone first end.

In any embodiment, the distal end of the screen member may terminate 0.05-0.375 inches from the cyclone first end.

In any embodiment, the cyclone air inlet may be a tangential inlet having a conduit portion interior the cyclone chamber and the dirt outlet may extend from a position proximate an axially inner side of the inlet conduit towards the cyclone second end.

In any embodiment, the dirt outlet may extend to a position proximate the cyclone second end.

In any embodiment, the dirt outlet may extend from a position 0.01-0.2 inches axially inwardly from the axially inner side of the inlet conduit towards the cyclone second end.

In any embodiment, the cyclone front end may be openable wherein, when the cyclone front end is moved to an open position, the cyclone chamber and the dirt collection chamber may each be opened.

In any embodiment, the surface cleaning apparatus may further comprise a screen member having an outlet end located at the cyclone second end and the screen member may extend to distal screen end located adjacent the axially inner side of the inlet conduit.

In any embodiment, the surface cleaning apparatus may further comprise a dirt outlet insert member which is removably receivable in a portion of the dirt outlet adjacent the cyclone first end and the dirt outlet insert member may be opened when the cyclone front end is moved to an open position.

In accordance with another aspect of this disclosure, a cyclone chamber is provided with a dirt collection chamber that is in communication with the cyclone chamber by two or more dirt outlet regions. The two dirt outlet regions may be discrete outlets (i.e., each dirt outlet region may be a dirt outlet that is surrounded by, e.g., a portion of the sidewall of the cyclone chamber or a portion of the sidewall of the cyclone chamber and a portion of an end wall of the cyclone chamber) or they may be contiguous (e.g., they may be connected by a gap or slot formed in the cyclone chamber sidewall so as to form a single dirt outlet opening in, e.g., the cyclone chamber sidewall).

An advantage of this design is that dirt which is separated from the air swirling in the cyclone chamber prior to the swirling air reaching an end of the cyclone chamber opposed to the cyclone air inlet end (e.g., after the air has turned, for example, 1 or 2 times in the cyclone chamber) may be removed from the cyclone chamber by a first dirt outlet region and the remainder of the dirt may be separated in a second dirt outlet region that is located closer to or at the end of the cyclone chamber opposed to the cyclone air inlet end.

In accordance with this aspect, there is provided a cyclonic air treatment member comprising:
  (a) a cyclone having a cyclone sidewall, a cyclone first end, an opposed cyclone second end, a cyclone air inlet proximate the cyclone first end, a cyclone air outlet and a cyclone longitudinal axis extending from the cyclone first end to the cyclone second end, wherein a cyclone chamber is located between the cyclone first and second ends and the cyclone chamber has an outer perimeter which comprises the cyclone sidewall, wherein an air flow path extends from the cyclone air inlet to the cyclone air outlet: and,
  (b) a dirt collection chamber external to the cyclone chamber, the dirt collection chamber having first and second dirt outlet regions, each dirt outlet region extending around a portion of the perimeter of the cyclone chamber, wherein the second dirt outlet region is positioned proximate the cyclone second end, and the first dirt outlet region is positioned toward the cyclone first end relative to the second dirt outlet region.

In any embodiment, the first dirt outlet region may be longitudinally spaced apart from and discrete from the second dirt outlet region.

In any embodiment, the second dirt outlet region may be longitudinally spaced apart from and contiguous with the first dirt outlet region.

In any embodiment, the first dirt outlet region may be angularly offset about the outer perimeter of the cyclone chamber as compared to the second dirt outlet region.

In any embodiment, at least one of the first and second dirt outlet regions may comprise a slot extending angularly around a portion of the perimeter of the cyclone chamber.

In any embodiment, at least one of the first and second dirt outlet regions may comprise an array of 4 or more (e.g., 4, 5, 6, 7, 8, 9 or 10) apertures formed in the cyclone sidewall.

In any embodiment, the first dirt outlet region may comprise a slot formed in the cyclone sidewall, and the second dirt outlet region comprises an array of 4 or more (e.g., 4, 5, 6, 7, 8, 9 or 10) apertures formed in the cyclone sidewall and positioned adjacent the first dirt outlet region between the cyclone first end and the first dirt outlet region.

In any embodiment, each of the first and second dirt outlet regions may have a long dimension, and the long dimension of the first dirt outlet region is oriented generally transverse to the long dimension of the second dirt outlet region.

In any embodiment, the air flow path may include a cyclonic path portion that extends cyclonically from the cyclone air inlet toward the cyclone second end, and at least one of the dirt outlet regions may have a long dimension that is aligned with the cyclonic path portion. At least 75% of the first dirt outlet region may extend along a portion of the cyclonic path portion. Alternately, the first dirt outlet region may extend along the cyclonic path from an upstream outlet end of the first dirt outlet region to a downstream outlet end of the first dirt outlet region.

In any embodiment, the downstream outlet end of the first dirt outlet region may be positioned towards the cyclone second end relative to the upstream outlet end of the first dirt outlet region.

In any embodiment, both of the upstream outlet end of the first dirt outlet region and the downstream outlet end of the first dirt outlet region may be located along a portion of the cyclonic path portion.

In any embodiment, the second dirt outlet region may have a long dimension having a radial projection that is aligned perpendicularly to the cyclone axis. Alternately or in addition, the first dirt outlet region may have a long dimension having a radial projection that is aligned parallel to the cyclone axis.

In any embodiment, the second dirt outlet region may be bordered by the cyclone second end.

In any embodiment, the cyclone may further comprise a third dirt outlet region to the dirt collection chamber, the third dirt outlet region is formed in the cyclone sidewall, and is oriented transverse to the first and second dirt outlet regions. The first, second, and third dirt outlet regions may be contiguous. Alternately, one, two or all three may be discrete or one may be discrete and two may be contiguous.

In any embodiment, the cyclone air outlet may be at the cyclone second end. Alternately, the cyclone air outlet may be at the cyclone first end.

In accordance with another aspect, a plurality of discrete dirt outlet regions (slots) are provided. The discrete outlet regions may provide enable enhanced dirt separation by the cyclone without increasing the backpressure in the cyclone chamber.

In accordance with this aspect, there is provided a cyclonic air treatment member comprising:
  (a) a cyclone having a cyclone sidewall, a cyclone first end, an opposed cyclone second end, a cyclone air inlet proximate the cyclone first end, a cyclone air outlet, a dirt outlet and a cyclone longitudinal axis extending from the cyclone first end to the cyclone second end, wherein a cyclone chamber is located between the cyclone first and second ends and the cyclone chamber has an outer perimeter which comprises the cyclone sidewall: and,
  (b) a dirt collection chamber external to the cyclone chamber and in communication with the cyclone chamber via the dirt outlet,
  wherein the dirt outlet comprises a plurality of discrete dirt outlet regions, each of which extends at an angle to the cyclone longitudinal axis.

In any embodiment, the plurality of dirt outlet regions may extend perpendicular ±15, 20, 25 or 30° to the cyclone longitudinal axis.

In any embodiment, the plurality of dirt outlet regions may extend generally perpendicular to the cyclone longitudinal axis.

In any embodiment, the plurality of dirt outlet regions may comprise a plurality of outlet slots that are arranged side by side along at least a portion of an axial length of the cyclone.

In any embodiment, a first dirt outlet region may be positioned proximate the cyclone second end, and a remainder of the plurality of dirt outlet regions may be positioned axially inward of the first dirt outlet region towards the cyclone first end.

In any embodiment, the cyclone air outlet may be located at the cyclone second end.

In any embodiment, the cyclone air outlet may comprise a solid portion at the cyclone second end and an air permeable portion axially inward thereof and the dirt outlet regions may be positioned only in a portion of the cyclone sidewall that is radially outward of the solid conduit.

In any embodiment, the cyclone air outlet may comprise a solid conduit portion at the cyclone second end and an air permeable portion axially inward thereof and the dirt outlet regions may be positioned in a portion of the cyclone sidewall that is radially outward of the solid conduit portion and air permeable portion.

In any embodiment, the dirt outlet may comprise at least three, five, seven or nine dirt outlet regions.

In any embodiment, the dirt outlet regions may be axially spaced apart from each other.

In any embodiment, the cyclone air inlet may be a tangential inlet having a conduit portion interior the cyclone chamber and the plurality of dirt outlet regions may extend from the cyclone second end to a position axially inwards of an axially inner side of the inlet conduit. Optionally, the plurality of dirt outlet regions may extend to a position proximate the axially inner side of the inlet conduit towards the cyclone second end.

In any embodiment, the cyclone air inlet may terminate at an inlet port provided on the cyclone chamber sidewall and the plurality of dirt outlet regions may extend from the cyclone second end towards the cyclone first end. Optionally, the plurality of dirt outlet regions may extend to a position proximate the cyclone first end.

In any embodiment, at least one of the dirt outlet regions may have first and second axially spaced apart sides wherein at least one of the sides is convex or concave.

In any embodiment, at least some of the dirt outlet regions may be axially evenly spaced apart.

In any embodiment, at least some of the dirt outlet regions may be axially spaced apart by varying amounts.

In any embodiment, the dirt outlet regions may have an axial dirt outlet width and the axial dirt outlet width of the dirt outlet regions may decrease from a forward location of the cyclone at which the dirt outlet regions commence to a rear location of the cyclone at which the dirt outlet regions terminate.

In any embodiment, the dirt outlet regions may be spaced apart by an axial distance and the axial distance may decrease from a forward location of the cyclone at which the dirt outlet regions commence to a rear location of the cyclone at which the dirt outlet regions terminate.

In accordance with another aspect of this disclosure, a surface cleaning apparatus is provided with a cyclone chamber having a dirt collection chamber that is in communication with the cyclone chamber by a dirt outlet that includes a plurality of perforations or apertures.

An advantage of this design is that the size of the apertures may reduce backpressure caused by air leaving the cyclone chamber to enter the dirt collection chamber. Another possible advantage is that dirt particles may pass through the apertures into the dirt collection chamber as they are disentrained from the air, while large debris may remain in the cyclone chamber, thereby allowing the cyclone chamber to be used as a collection chamber for large debris, increasing the dirt collection capacity of the surface cleaning apparatus without increasing the size of the surface cleaning apparatus. This is particularly advantageous for a hand held vacuum cleaner.

In accordance with this aspect, there is provided a surface cleaning apparatus comprising an air flow path extending from a dirty air inlet to a clean air outlet with a first cyclonic cleaning stage and a suction motor positioned in the air flow path, the first cyclonic cleaning stage comprising a first cyclone chamber and a first dirt collection chamber external to the first cyclone chamber, the first cyclone chamber having a cyclone first end, an opposed cyclone second end, a cyclone sidewall extending between the cyclone first end and the cyclone second end, a cyclone air inlet, a cyclone air outlet, a cyclone dirt outlet in communication with the first dirt collection chamber and a cyclone longitudinal axis extending from the cyclone first end to the cyclone second end, wherein the dirt outlet comprises a plurality of apertures.

In any embodiment, the plurality of apertures may comprise more than 10 apertures.

In any embodiment, the plurality of apertures may comprise more than 20 apertures.

In any embodiment, the apertures may have a width of 0.10 inches to 0.20 inches.

In any embodiment, the apertures may have a width of 0.010 inches to 0.10 inches.

In any embodiment, the apertures may be provided at a cyclone air outlet end of the first cyclone chamber.

In any embodiment, the cyclone air outlet end may be the cyclone second end and the cyclone air inlet may be provided at the cyclone first end.

In any embodiment, the surface cleaning apparatus may be a hand vacuum cleaner having an upper end and a lower end, the upper end may have the dirty air inlet and, when the hand vacuum cleaner is oriented with the upper end above the lower end, the apertures may be provided in a lower portion of the cyclone sidewall.

In any embodiment, the cyclonic cleaning stage may comprise a stationary portion and an openable portion, the openable portion may be part of the lower end of the hand vacuum cleaner and may comprise a portion of the cyclone sidewall and the openable portion may be moveably mounted by a mount between a closed position in which the first cyclone chamber and the first dirt collection chamber are closed and an open position in which the first cyclone chamber and the first dirt collection chamber are open and the apertures may be provided in the openable portion.

In any embodiment, when the hand vacuum cleaner may be oriented with the upper end above the lower end, the first dirt collection chamber may underlie the first cyclone chamber.

In any embodiment, the first cyclone chamber may have a first lateral side that extends radially outwardly from the cyclone longitudinal axis in a first direction and a second lateral side that extends radially outwardly from the cyclone longitudinal axis in a second direction that is opposed to the first direction and the apertures may be provided only on the first lateral side of the first cyclone chamber.

In any embodiment, the surface cleaning apparatus may further comprise a second cyclonic cleaning stage downstream from the first cyclonic cleaning stage, the second cyclonic cleaning stage may have a dirt collection region wherein, when the hand vacuum cleaner is oriented with the upper end above the lower end, the first dirt collection chamber and the dirt collection region may each underlie the first cyclone chamber.

In any embodiment, the second cyclonic cleaning stage may comprise a second cyclone chamber and a second dirt collection chamber external to the second cyclone chamber and the second dirt collection chamber may comprise the dirt collection region.

In any embodiment, the first cyclone chamber may have a first lateral side that extends radially outwardly from the cyclone longitudinal axis in a first direction and a second lateral side that extends radially outwardly from the cyclone longitudinal axis in a second direction that is opposed to the first direction and the apertures may be provided only on the first lateral side of the first cyclone chamber, the first dirt collection chamber may be located on the first lateral side and the dirt collection region may be located on the second lateral side.

In accordance with another aspect of this disclosure, there is provided a surface cleaning apparatus having a first air treatment stage having a first air treatment chamber and a first dirt collection chamber, and a second air treatment stage having a second dirt collection chamber. The first dirt collection chamber and the second dirt collection chamber each underlie the first air treatment chamber.

An advantage of this design is that by positioning the dirt collection chambers beneath the first air treatment chamber, the first and second dirt collection chambers may be emptyable concurrently, and optionally with emptying the first air treatment chamber. A further advantage is that the size of the surface cleaning apparatus may be reduced since access to the second air treatment stage is not necessary to empty the surface cleaning apparatus.

In accordance with this aspect, there is provided a surface cleaning apparatus comprising:
 a) a front end, a rear end, and first and second laterally opposed sides, each laterally opposed side extends in a forward/rearward direction;
 b) an air flow path extending from a dirty air inlet provided at the front end to a clean air outlet with a suction motor positioned in the air flow path;
 c) a first air treatment stage positioned in the air flow path downstream from the dirty air inlet, the first air treatment stage comprising a first air treatment chamber and a first dirt collection chamber external to the first air treatment chamber; and,
 d) a second air treatment stage positioned in the air flow path downstream from the first air treatment stage, the second air treatment stage comprising a second air treatment chamber and a second dirt collection chamber external to the second air treatment chamber,
 wherein the first dirt collection chamber is provided on the first lateral side and underlies the first air treatment chamber and the second dirt collection chamber is provided on the second lateral side and underlies the first air treatment chamber.

In any embodiment, the first air treatment chamber may have a dirt outlet in communication with the first dirt collection chamber and the dirt outlet may comprise a plurality of apertures.

In any embodiment, the plurality of apertures may comprise more than 10 apertures.

In any embodiment, the plurality of apertures may comprise more than 20 apertures.

In any embodiment, the apertures may have a width of 0.10 inches to 0.20 inches.

In any embodiment, the apertures may have a width of 0.010 inches to 0.10 inches. It will be appreciated that a surface cleaning apparatus may comprise any one or more aspects set out herein and may use any one or more features of one or more of the aspects disclosed herein.

BRIEF DESCRIPTION OF THE DRAWINGS

For a better understanding of the described embodiments and to show more clearly how they may be carried into effect, reference will now be made, by way of example, to the accompanying drawings in which.

DESCRIPTION OF EXAMPLE EMBODIMENTS

Figure 1:
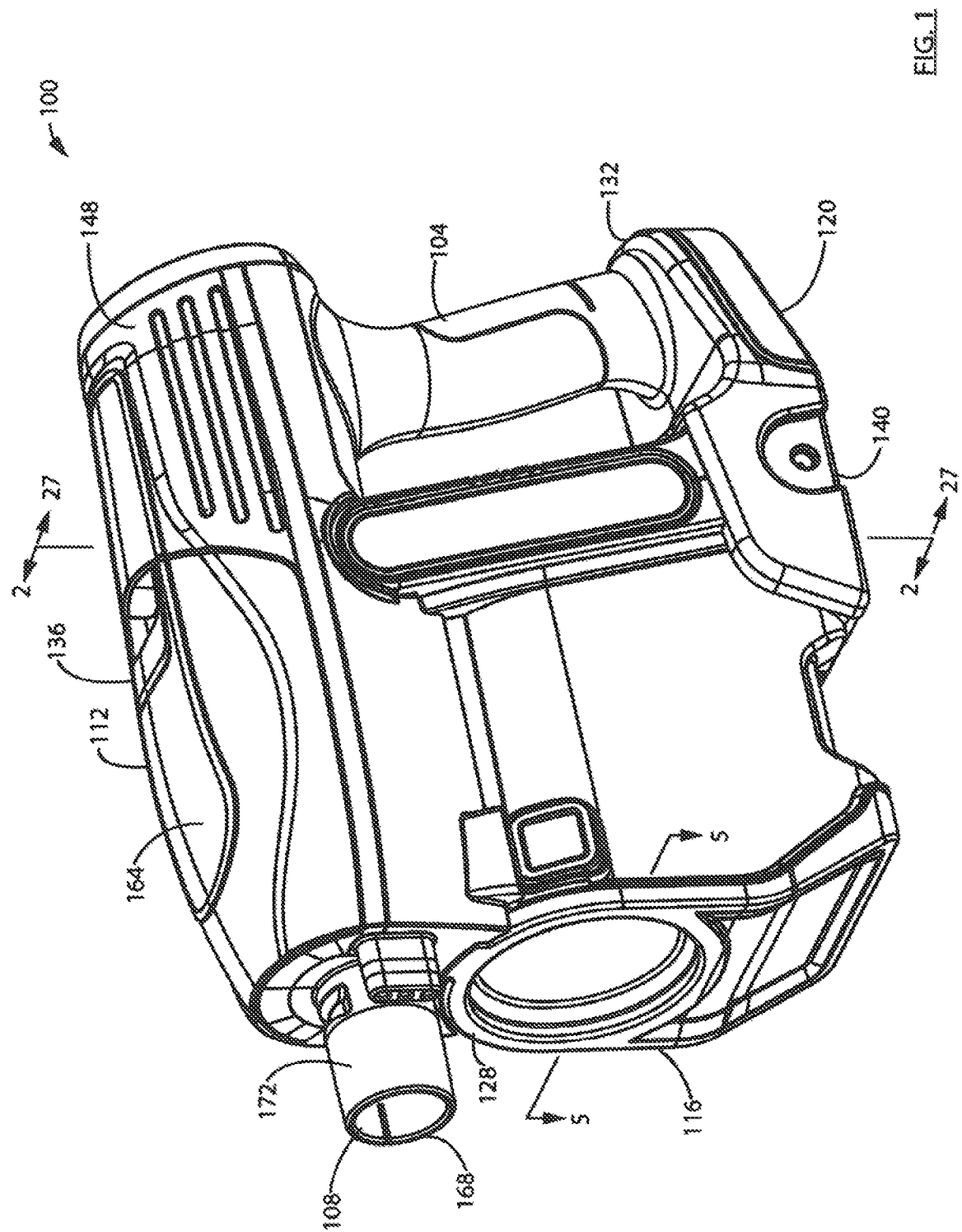
FIG. 1 is a perspective view of a surface cleaning apparatus in accordance with an embodiment.

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, two elements are said to be "parallel" where those elements are parallel and spaced apart, or where those elements are collinear.

Some elements herein may be identified by a part number, which is composed of a base number followed by an alphabetical or subscript-numerical suffix (e.g. $112a$, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

General Description of a Hand Vacuum Cleaner

Figure 2:
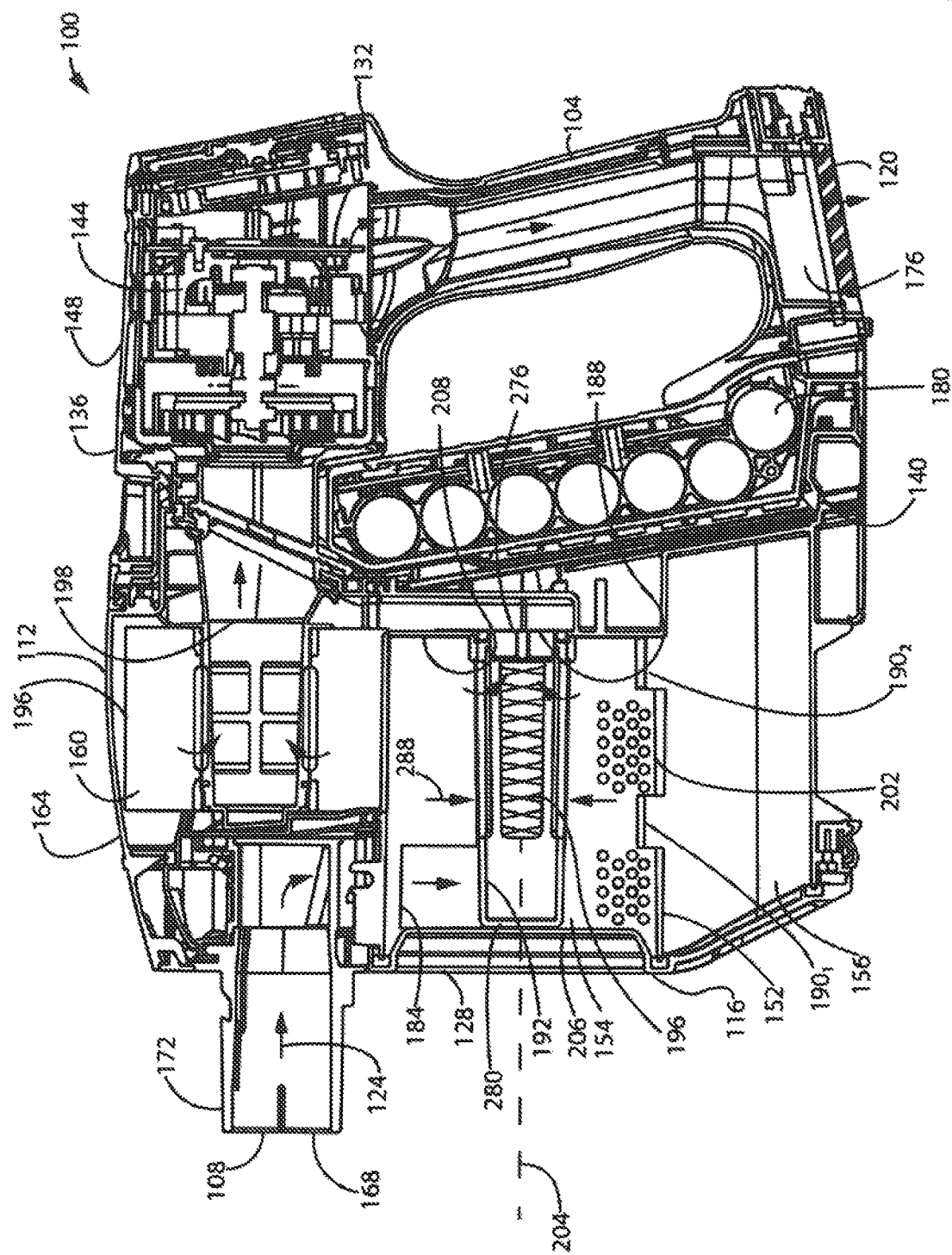
FIG. 2 is a cross-sectional view taken along line 2-2 in FIG. 1, in accordance with an embodiment.

Referring to FIGS. 1-2, an exemplary embodiment of a surface cleaning apparatus is shown generally as 100. The following is a general discussion of apparatus 100, which provides a basis for understanding several of the features that are discussed herein. As discussed subsequently, each of the features may be used individually or in any particular combination or sub-combination in this or in other embodiments disclosed herein.

Embodiments described herein include an improved cyclonic air treatment member 116, and a surface cleaning apparatus 100 including the same. Surface cleaning apparatus 100 may be any type of surface cleaning apparatus, including for example a hand vacuum cleaner as shown (see also FIG. 28), a stick vacuum cleaner, an upright vacuum cleaner (100 in FIG. 24), a canister vacuum cleaner, an extractor, or a wet/dry type vacuum cleaner.

Figure 28:
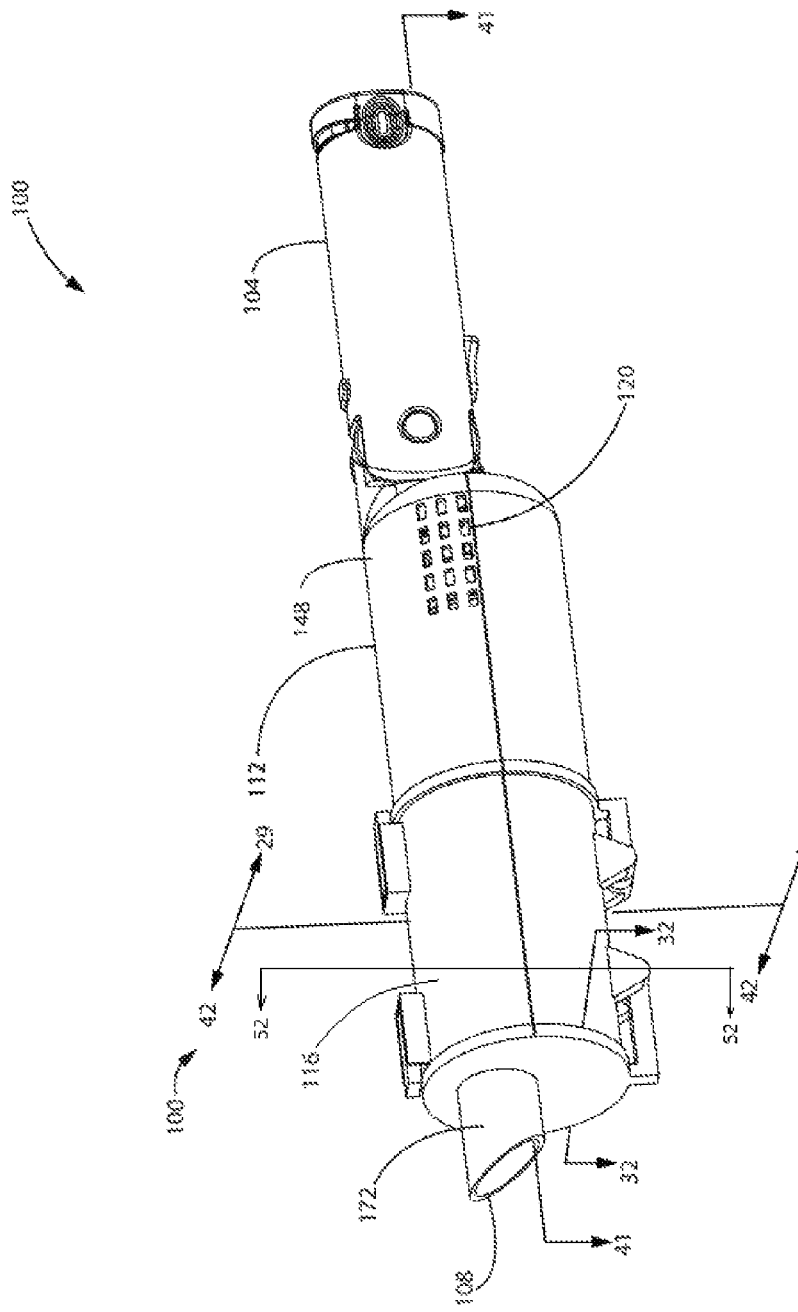
FIG. 28 is a perspective view of a surface cleaning apparatus in accordance with another embodiment.

In FIGS. 1-2 and 28, surface cleaning apparatus 100 is illustrated as a hand vacuum cleaner, which may also be referred to also as a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, handle 104 and dirty air inlet 108 may be rigidly coupled to each other (directly or indirectly), such as being integrally formed or separately molded and then non-removably secured together (e.g. adhesive or welding), so as to move as one while maintaining a constant orientation relative to each other. This is to be contrasted with canister and upright vacuum cleaners, whose weight is typically supported by a surface (e.g. a floor) during use. When a canister vacuum cleaner is operated, or when an upright vacuum cleaner is operated in a 'lift-away' configuration, a second hand is typically required to direct the dirty air inlet at the end of a flexible hose.

Still referring to FIGS. 1-2 and 28, surface cleaning apparatus 100 includes a main body or a handvac body 112 having an air treatment member 116 (which may be permanently affixed to the main body or may be removable in part or in whole therefrom for emptying), a dirty air inlet 108, a clean air outlet 120, and an air flow path 124 extending between the dirty air inlet 108 and the clean air outlet 120.

Surface cleaning apparatus 100 has a front end 128, a rear end 132, an upper end (also referred to as the top) 136, and a lower end (also referred to as the bottom) 140. In the embodiment shown, dirty air inlet 108 is at an upper portion of apparatus front end 128 and clean air outlet 120 is at a rearward portion of apparatus 100 at apparatus rear end 132. It will be appreciated that dirty air inlet 108 and clean air outlet 120 may be positioned in different locations of apparatus 100.

A suction motor 144 is provided to generate vacuum suction through air flow path 124, and is positioned within a motor housing 148. Suction motor 144 may be a fan-motor assembly including an electric motor and impeller blade(s). In the illustrated embodiment, suction motor 144 is positioned in the air flow path 124 downstream of air treatment member 116. In this configuration, suction motor 144 may be referred to as a "clean air motor". Alternatively, suction motor 144 may be positioned upstream of air treatment member 116, and referred to as a "dirty air motor".

Air treatment member 116 is configured to remove particles of dirt and other debris from the air flow. In the illustrated example, air treatment member 116 includes a cyclone assembly (also referred to as a "cyclone bin assembly") having a single cyclonic cleaning stage with a single cyclone 152 and a dirt collection chamber 156 (also referred to as a "dirt collection region", "dirt collection bin", "dirt bin", or "dirt chamber"). Cyclone 152 has a cyclone chamber 154. Dirt collection chamber 156 may be external to the cyclone chamber 154 (i.e. dirt collection chamber 156 may have a discrete volume from that of cyclone chamber 154). Cyclone 152 and dirt collection chamber 156 may be of any configuration suitable for separating dirt from an air stream and collecting the separated dirt respectively, and may be in communication dirt outlet(s) of the cyclone chamber.

In alternate embodiments, air treatment member 116 may include a cyclone assembly having two or more cyclonic cleaning stages arranged in series with each other. Each cyclonic cleaning stage may include one or more cyclones arranged in parallel with each other and one or more dirt collection chambers, of any suitable configuration. The dirt collection chamber(s) may be external to the cyclone chambers of the cyclones. Each cyclone may have its own dirt collection chamber or two or more cyclones fluidically connected in parallel may have a single common dirt collection chamber.

Referring to FIG. 2, hand vacuum cleaner 100 may include a pre-motor filter 160 provided in the air flow path 124 downstream of air treatment member 116 and upstream of suction motor 144. Pre-motor filter 160 may be formed from any suitable physical, porous filter media. For example, pre-motor filter 160 may be one or more of a foam filter, felt filter, HEPA filter, or other physical filter media. In some embodiments, pre-motor filter 160 may include an electrostatic filter, or the like. As shown, pre-motor filter 160 may be located in a pre-motor filter housing 164 that is external to the air treatment member 116.

In the illustrated embodiments, dirty air inlet 108 is the inlet end 168 of an air inlet conduit 172. Optionally, inlet end 168 of air inlet conduit 172 can be used as a nozzle to directly clean a surface. Alternatively, or in addition to functioning as a nozzle, air inlet conduit 172 may be connected (e.g. directly connected) to the downstream end of any suitable accessory tool such as a rigid air flow conduit (e.g., an above floor cleaning wand), a crevice tool, a mini brush, and the like. As shown, dirty air inlet 108 may be positioned forward of air treatment member 116, although this need not be the case.

In the embodiment of FIGS. 2 and 28, the air treatment member 116 comprises a cyclone 152, the air treatment air inlet is a cyclone air inlet 184, and the air treatment member air outlet is a cyclone air outlet 188. Accordingly, in operation, after activating suction motor 144, dirty air enters apparatus 100 through dirty air inlet 108 and is directed along air inlet conduit 172 to the cyclone air inlet 184. As shown, cyclone air inlet 184 may direct the dirty air flow to enter cyclone chamber 154 in a tangential direction so as to promote cyclonic action. Dirt particles and other debris may be disentrained (i.e. separated) from the dirty air flow as the dirty air flow travels from cyclone air inlet 184 to cyclone air outlet 188. The disentrained dirt particles and debris may discharge from cyclone chamber 154 through a dirt outlet 190 into dirt collection chamber 156 external to the cyclone chamber 154, where the dirt particles and debris may be collected and stored until dirt collection chamber 156 is emptied.

Air exiting cyclone chamber 154 may pass through an outlet passage 192 located upstream of cyclone air outlet 188. Cyclone chamber outlet passage 192 may also act as a vortex finder to promote cyclonic flow within cyclone chamber 154. In some embodiments, cyclone outlet passage 192 may include an air permeable portion 197 (which may be referred to as a screen or shroud 197, e.g. a fine mesh screen) in the air flow path 124 to remove large dirt particles and debris, such as hair, remaining in the exiting air flow. As exemplified in FIG. 50, the cyclone air outlet 188 may comprise a conduit portion 189 which is solid (air impermeable) and an axially inward screen or shroud 197.

From cyclone air outlet 188, the air flow may be directed into pre-motor filter housing 164 at an upstream side 196 of pre-motor filter 160. The air flow may pass through pre-motor filter 160, and then exit through pre-motor filter chamber air outlet 198 into motor housing 148. At motor housing 148, the clean air flow may be drawn into suction motor 144 and then discharged from apparatus 100 through clean air outlet 120. Prior to exiting the clean air outlet 120, the treated air may pass through a post-motor filter 176, which may be one or more layers of filter media.

Power may be supplied to suction motor 144 and other electrical components of apparatus 100 from an onboard energy storage member, which may include, for example, one or more batteries 180a or other energy storage device. In the illustrated embodiment, apparatus 100 includes a battery pack 180. Battery pack 180 may be permanently connected to apparatus 100 and rechargeable in-situ, or removable from apparatus 100. In the example shown, battery pack 180 is located between handle 104 and air treatment member 116. Alternatively, or in addition to battery pack 180, power may be supplied to apparatus 100 by an electrical cord (not shown) connected to apparatus 100 that can be electrically connected to mains power by at a standard wall electrical outlet.

Cyclonic Air Treatment Member with Two or More Dirt Outlets Extending Angularly Around the Cyclone Chamber Sidewall Embodiments herein relate to an improved cyclonic air treatment member that may have two or more dirt outlets, which extend around a portion of the perimeter of the cyclone chamber sidewall. The features in this section may be used by themselves in any surface cleaning apparatus or in any combination or sub-combination with any other feature or features described herein.

Within a cyclone, dirt is disentrained from a dirt laden air flow by directing the air flow along a cyclonic path. The cyclonic flow direction imparts radially outward forces upon dirt particles in the air flow, whereby the dirt particles are separated from the air flow and ultimately, e.g., ride against the cyclone sidewall. Dirt moved against the cyclone sidewall may exit from the cyclone chamber to a dirt collection chamber through a dirt outlet.

The ability of a cyclonic flow to separate dirt particles depends in part on the radial acceleration experienced by the dirt particles as a result of their cyclonic velocity through the cyclone. However, the cyclonic particle velocity may slow between the cyclone air inlet and air outlet. Below a threshold cyclonic particle velocity, the separation efficiency (i.e. the percentage of dirt particles separated from the dirty air flow by the cyclone) may be substantially reduced. When a vacuum cleaner operates at a high air flow rate (e.g. a 'high power mode' in a handvac), the cyclonic particle velocity between the cyclone air inlet and air outlet may remain well above such threshold velocity. However, when a vacuum cleaner operates at a low air flow rate (e.g. a 'low power mode' in a handvac), the cyclonic particle velocity may fall below the threshold velocity at some point between the cyclone air inlet and air outlet. In such a case, some of the dirt particles that have already been disentrained may be reintrained.

Embodiments herein relate to an improved cyclone having a dirt outlet that comprises a plurality of dirt outlet regions. A first dirt outlet region may be positioned closer, along the cyclonic air flow path, to the cyclone air inlet. The dirt outlet may have at least one additional dirt outlet region that may be positioned closer, along the cyclonic air flow path, to the cyclone air inlet. The additional dirt outlet region may be positioned at a location at which the cyclonic particle velocity may still be high enough (e.g. above the threshold velocity) to provide a targeted separation efficiency, even when operating at a lower air flow rate. Thus, the additional dirt outlet may permit the apparatus to optionally operate at a lower air flow rate with less loss of separation efficiency, all else being equal. For a handvac, this may mitigate the loss of separation efficiency when operating in a 'low power mode', which otherwise has an advantage of consuming less power thereby providing a longer run-time on a single charge.

Figure 3:
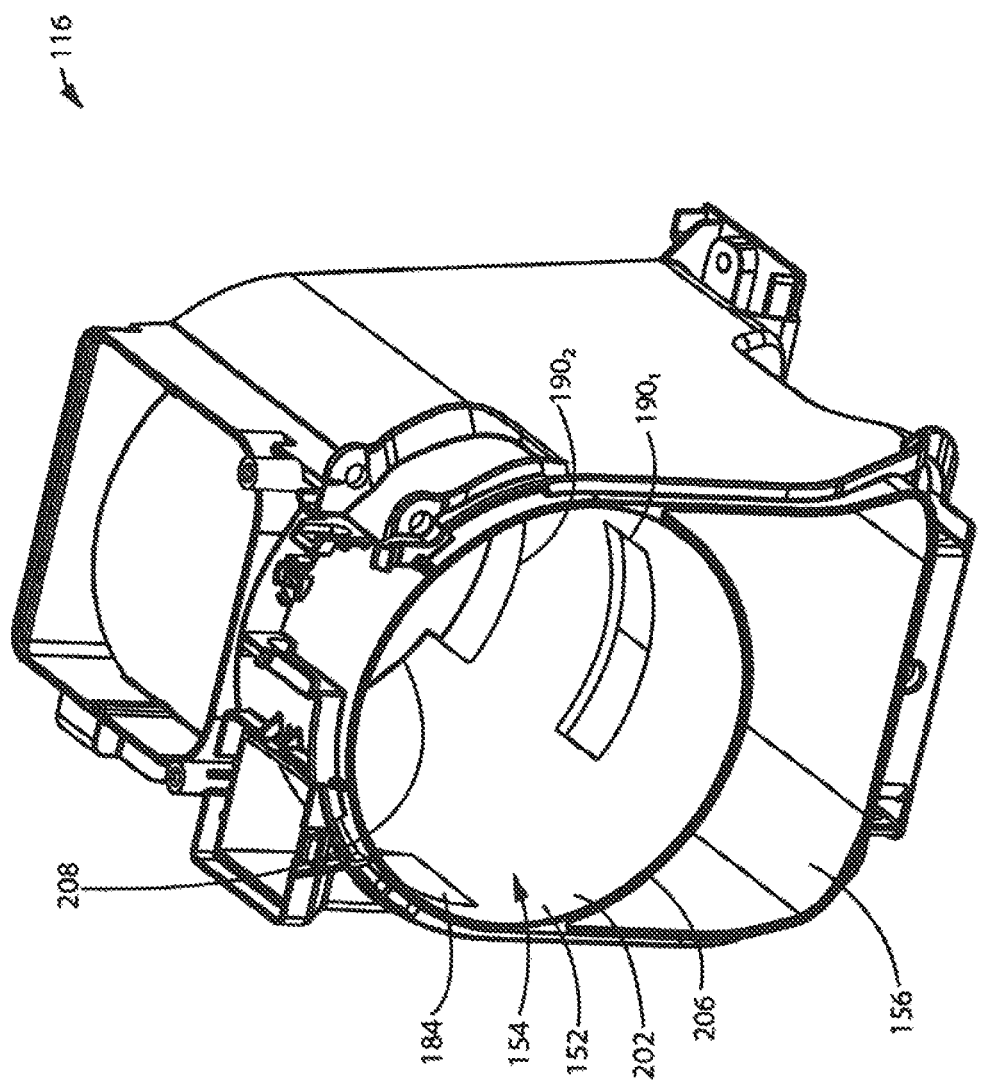
FIG. 3 is a perspective view of an air treatment member of the apparatus of FIG. 1 with a front wall and air outlet passage omitted, in accordance with an embodiment.
Figure 4:
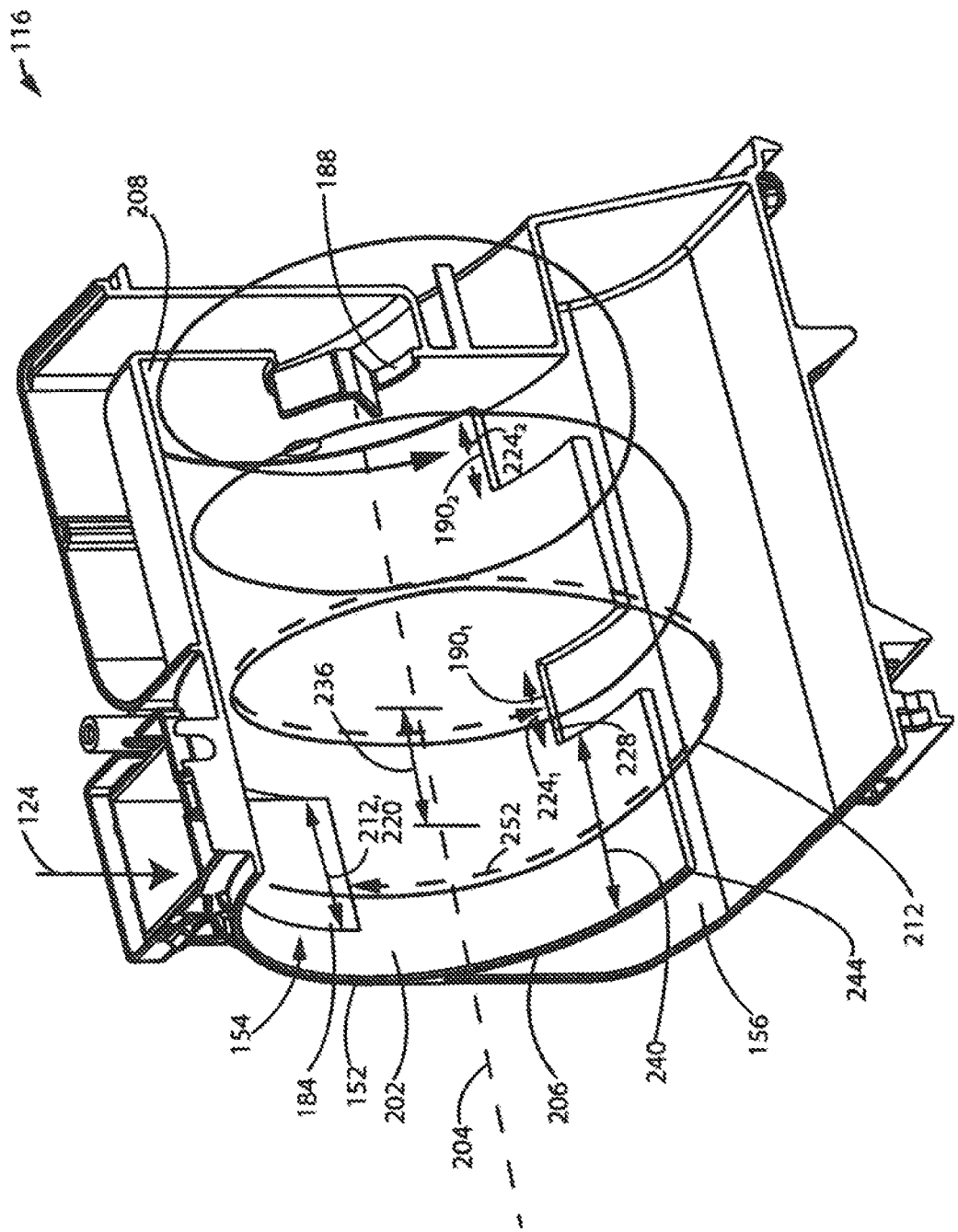
FIG. 4 is a perspective view of the air treatment member of the apparatus of FIG. 1, sectioned along line 2-2 in FIG. 1, and with the front wall and air outlet passage omitted, in accordance with the embodiment of FIG. 3.

Referring to FIGS. 2-4, cyclone 152 includes a cyclone sidewall 202 that, as exemplified, extends along a cyclone longitudinal axis 204 between a cyclone first end 206 and a cyclone second end 208. Accordingly, cyclone chamber 154 is bounded by cyclone sidewall 202 and cyclone first and second ends 206, 208. Cyclone 152 includes a tangential air inlet 184, although any air inlet may be used. As shown, air inlet 184 may be located proximate cyclone first end 206, although the cyclone air inlet may be provided at other locations. Cyclone also includes an air outlet 188. Cyclone air outlet 188 may be located proximate cyclone second end 208, such as in the illustrated uniflow cyclone configuration, or it may be located at cyclone first end 206 (see, for example FIGS. 24-25). Apparatus air flow path 124 includes a cyclone air flow path 212, which extends from cyclone air inlet 184 to cyclone air outlet 188.

Referring to FIGS. 3-4, cyclone 152 may include first and second dirt outlet regions $190_1$ and $190_2$. Second dirt outlet region $190_2$ may be located proximate (e.g. at or closer to) cyclone second end 208. For example, second dirt outlet region $190_2$ may be located at the cyclone second end 208 as exemplified in FIGS. 2 and 3. Second dirt outlet region $190_2$ may be of any design known in the vacuum cleaner arts. For example, it may be a slot formed in the cyclone sidewall at the cyclone second end 208 as exemplified or it may be defined by a gap between the cyclone chamber sidewall and the second end wall 208 (e.g., it may be an annular opening at the end of the cyclone sidewall that faces the cyclone second end 208. First dirt outlet region $190_1$ may be located axially or longitudinally towards cyclone first end 206 relative to second dirt outlet region $190_2$.

Figure 5:
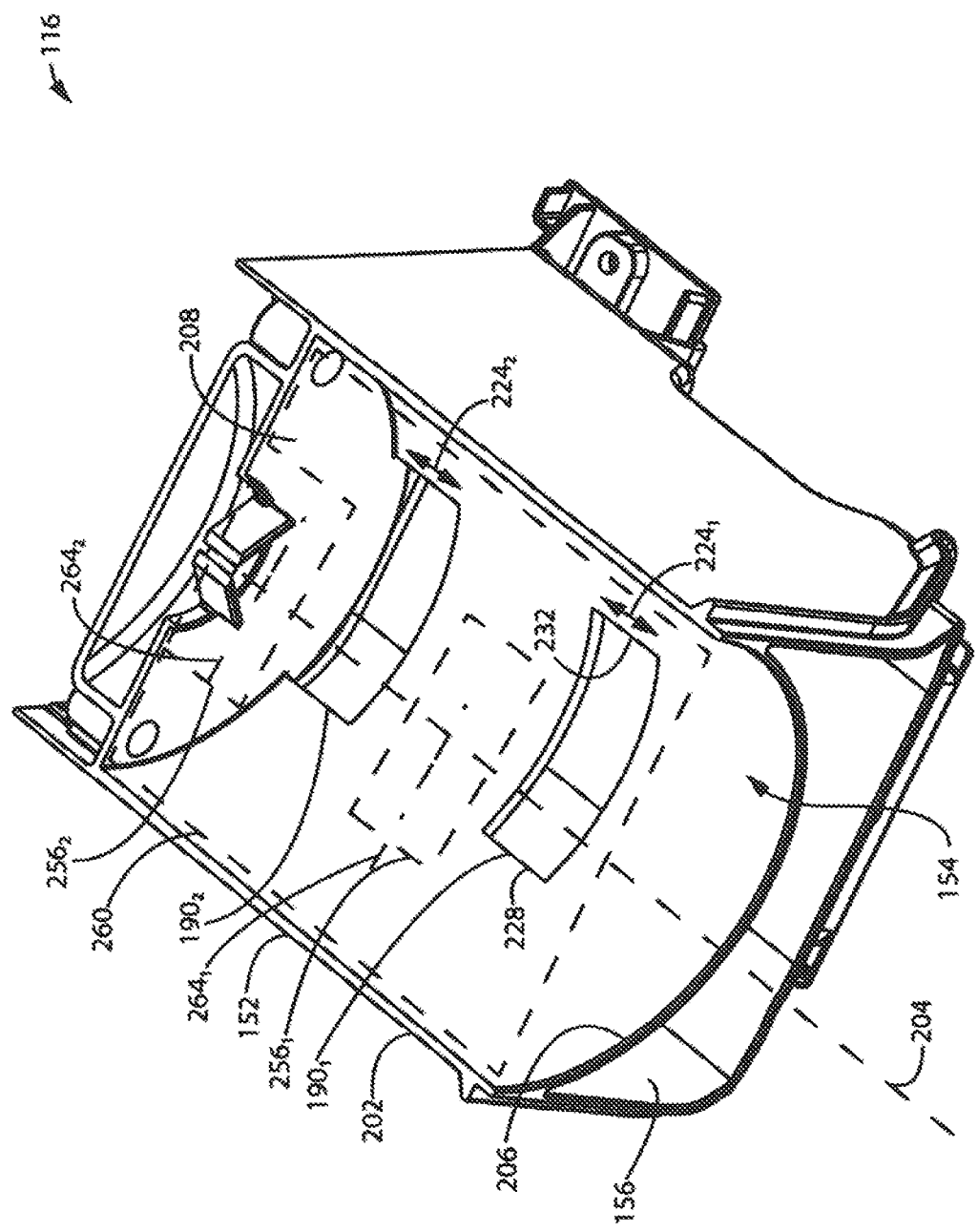
FIG. 5 is a perspective view of the air treatment member of the apparatus of FIG. 1, sectioned along line 5-5 in FIG. 1, and with the front wall and air outlet passage omitted, in accordance with the embodiment of FIG. 3.

Referring to FIGS. 4-5, first dirt outlet region $190_1$ may be provided anywhere in cyclone sidewall 202 having a longitudinal position between cyclone first end 206 and second dirt outlet $190_2$. For example, first dirt outlet region $190_1$ may be longitudinally positioned between cyclone air inlet 184 and second dirt outlet $190_2$. This may allow dirt that enters cyclone 152 to exit through cyclone dirt outlet region $190_1$ while that dirt has sufficient cyclonic velocity and before that dirt would have reached second dirt outlet region $190_2$.

Figure 15:
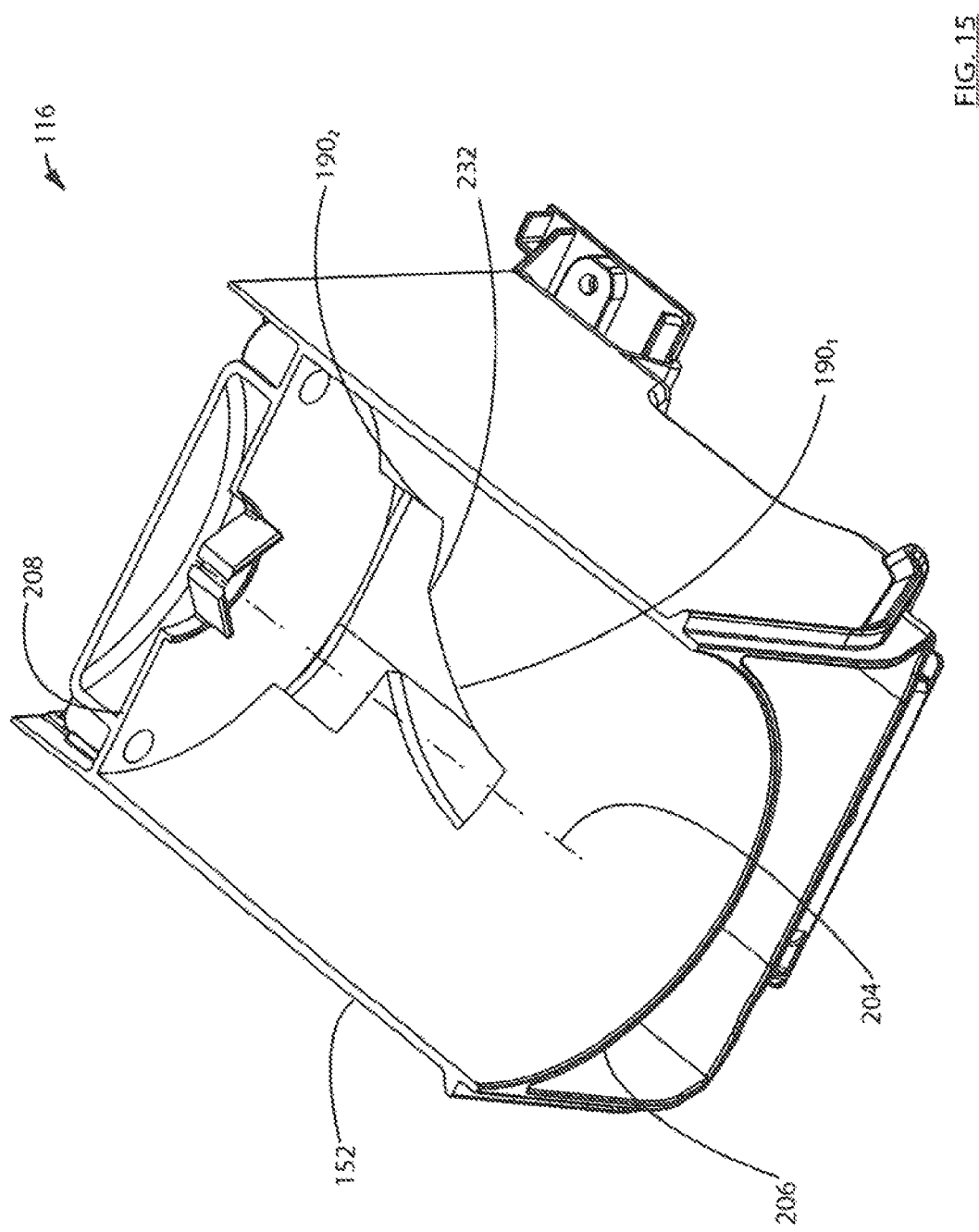

In some embodiments, first dirt outlet region $190_1$ may be aligned with a cyclonic portion of cyclone air flow path 212 (see for example FIG. 15). This allows separated dirt that is sliding on cyclone sidewall 202 as it is carried along a cyclonic portion of air flow path 212 to flow into first dirt outlet region $190_1$, through which the dirt can exit into dirt collection chamber 156. Accordingly, the alignment of first dirt outlet region $190_1$ may permit the dirt outlet region $190_1$ to better interact with dirt separated during an upstream portion of the cyclone air flow path 212. Even when operating at a low air flow rate, the upstream portion of flow path 212 may yet have sufficient dirt particle velocity to provide a high separation efficiency.

It will be appreciated that cyclone 152 may have more than first and second dirt outlet regions $190_1$ and $190_2$. For example, as exemplified in FIGS. 50-52, three dirt outlet regions $190_1$, $190_2$ and $190_3$ may be provided. As exemplified in FIGS. 53-54, 57-59, 60-62 and 63-65 six dirt outlet regions $190_1$-$190_6$ may be provided. As exemplified in FIGS. 55-56, ten dirt outlet regions $190_1$-$190_{10}$ may be provided. As exemplified, the plurality of dirt outlet regions comprises a plurality of discrete outlet slots that are arranged side by side along a portion of, or all of, an axial length of the cyclone.

Figure 50:
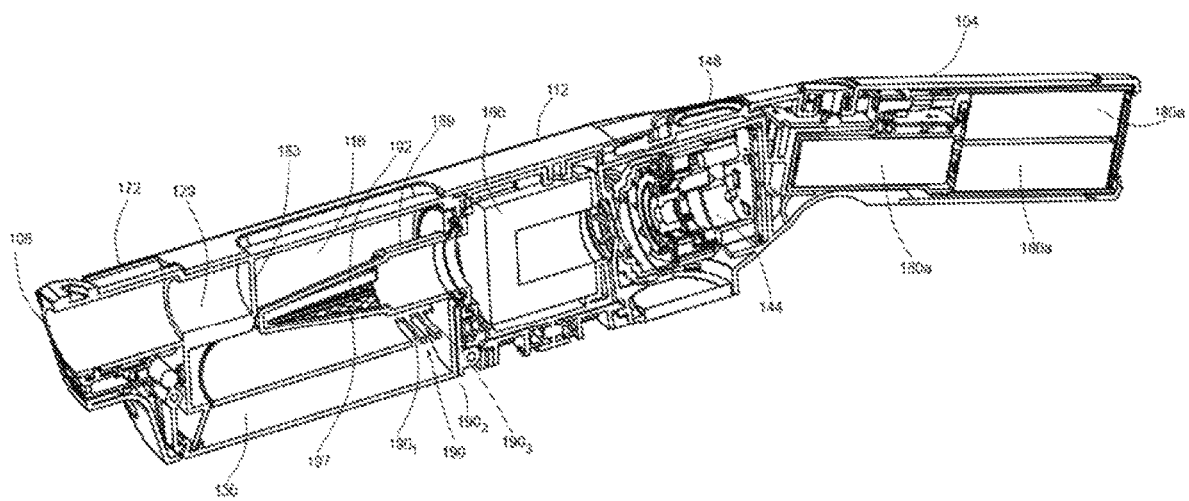
FIG. 50 is a perspective view of an alternate embodiment of an air treatment member of the apparatus of FIG. 28, sectioned along line 29-29 in FIG. 28.

As exemplified in FIG. 50, the dirt outlet regions 190 may be positioned only in the portion of the cyclone chamber sidewall that is radially outward of the solid conduit portion 189 of the air outlet. Alternately, as exemplified in FIG. 53, the dirt outlet regions 190 may be positioned in the portion of the cyclone chamber sidewall that is radially outward of the solid conduit portion 189 and the screen/shroud 197 of the air outlet.

Figure 51:
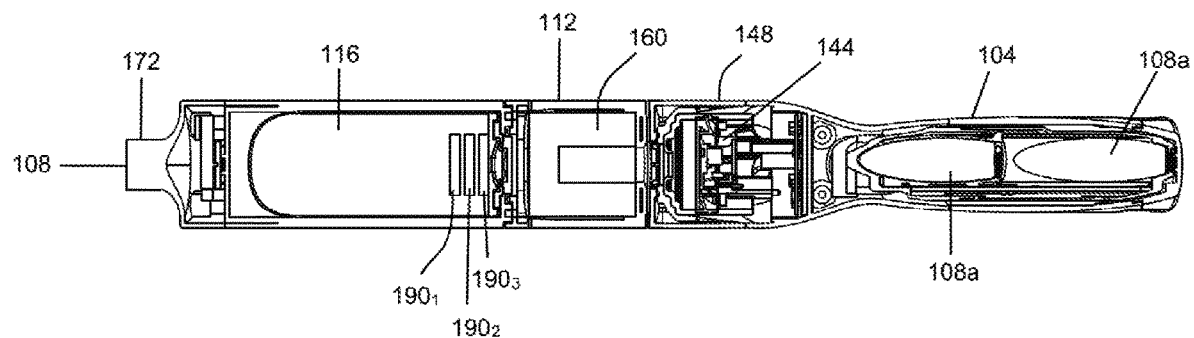
FIG. 51 is a cross-sectional view of the air treatment member of FIG. 50, sectioned along line 32-32 in FIG. 28.
Figure 52:
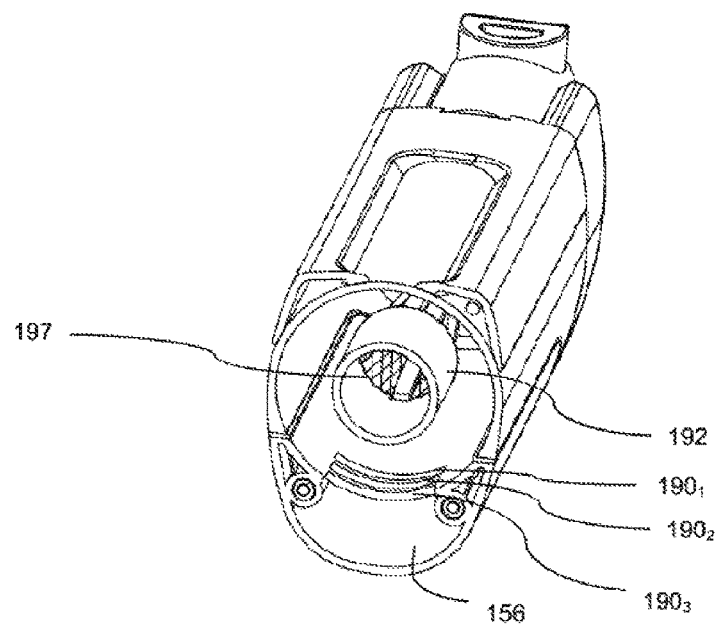
FIG. 52 is a perspective view of the air treatment member of FIG. 50, sectioned along line 52-52 in FIG. 28.
Figure 53:
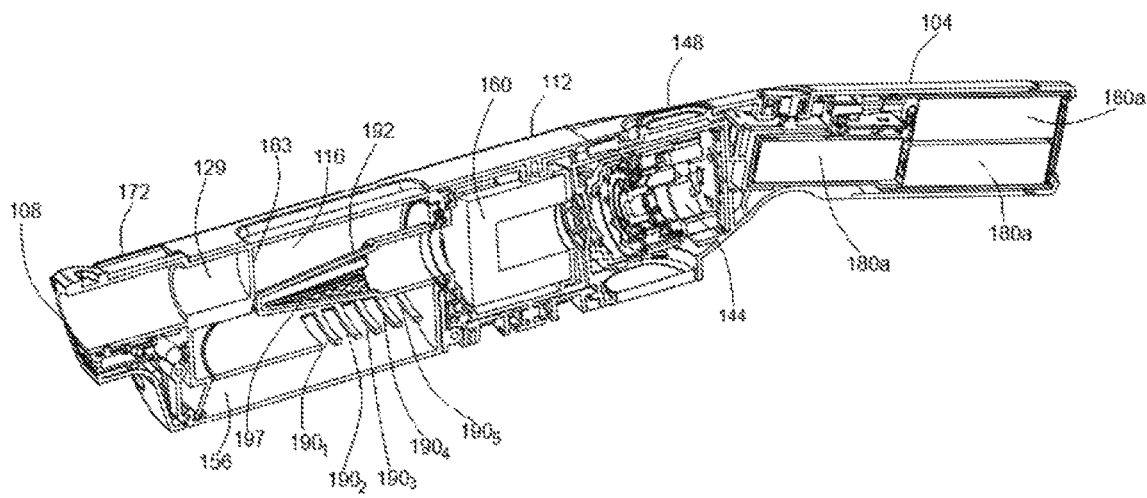
FIG. 53 is a perspective view of an alternate embodiment of an air treatment member of the apparatus of FIG. 28, sectioned along line 29-29 in FIG. 28.
Figure 54:
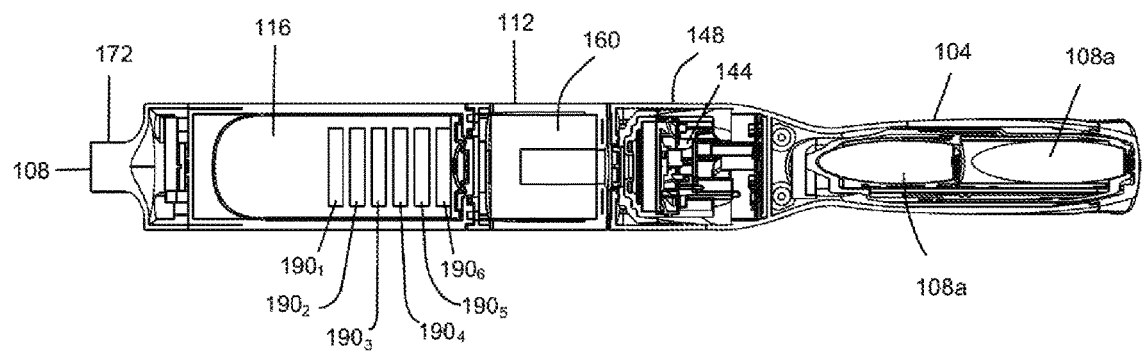
FIG. 54 is a cross-sectional view of the air treatment member of FIG. 53, sectioned along line 32-32 in FIG. 28.
Figure 55:
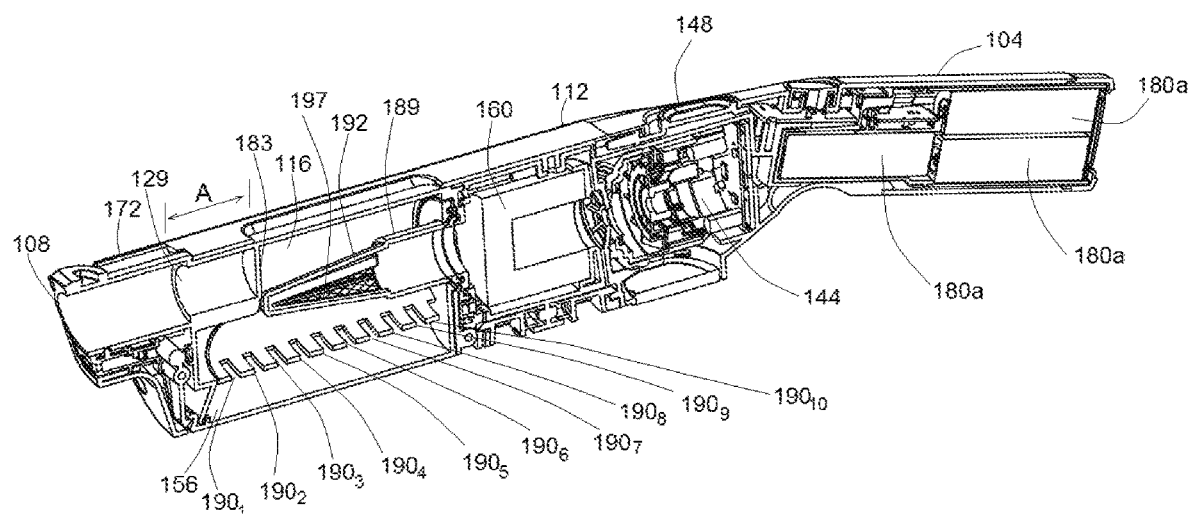
FIG. 55 is a perspective view of an alternate embodiment of an air treatment member of the apparatus of FIG. 28, sectioned along line 29-29 in FIG. 28.
Figure 56:
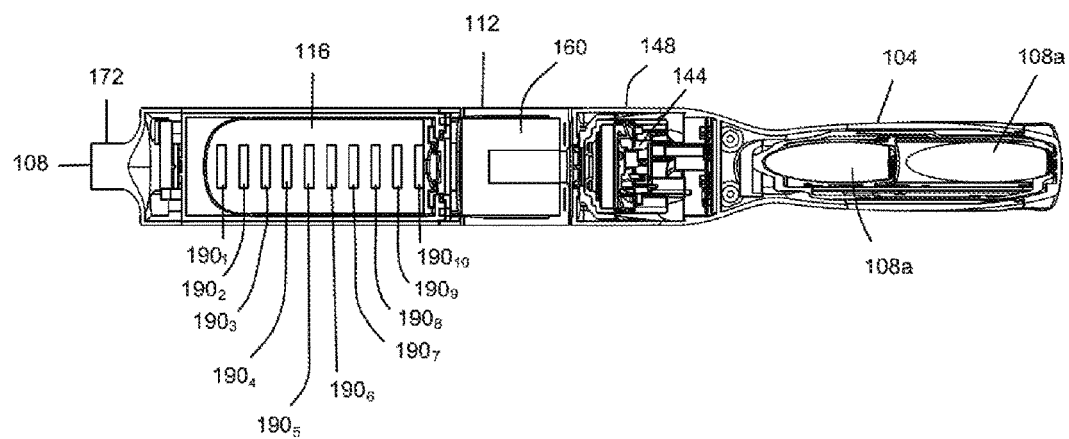
FIG. 56 is a cross-sectional view of the air treatment member of FIG. 55, sectioned along line 32-32 in FIG. 28.
Figure 57:
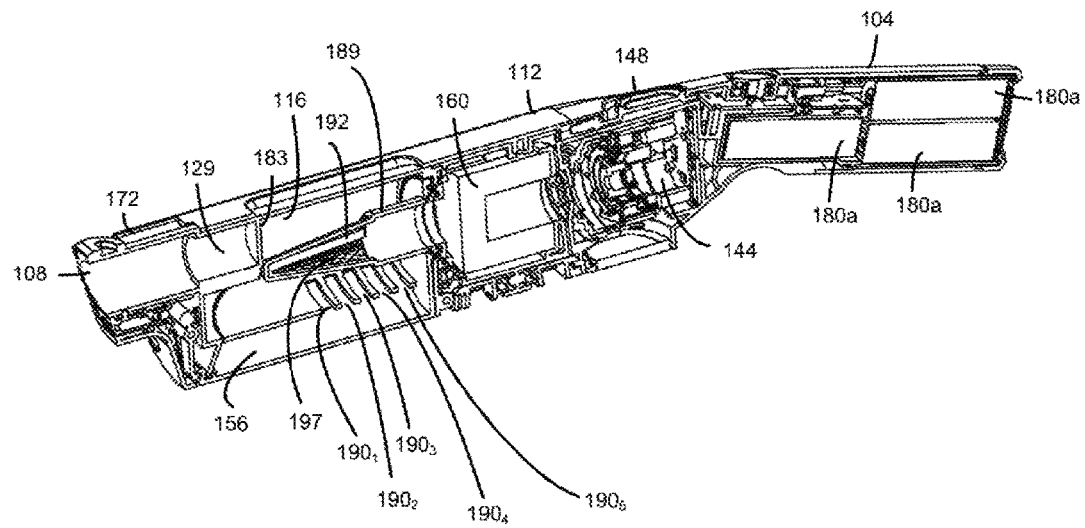
FIG. 57 is a perspective view of an alternate embodiment of an air treatment member of the apparatus of FIG. 28, sectioned along line 29-29 in FIG. 28.
Figure 58:
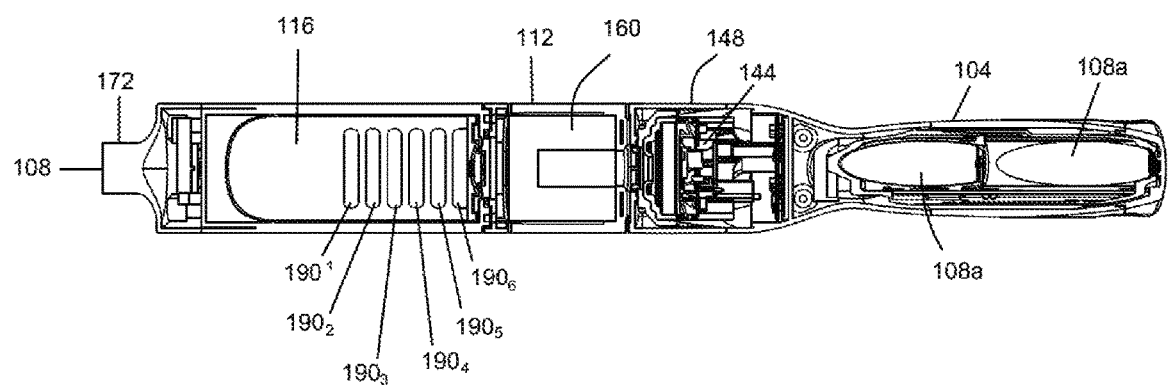
FIG. 58 is a cross-sectional view of the air treatment member of FIG. 57, sectioned along line 32-32 in FIG. 28.
Figure 59:
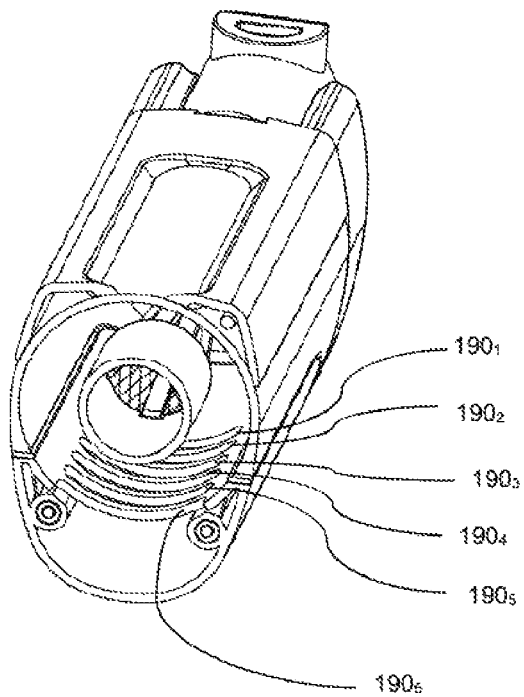
FIG. 59 is a perspective view of the air treatment member of FIG. 57, sectioned along line 52-52 in FIG. 28.
Figure 60:
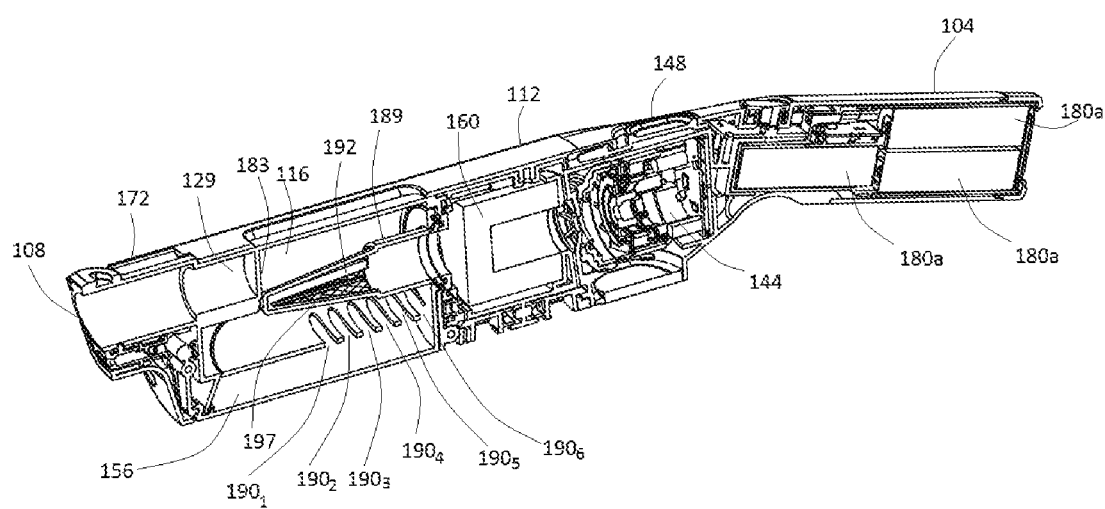
FIG. 60 is a perspective view of an alternate embodiment of an air treatment member of the apparatus of FIG. 28, sectioned along line 29-29 in FIG. 28.
Figure 61:
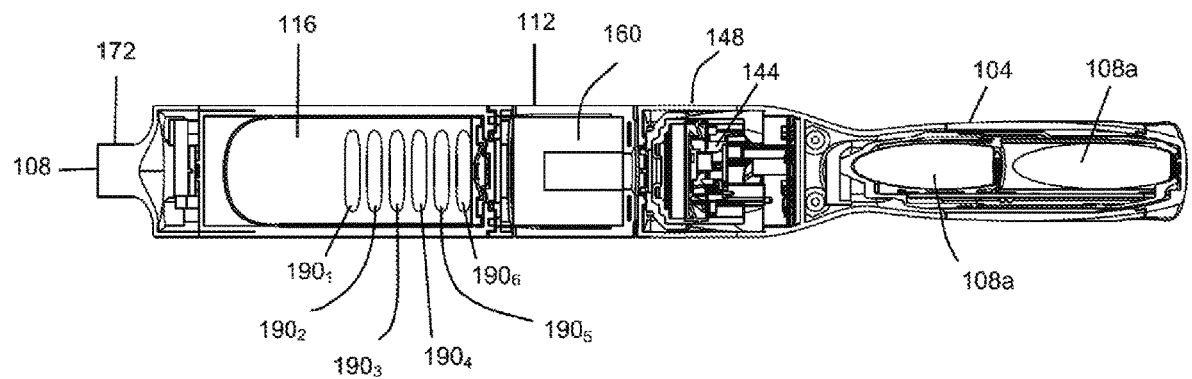
FIG. 61 is a cross-sectional view of the air treatment member of FIG. 60, sectioned along line 32-32 in FIG. 28.
Figure 62:
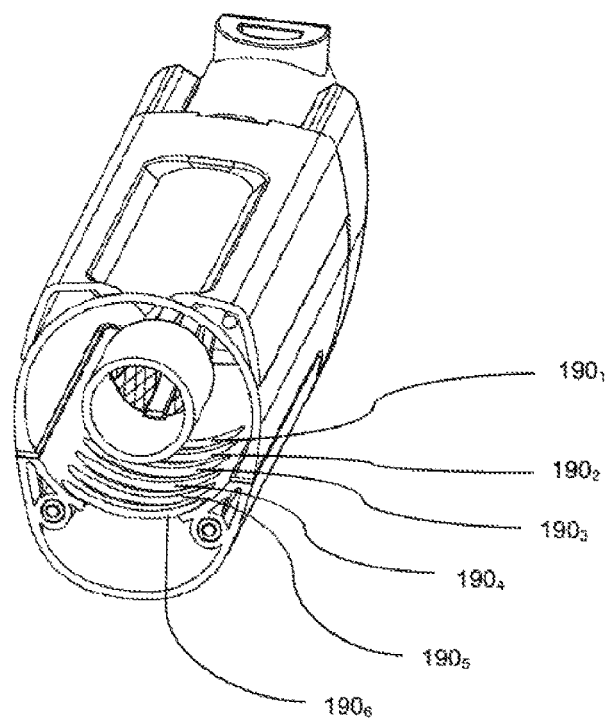
FIG. 62 is a perspective view of the air treatment member of FIG. 60, sectioned along line 52-52 in FIG. 28.
Figure 63:
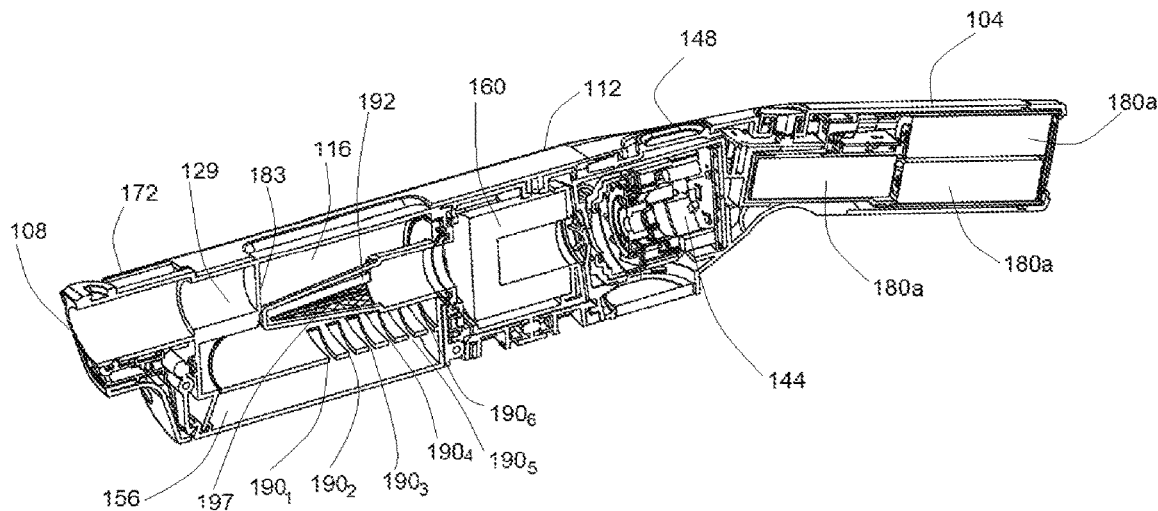
FIG. 63 is a perspective view of an alternate embodiment of an air treatment member of the apparatus of FIG. 28, sectioned along line 29-29 in FIG. 28.
Figure 64:
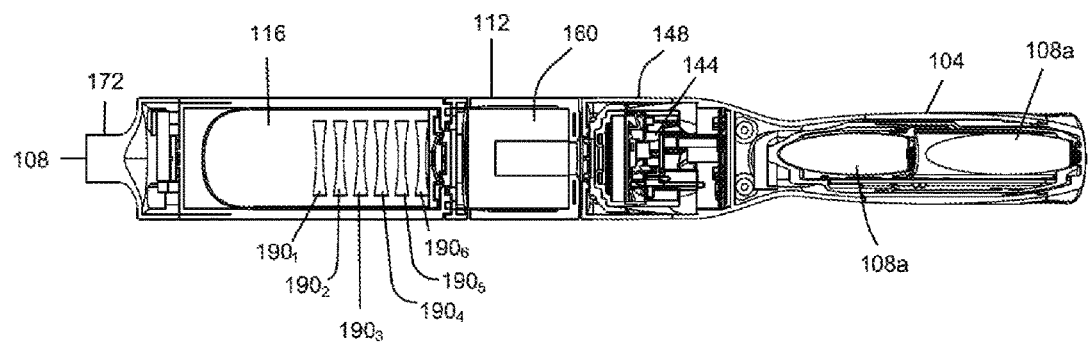
FIG. 64 is a cross-sectional view of the air treatment member of FIG. 63, sectioned along line 32-32 in FIG. 28.
Figure 65:
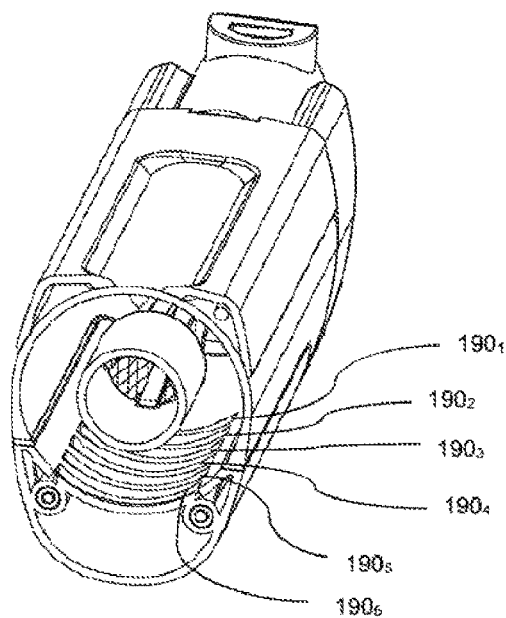
FIG. 65 is a perspective view of the air treatment member of FIG. 63, sectioned along line 52-52 in FIG. 28.
Figure 66:
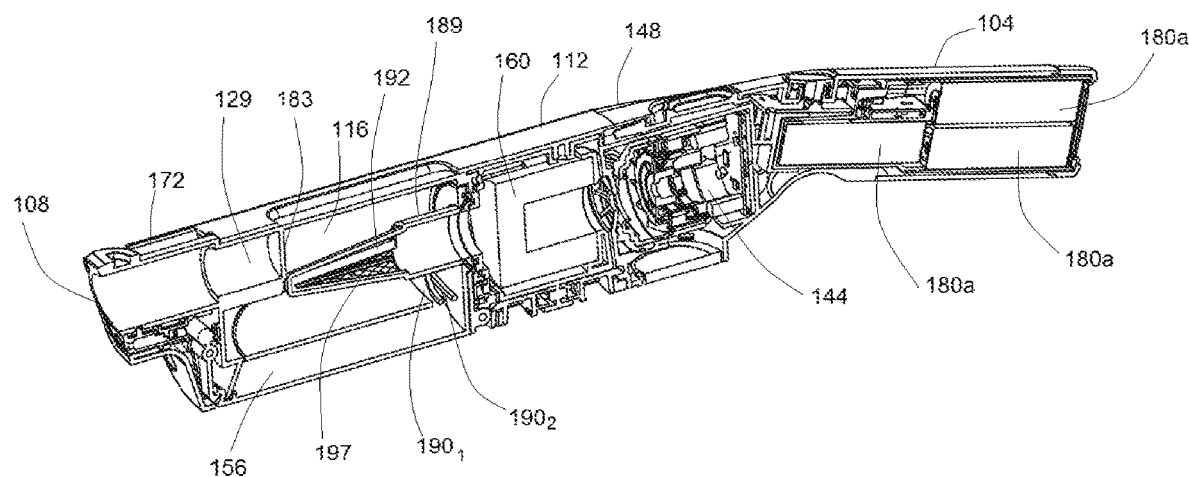
FIG. 66 is a perspective view of an alternate embodiment of an air treatment member of the apparatus of FIG. 28, sectioned along line 29-29 in FIG. 28.

If a plurality of dirt outlet regions is provided, they may extend from the rear end of the cyclone 152 (cyclone second end 208) towards the front end (cyclone chamber first end 206) as exemplified in FIGS. 51 and 54, or to the front end of the cyclone as exemplified in FIG. 56. If the air inlet is provided internal of the cyclone 152, as exemplified in FIG. 55, then the dirt outlet regions 190 may terminate at or rearward of the downstream wall 183 of the air inlet conduit 129. Accordingly, the portion of the cyclone chamber sidewall extending forwardly of downstream wall 183 of the air inlet conduit 129 (section A in FIG. 55) may not have any dirt outlet regions 190.

Optionally, or in addition, if plurality of dirt outlet regions is provided, they may be evenly axially spaced apart as exemplified in FIGS. 51, 54 and 56, or they may be spaced apart by different amounts. If the axial length of a cyclone is about 80 mm, then the axial distance between dirt outlet regions 190 may be 1-6 mm, 1.5-4 mm or 2-3 mm. It will be appreciated that, if the axial length and/or diameter of a cyclone increases, then the axial distance between dirt outlet regions 190 may be increased.

Still referring to FIGS. 4-5, cyclone air flow path 212 may have an axial flow width 216 (i.e. measured parallel to longitudinal axis 204) approximately equal to an axial width 220 (i.e. measured parallel to longitudinal axis 204) of cyclone air inlet 184. Axial flow width 216 may remain generally constant between cyclone air inlet 184 and cyclone second end 208. Cyclone dirt outlet regions 190 may have any axial width 224 suitable for allowing dirt separated from the air flow to exit cyclone chamber 154 towards dirt collection chamber 156. Preferably, axial dirt outlet width $224_1$ (or axial width 224 of each dirt outlet region 190) is between 35% and 90% of axial air inlet width 220 (i.e. about 35% to 90% of axial air flow path width 216). A width 224 within this range may be large enough to permit common dirt particle sizes to exit freely through the cyclone dirt outlet region 190, and yet may not be so large that a detrimental amount of the air flow is diverted from cyclone chamber 154 through cyclone dirt outlet region 190.

In other embodiments, axial dirt outlet width $224_1$ may be between 15% and 150% of axial air inlet width 220 (i.e. about 15% to 150% of axial air flow path width 216), between 25% and 125%, between 40% and 75% or between 50% and 60%. The lower portion of this range (e.g., 10% to 50% or 15% to 35% of axial air inlet width 220) may minimize the amount of the air flow that diverts through cyclone dirt outlet 190 while still permitting at least small dirt particles to exit. The upper portion of this range (e.g., 75% to 150%, 90% to 150% or 100% to 125% of axial air inlet width 220) may allow very large dirt particles to exit, although a somewhat greater amount of air flow may divert through cyclone dirt outlet region 190.

Accordingly, if the axial length of a cyclone is about 80 mm, then the axial dirt outlet width 240 may be 1-18 mm, 2-6 mm, 3-5, or 4 mm. It will be appreciated that, if the axial length and/or diameter of a cyclone increases, then the axial outlet width 224 may be increased. Expressed differently, the axial dirt outlet width 224 may be 2-8%, 3-7% or 5% of the axial length of the cyclone.

The axial dirt outlet width 224 and/or axial distance between dirt outlet regions 190 may decrease from the forward location at which the dirt outlet regions 190 commence to the rear end of the location where the dirt outlet regions 190 terminate.

A dirt outlet region 190 may extend around part or all of the cyclone chamber sidewall, optionally in a plane transverse to the cyclone axis of rotation. For example, a dirt outlet region 190 may extend in an arc that extends 10-180°, 25-120°, 35-90° or 45-75° around the cyclone chamber sidewall. Each dirt outlet may have the same arc or a different arc.

Figure 67:
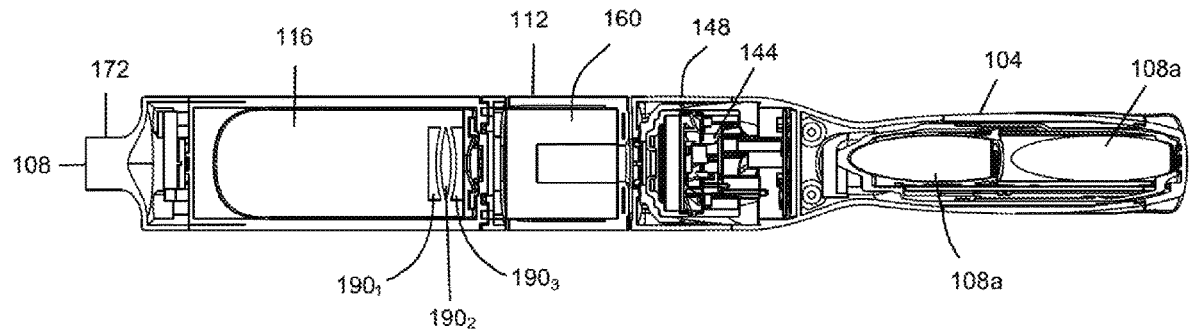
FIG. 67 is a cross-sectional view of the air treatment member of FIG. 66, sectioned along line 32-32 in FIG. 28.
Figure 68:
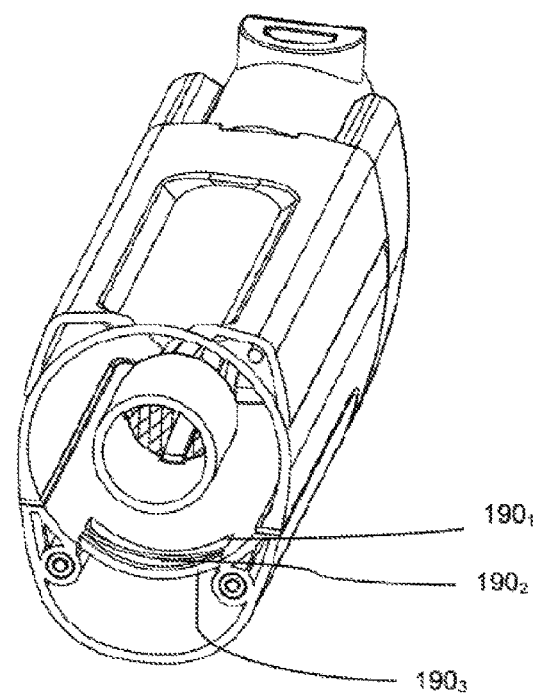
FIG. 68 is a perspective view of the air treatment member of FIG. 66, sectioned along line 52-52 in FIG. 28.
Figure 69:
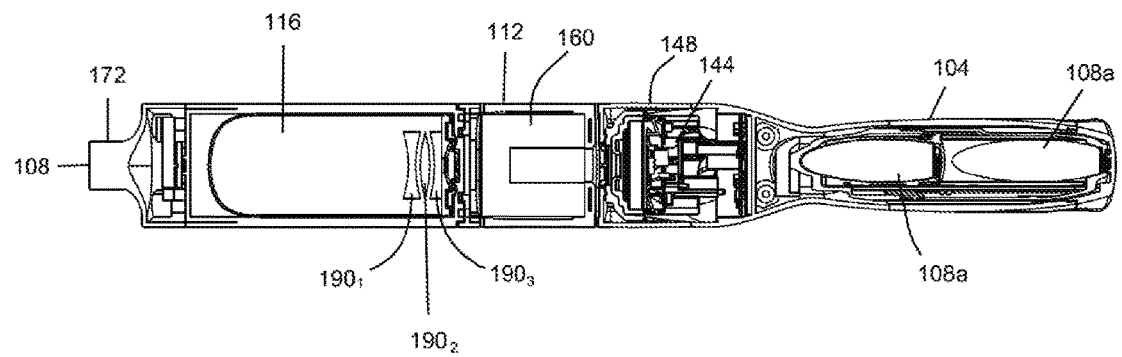
FIG. 69 is a cross-sectional view of an alternate embodiment of an air treatment member of the apparatus of FIG. 28, sectioned along line 32-32 in FIG. 28.
Figure 70:
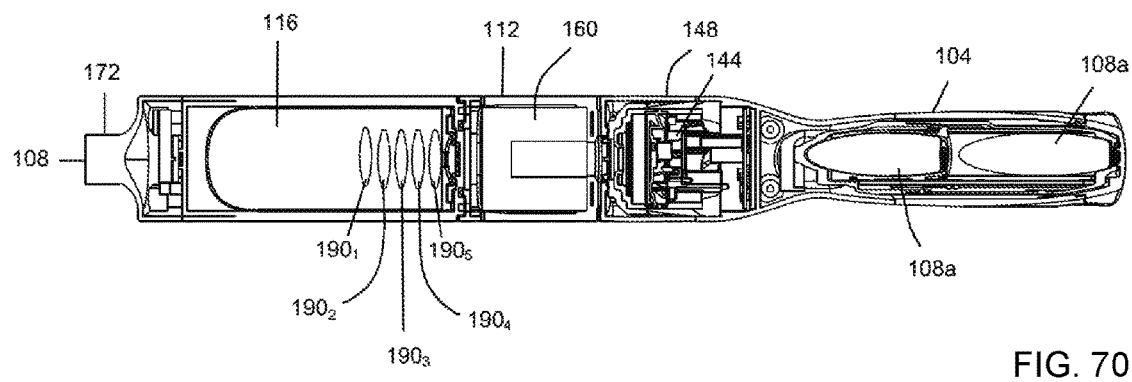
FIG. 70 is a cross-sectional view of an alternate embodiment of an air treatment member of the apparatus of FIG. 28, sectioned along line 32-32 in FIG. 28.
Figure 71:
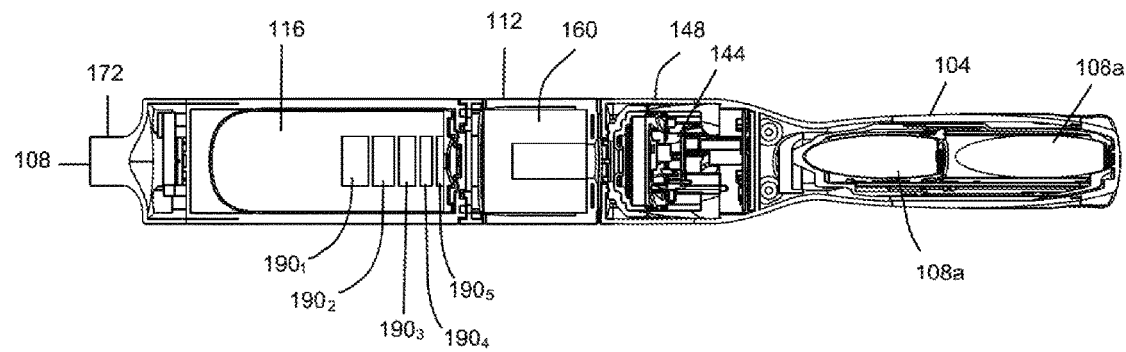
FIG. 71 is a cross-sectional view of an alternate embodiment of an air treatment member of the apparatus of FIG. 28, sectioned along line 32-32 in FIG. 28.

It will be appreciated that the dirt outlet regions 190 may have the same size (e.g. width, length, and/or area) or may be differently sized and/or differently shaped. As exemplified in FIGS. 3, 9-11, 51, 54 and 56, the dirt outlet regions are rectangular in shape. Alternately, the dirt outlet regions may have rounded angularly spaced apart ends (see FIGS. 57-59), they may be oblong (see FIGS. 60-62), they may have concave angularly extending walls (see FIGS. 63-65), convex angularly extending walls (see FIG. 70) or both concave and convex angularly extending walls (see FIGS. 67-69). Alternately, or in addition, as exemplified in FIG. 71, the axial dirt outlet width 224 of all (or some) of the dirt outlet regions 190 may be different. As exemplified, the axial dirt outlet width 224 may decrease (or decrease continually as exemplified) from the forward most dirt outlet region $190_1$ to the rearward most dirt outlet region $190_5$.

Alternatively, or in addition, the alignment of first dirt outlet region $190_1$ with a cyclonic portion of cyclone air flow path 212 may be such that at least 50%, 60%, 70%, 80%, 90% or more of the area of first dirt outlet region $190_1$ is coincident with (e.g., extends continuously along) the cyclone air flow path 212. This may expose separated dirt particles to first dirt outlet region $190_1$ for an extended continuous distance along cyclone air flow path 212, whereby the dirt particles may be more likely to exit through first dirt outlet $190_1$, all else being equal.

The alignment of first dirt outlet region $190_1$ with the cyclone air flow path 212 may be such that both an upstream end 228 of dirt outlet region $190_1$ and a downstream end 232 of dirt outlet region $190_1$ are each located along a portion of the cyclone air flow path 212. For example, dirt outlet region $190_1$ may extend contiguously along a part of the cyclone air flow path 212 from dirt outlet upstream end 228 to dirt outlet downstream end 232.

Referring to FIG. 4, first dirt outlet region $190_1$ may have any axial position (i.e. with respect to cyclone longitudinal axis 204) between cyclone first end 206 and second dirt outlet $190_2$. In some embodiments, first dirt outlet region $190_1$ is axially offset from cyclone air inlet 184 by a distance 236 sufficient to permit at least some dirt particles within the air flow to separate (i.e. move outwardly to the cyclone sidewall 202) as a result of the cyclonic character of air flow path 212. For example, first dirt outlet region $190_1$ may be located at least one turn (i.e., a 360° segment) of cyclone air flow path 212 from cyclone air inlet 184. In the illustrated example, first dirt outlet region $190_1$ is located just under 1.5 turns of cyclone air flow path 212 from cyclone air inlet 184. Characterized another way, axial distance 236 from cyclone air inlet 184 to dirt outlet upstream end 228, measured center-to-center may be at least equal to cyclone air inlet width 220 (i.e. at least about cyclone air flow width 216). More generally, cyclone air inlet 184 may be spaced (center-to-center) from cyclone first end 206 by an axial distance 240 at least equal to cyclone air inlet width 220.

Figure 6:
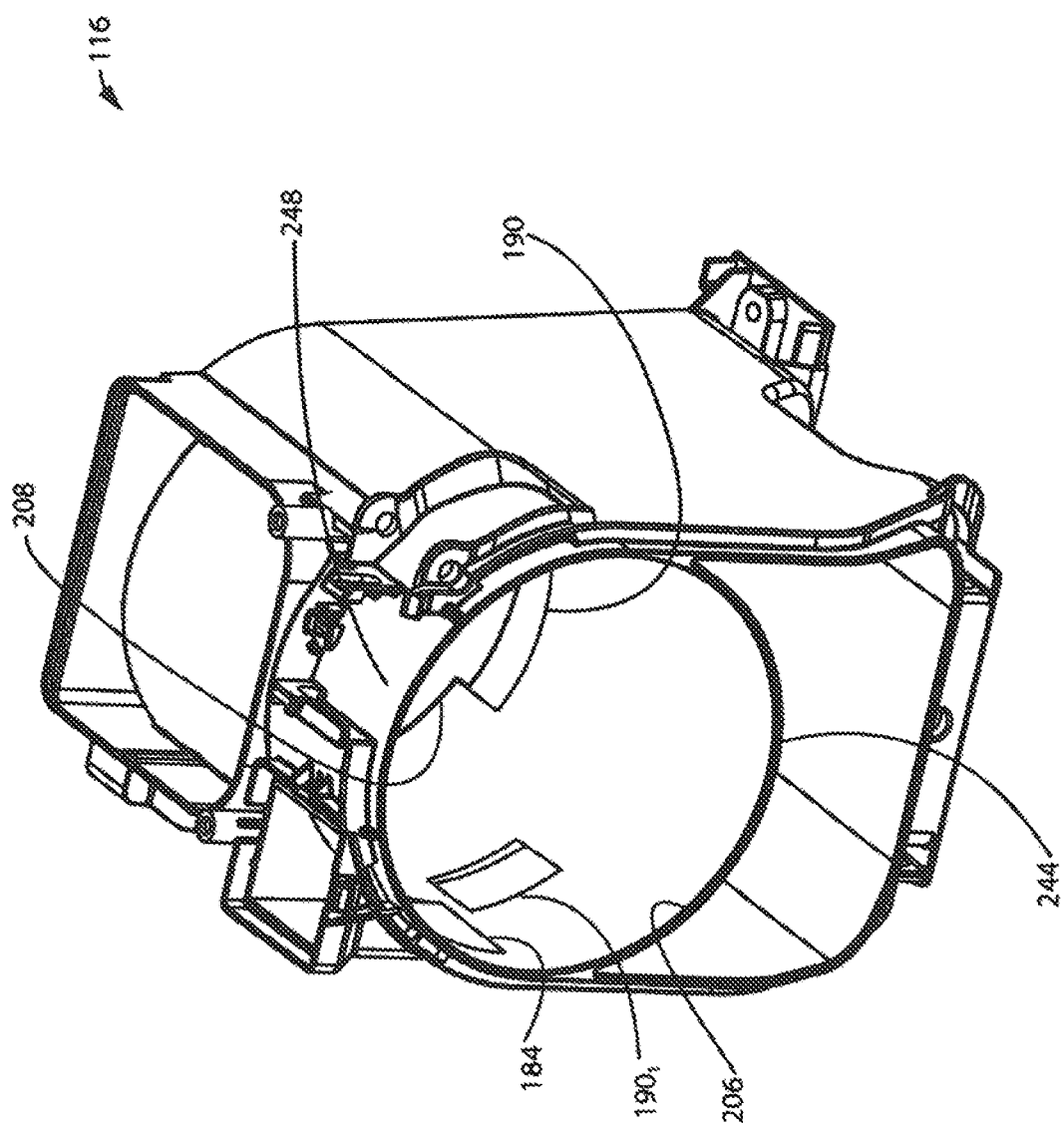
FIG. 6 is a perspective view of an alternate embodiment of the air treatment member of the apparatus of FIG. 1 with the front wall and air outlet passage omitted, in accordance with another embodiment.
Figure 7:
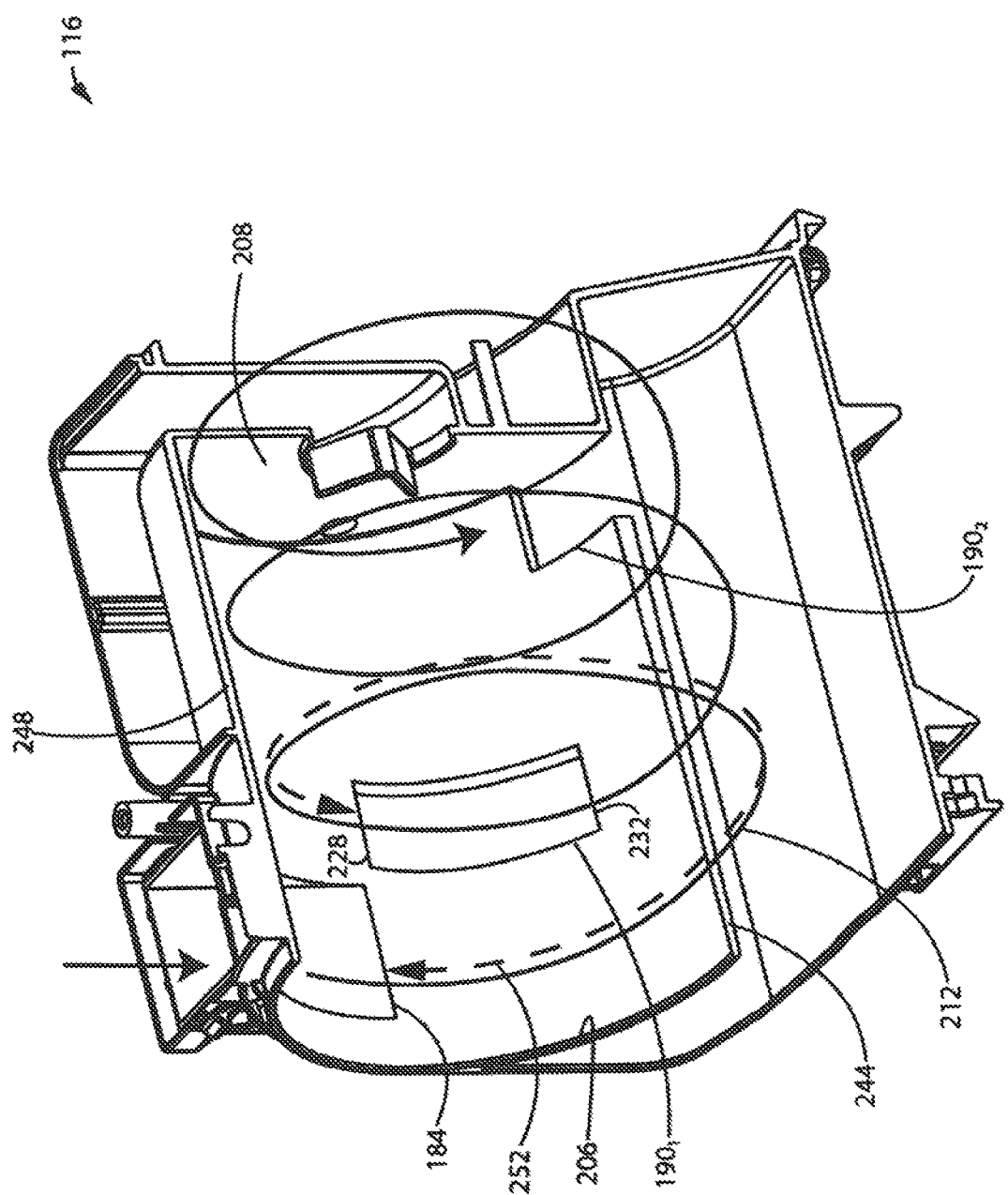
FIG. 7 is a perspective view of the alternate air treatment member of FIG. 6, sectioned along line 2-2 in FIG. 1, and with the front wall and air outlet passage omitted, in accordance with the embodiment of FIG. 6.

Cyclone dirt outlet region $190_1$ may have any angular (i.e. circumferential) position on cyclone sidewall 202. In some embodiments, cyclone dirt outlet region $190_1$ is angular located at a bottom end 244 of cyclone sidewall 202 as shown. This location allows gravity to assist with moving separated dirt particles through cyclone dirt outlet $190_1$. In other embodiments, cyclone dirt outlet region $190_1$ may be angularly offset from sidewall bottom end 244. Although such positions may not benefit from gravity assistance for discharging separated dirt particles, they may advantageously provide greater flexibility to position cyclone dirt outlet region $190_1$ at a distance 252 along cyclone air flow path 212, at which cyclonic particle velocities and residency time are optimized for separation efficiency (e.g. at the power mode(s) provided by apparatus 100). As an example, FIGS. 6-7 show cyclone dirt outlet region $190_1$ angularly located between sidewall top and bottom ends 248, 244. In the example shown, cyclone dirt outlet region $190_1$ has a path distance 252 of about one turn (e.g. 360 degrees) from cyclone air inlet 184.

Referring to FIG. 5, cyclone dirt outlets 190 may have any orientation that is suitable for allowing dirt particles to exit cyclone chamber 154. For example, one of cyclone dirt outlets region 190 (or both as shown) may be oriented such that they have a radial projection 256 (i.e. onto a plane 260 that includes cyclone longitudinal axis 204) wherein the long direction is oriented transverse (e.g. perpendicular) to cyclone longitudinal axis 204. For example, a cyclone dirt outlet region 190 may have a projected axis 264 that is transverse (e.g. perpendicular) to longitudinal axis 204. As shown in FIG. 4, this may permit cyclone dirt outlet(s) region 190 to be oriented in alignment with cyclone air flow path 212.

Figure 8:
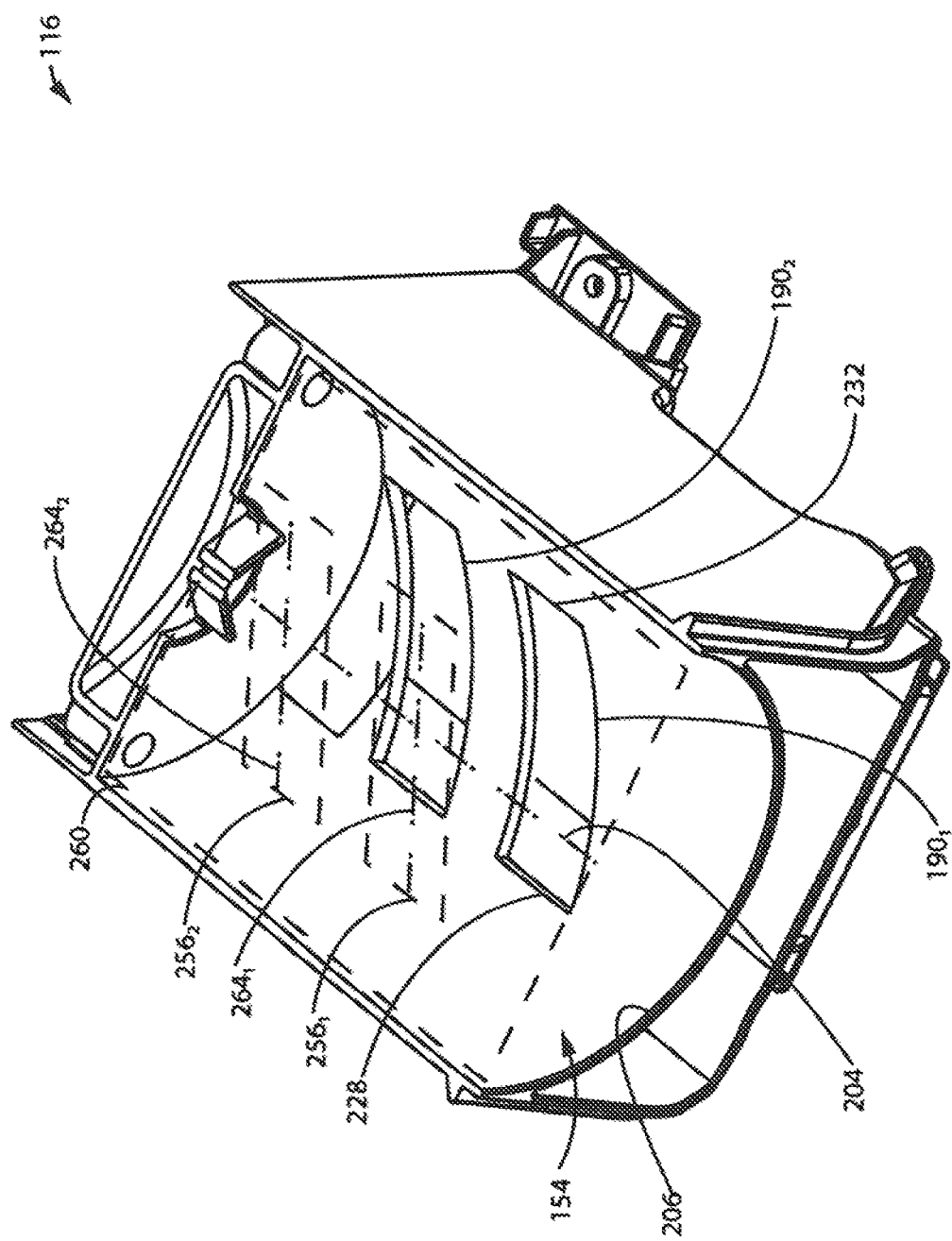
FIGS. 8-21 are perspective views of the air treatment member of the apparatus of FIG. 1, sectioned along line 5-5 in FIG. 1, and with the front wall and air outlet passage omitted, in accordance with various embodiments.
Figure 9:
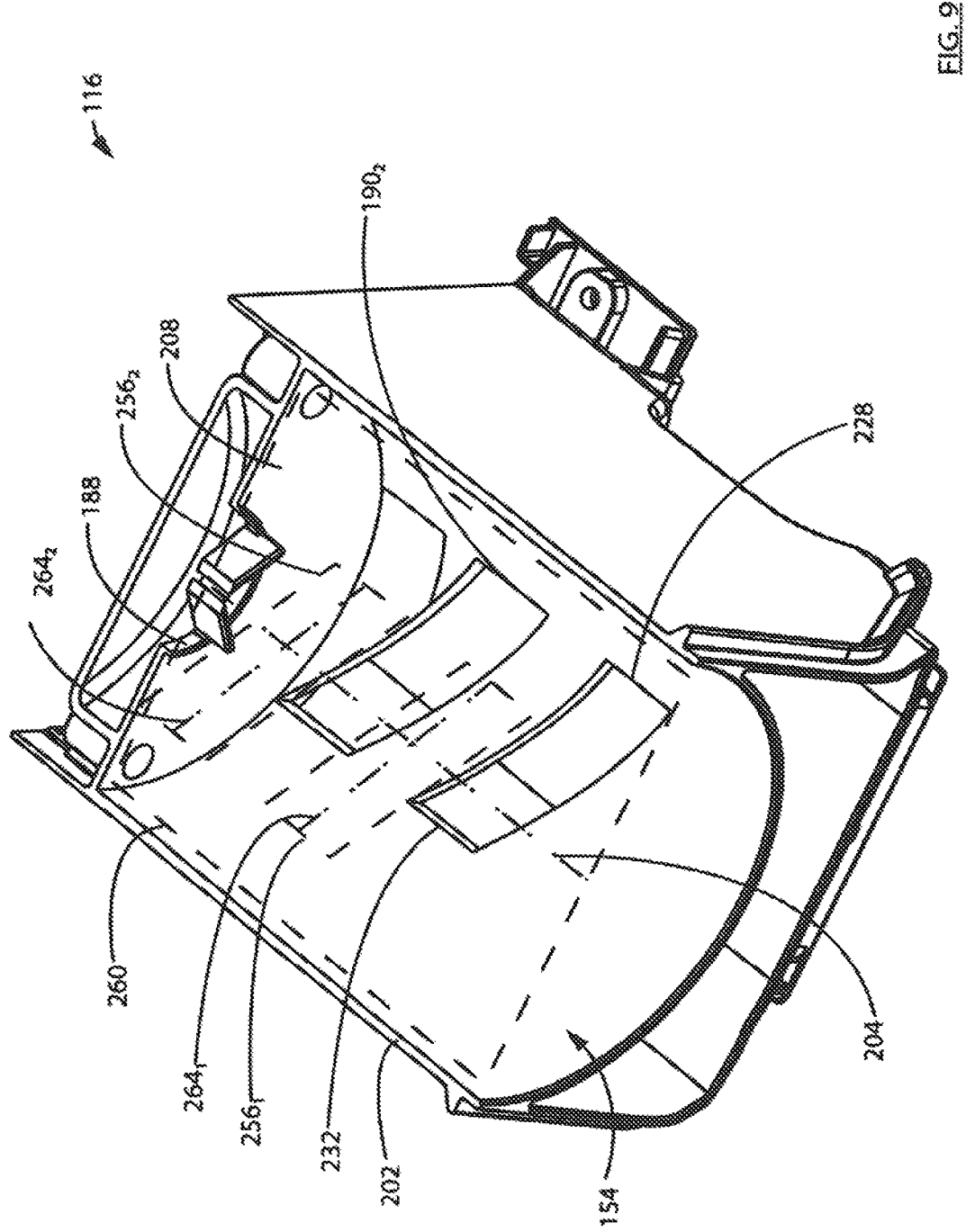

FIG. 5 shows an example in which projections 256 (and projected axes 264) are substantially perpendicular to cyclone longitudinal axis 204. FIGS. 8-9 show an example in which projections 256 (and projected axes 264) are not perpendicular. For example, projected axes 264 may be up to 30 or 45° from perpendicular with longitudinal axis 204.

FIG. 8 shows dirt outlet regions 190 having a helical orientation, which may be aligned with the cyclonic air flow path through cyclone chamber 154. As shown, each dirt outlet region 190 has an upstream end 228 located towards cyclone first end 206 relative to its downstream end 232. An advantage of this design is that it can allow a greater portion of the area of dirt outlet region regions 190 to extend continuously along a portion of the cyclonic air flow path in cyclone chamber 154.

FIG. 9 shows dirt outlet regions 190 having a helical orientation, which may be transverse (e.g. opposed to, misaligned, or counter-aligned) with the cyclonic air flow path through cyclone chamber 154. For example, if the cyclonic air flow path 212 from cyclone air inlet 184 is counterclockwise when viewed from cyclone first end 206 looking towards cyclone second end 208 as illustrated in FIG. 4, then one or both of dirt outlet regions 190 may extend clockwise from their outlet upstream end 228 to their outlet downstream end 232 as seen in FIG. 9 (or vice versa). An advantage of a transversely oriented dirt outlet 190 is that it may intersect several turns of the cyclone air flow path, which may expose the dirt outlet 190 to dirt particles having a wider range of residency time and particle velocities in the cyclonic flow. This may allow particles of different sizes sufficient time to separate from the air flow and make contact with cyclone sidewall 202. This design may also permit the dirt outlet region 190 to provide an effective exit for a wider range of air flow rates. Further, where the air flow path within cyclone 152 reverses direction at cyclone second end 208 to travel towards cyclone air outlet 188 (e.g. through cyclone chamber outlet passage 192, see FIG. 2) this design may align the dirt outlet region 190 with the reversed portion of the air flow path (i.e. the 'counter-flow' portion of the air flow path).

Figure 10:
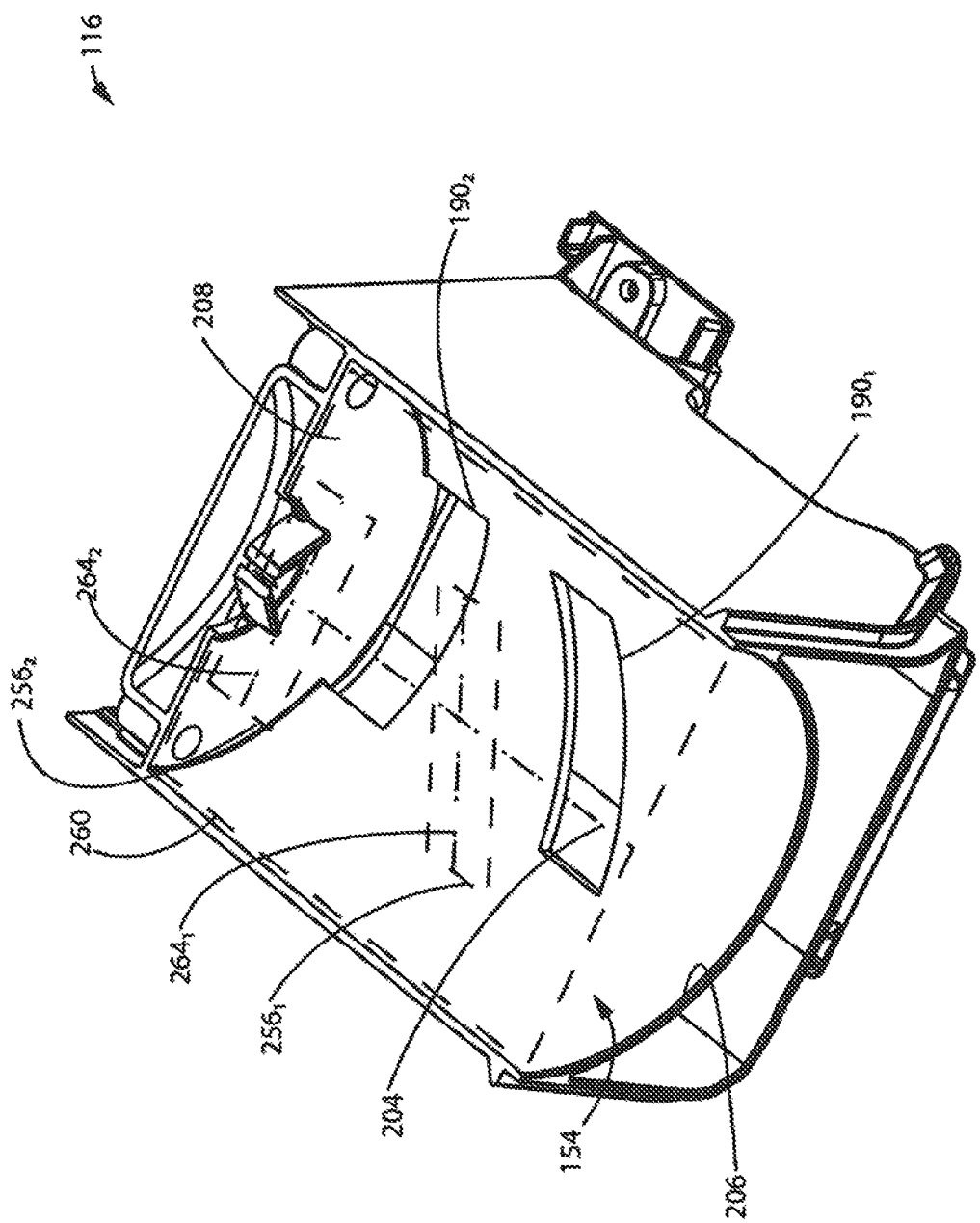
Figure 11:
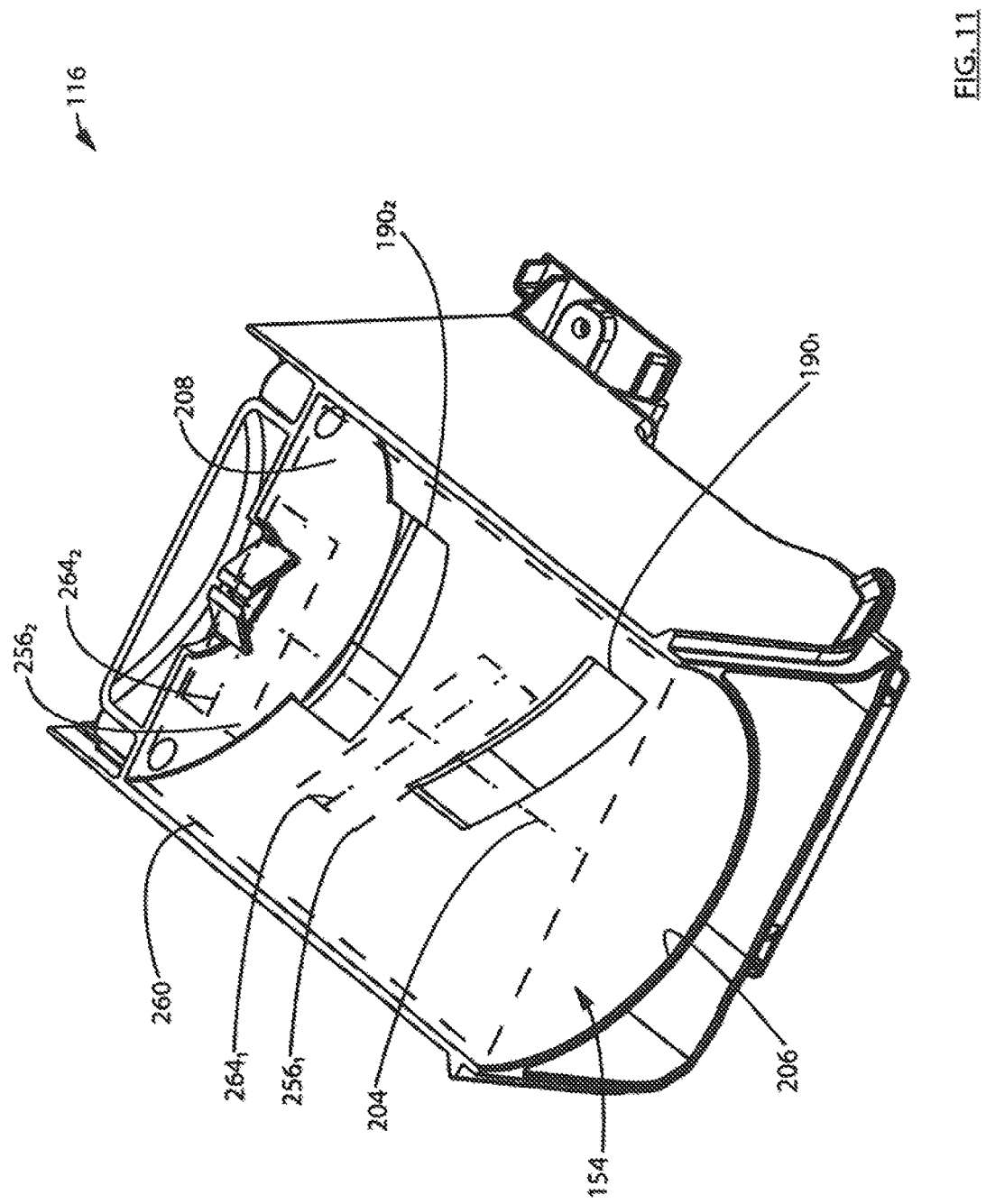

FIGS. 10 and 11 illustrate examples in which dirt outlet region $190_1$ is oriented differently from dirt outlet region $190_2$. As shown, one of dirt outlet regions 190 may have a radial projection 256 (and projected axis 264) that is substantially perpendicular to cyclone longitudinal axis 204, and one of dirt outlet regions 190 may have a radial projection 256 (and projected axis 264) that is transverse but not perpendicular to longitudinal axis 204. The illustrated examples show second dirt outlet region $190_2$ having a radial projection $256_2$ (and projected axis $264_2$) that is substantially perpendicular to cyclone longitudinal axis 204, and first dirt outlet region $190_1$ having a helical orientation. An advantage of this design is that it allows first dirt outlet region $190_1$ to be positioned and oriented to provide an effective dirt outlet for lower air flow rates, while second dirt outlet region $190_2$ is bordered by cyclone second end 208 for discharging dirt that passes first dirt outlet region $190_1$ and piles against cyclone second end 208. In FIG. 10, first dirt outlet region $190_1$ is illustrated with a helical orientation aligned with the cyclonic air flow path through cyclone chamber 154. In FIG. 11, first dirt outlet region $190_2$ is illustrated with a helical orientation that is transverse (e.g. opposed, misaligned, or counter-aligned) to the cyclonic air flow path through cyclone chamber 154.

Figure 12:
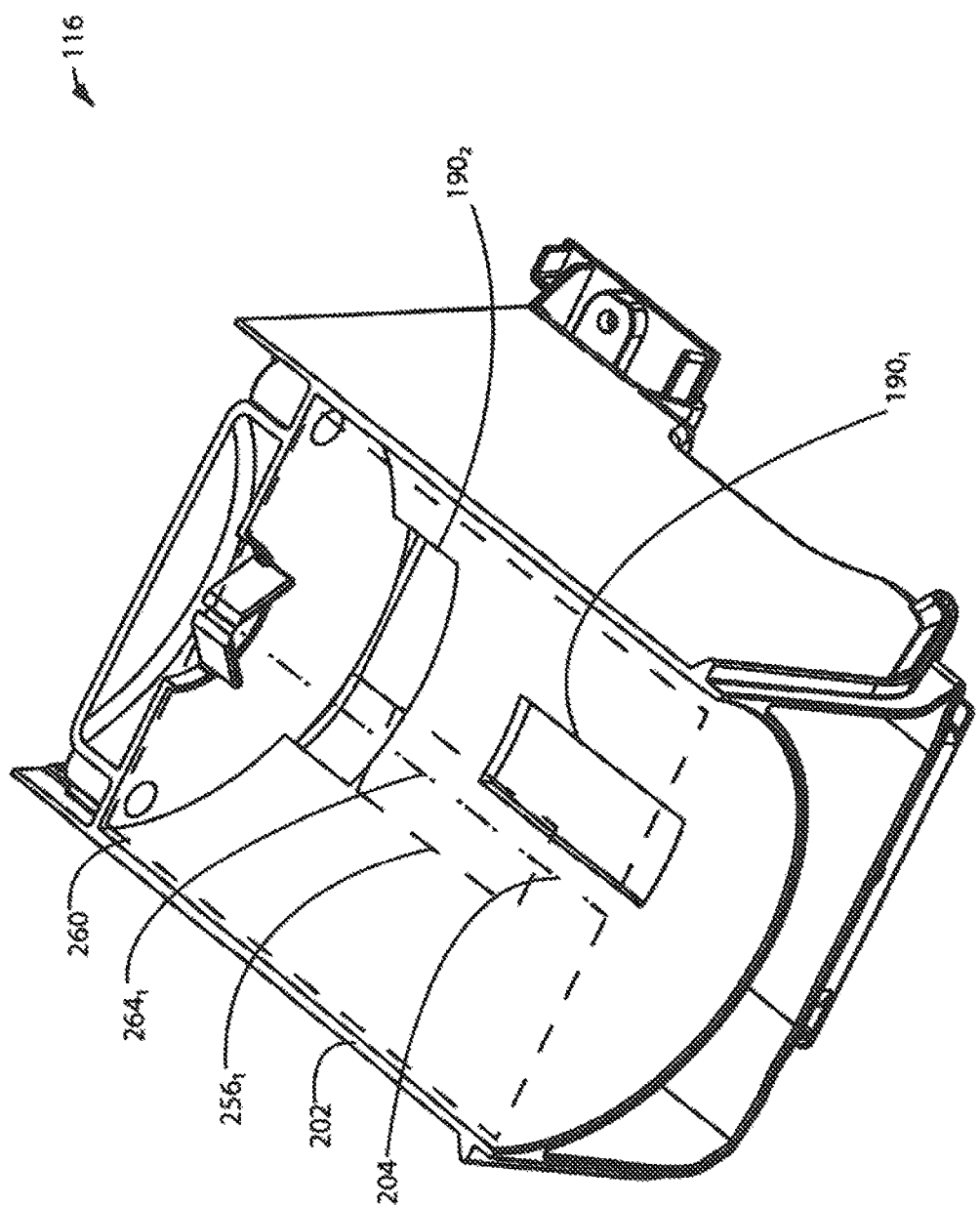

Reference is now made to FIG. 12. In some embodiments, first dirt outlet region $190_1$ may have a long direction that may be oriented parallel (e.g. ±15° of parallel) with cyclone longitudinal axis 204. An advantage of this design it that is can allow first dirt outlet region $190_1$ to intersect several turns of the cyclone air flow path. This allows dirt outlet region $190_1$ to provide an exit for dirt particles that have experienced a wider range of residency time and particle velocities in the cyclonic flow. In turn, this may allow particles of different sizes sufficient time to separate from the air flow and make contact with cyclone sidewall 202. This design may also permit the dirt outlet region 190 to provide an effective dirt outlet for a wider range of air flow rates. As shown, first dirt outlet region $190_1$ may have a radial projection $256_1$ (and projected axis $264_1$) that is parallel to cyclone longitudinal axis 204.

Figure 13:
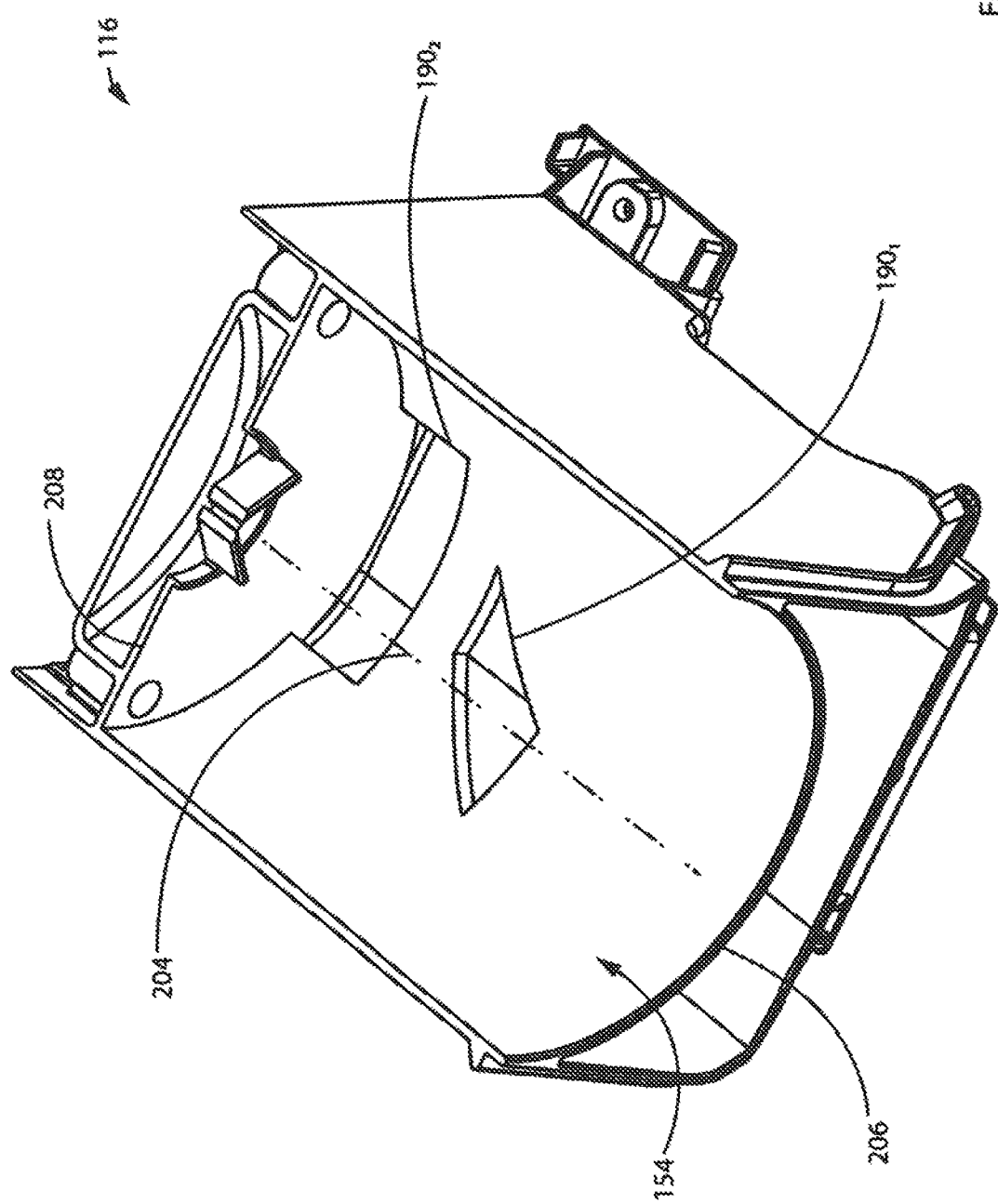

FIG. 13 shows an embodiment in which the long direction of first dirt outlet region $190_1$ has an orientation that is between a transverse and a parallel orientation relative to cyclone longitudinal axis 204. Such an orientation may provide a balance between (i) providing some degree of alignment with the cyclonic air flow path through cyclone chamber 154 in one of the forward direction (i.e. from cyclone first end 206 towards cyclone second end 208) or the reverse direction (i.e. from cyclone second end 208 towards cyclone first end 206), and (ii) exposing the dirt outlet $190_2$ to several turns of the cyclonic air flow path.

Figure 14:
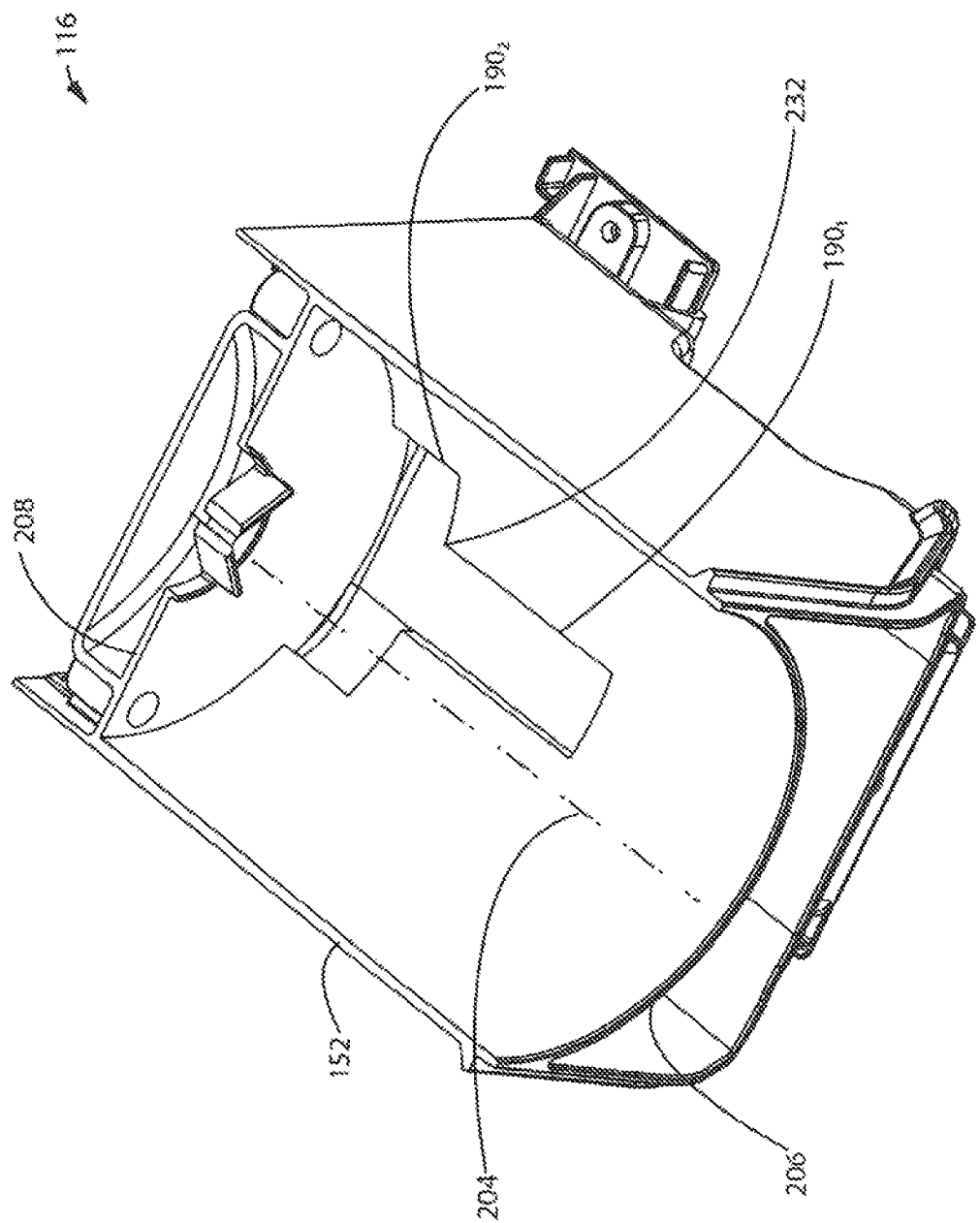
Figure 16:
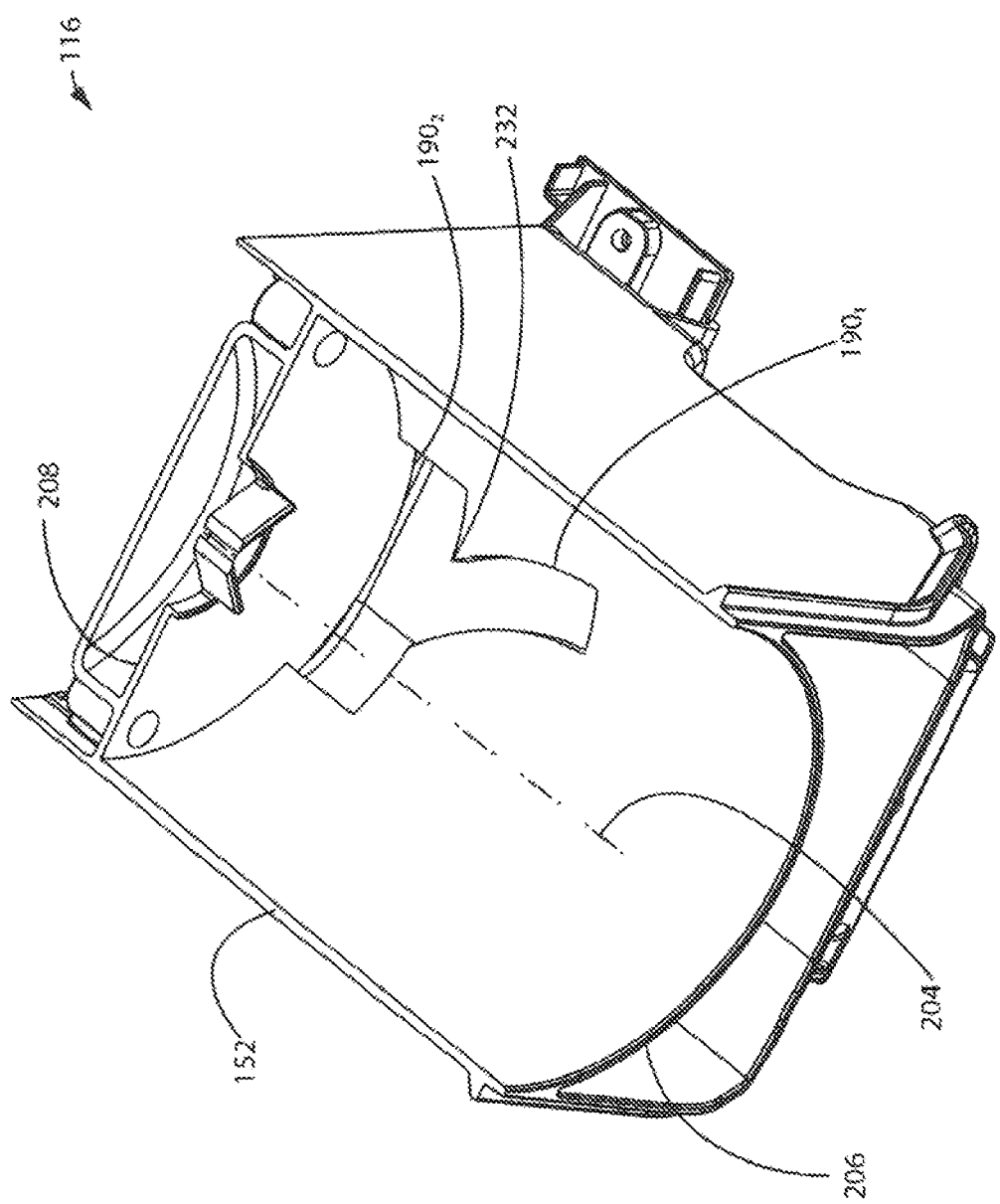

Reference is now made to FIGS. 14-16. As shown, some embodiments of cyclone 152 may have first dirt outlet region $190_1$ contiguous with second dirt outlet $190_2$. Accordingly, as opposed to, e.g., FIG. 13 wherein two discrete outlet slots are provided, a single outlet slot or opening or gap in the sidewall may be provided which comprises two or more dirt outlet regions. An advantage of this design is that it may provide, where the first and second dirt outlet regions $190_1$ and $190_2$ meet, an outlet region having a large outlet width and length, which can accommodate especially large dirt particles. In the illustrated example, the first and second dirt outlet regions $190_1$ and $190_2$ have different orientations relative to cyclone longitudinal axis 204. As shown, first dirt outlet region $190_1$ may have a downstream end 232 that is connected to second dirt outlet region $190_2$. Downstream end 232 may be positioned towards cyclone second end 208 relative to cyclone first end 206. This may provide the combination of dirt outlet regions $190_1$ and $190_2$ with a "T-shape" configuration. As shown in FIG. 14, first dirt outlet region $190_1$ may be oriented substantially parallel to cyclone longitudinal axis 204. As shown in FIGS. 15-16, first dirt outlet region $190_1$ may have a curved shape that is oriented neither parallel nor perpendicular to cyclone longitudinal axis 204.

Figure 17:
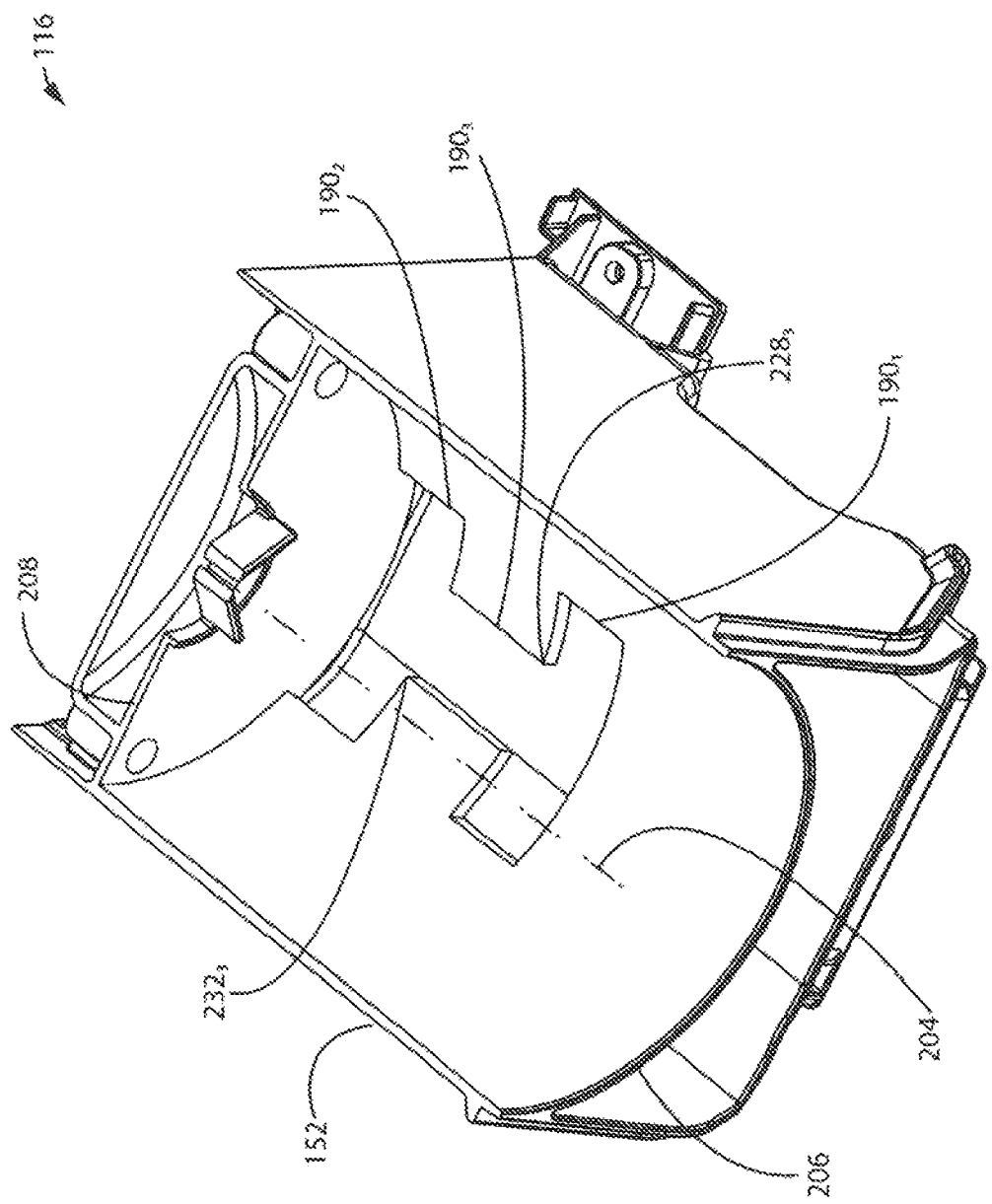
Figure 18:
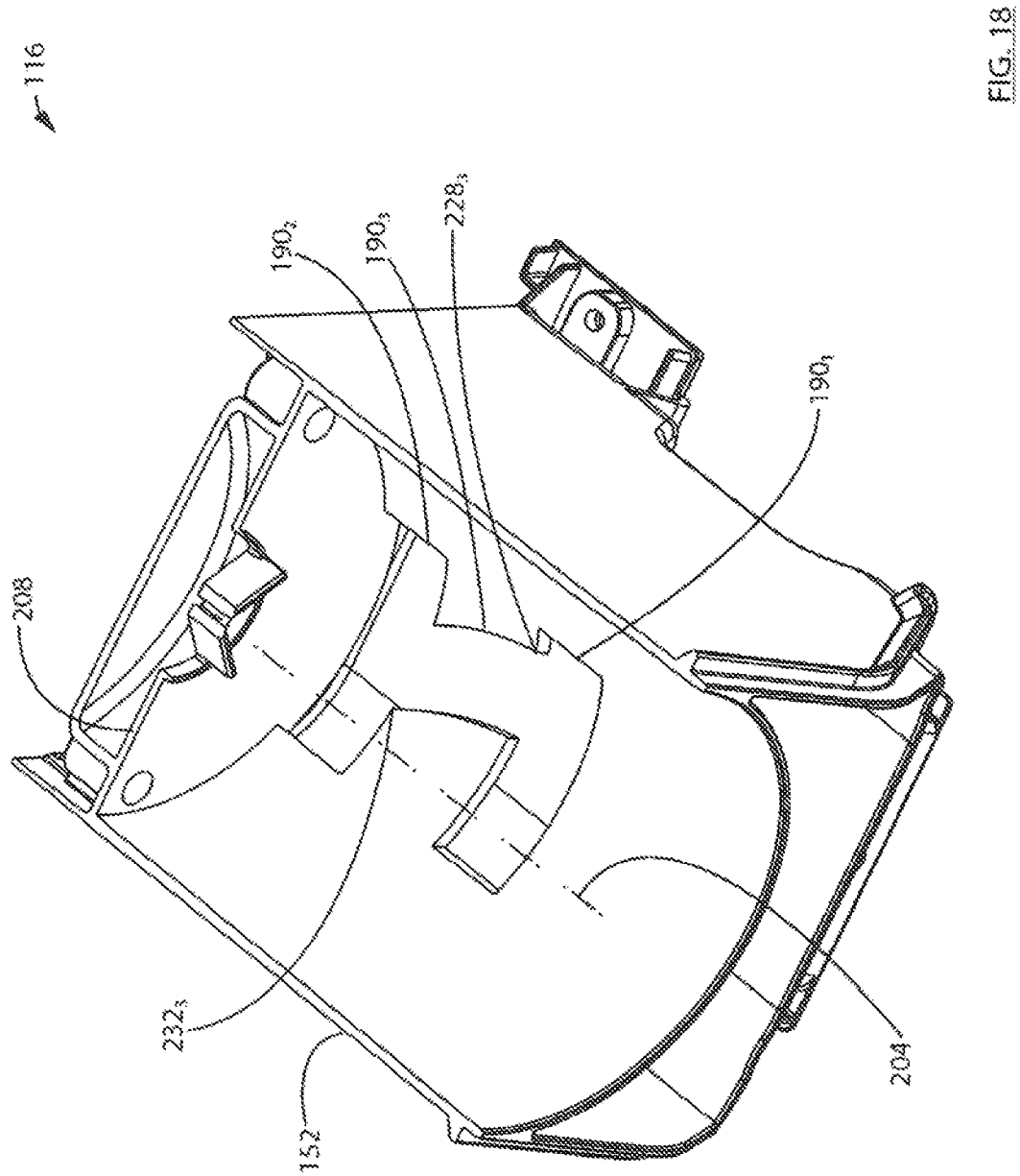
Figure 19:
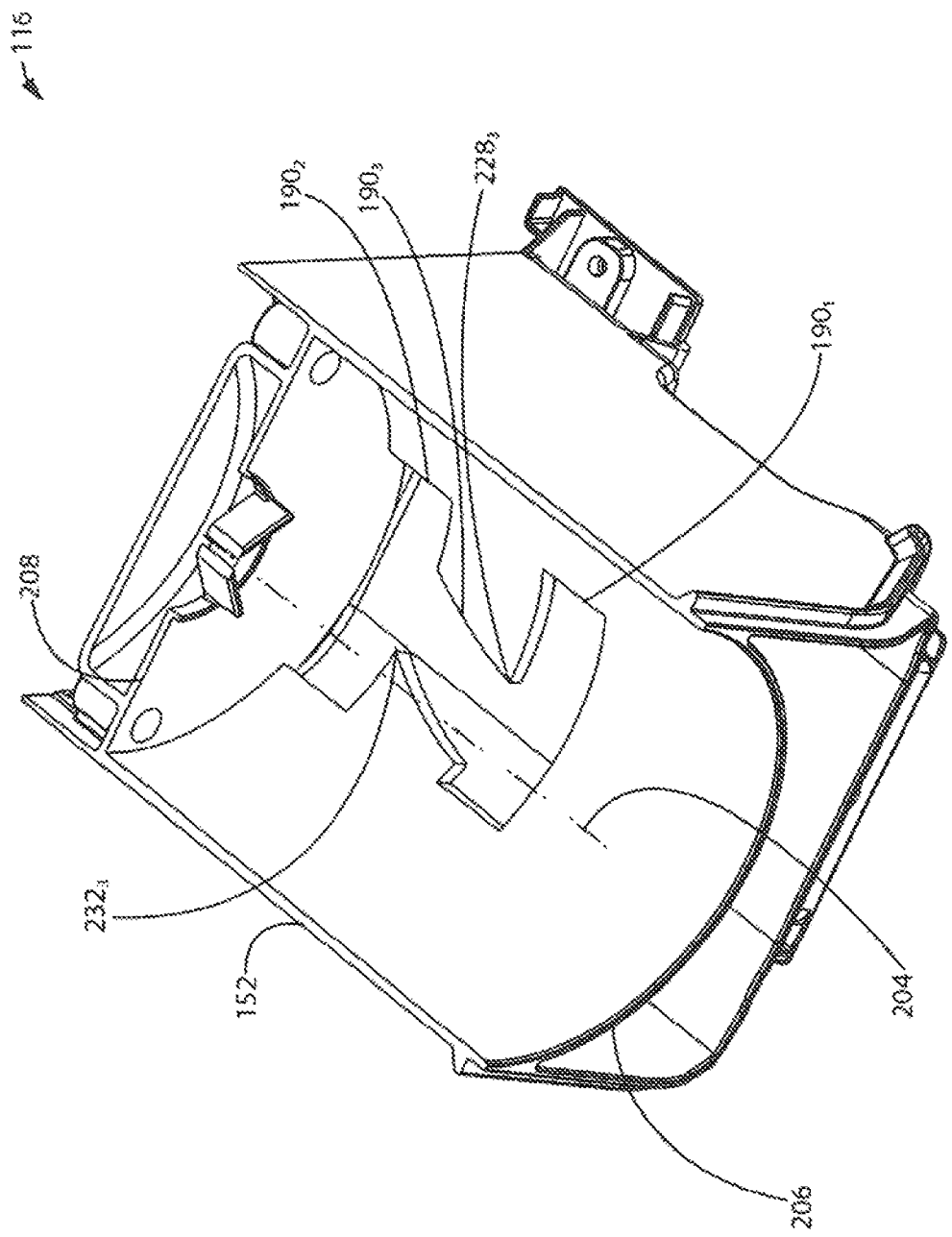

Referring to FIGS. 17-19, cyclone 152 may have three dirt outlet regions 190 in some embodiments. As shown, third dirt outlet region $190_3$ may be oriented transverse to first and second dirt outlet regions $190_1$ and $190_2$. First and second dirt outlet regions $190_1$ and $190_2$ may be oriented the same (as shown), or differently from each other. An advantage of this design is that it may permit (i) first dirt outlet region $190_1$ to be oriented best to provide an exit for dirt particles when operating at low air flow rates, (ii) second dirt outlet region $190_2$ to provide an exit for particles that reach cyclone second end 208, and (iii) third dirt outlet region $190_3$ to interact with several turns of the cyclonic air flow path, which as discussed above may provide an exit for dirt particles that have experienced a wider range of residency time and particle velocities in the cyclonic flow, allow particles of different sizes sufficient time to separate from the air flow and make contact with cyclone sidewall, and/or provide an effective dirt outlet for a wider range of air flow rates.

As shown, the combination of dirt outlet regions $190_1$, $190_2$, $190_3$ may have an "H-shape" or "N-shape" configuration. In the illustrated embodiment, third dirt outlet region $190_3$ is contiguous with first and second dirt outlets $190_1$ and $190_2$. As exemplified, third dirt outlet $190_3$ has an upstream end $228_3$ connected to first dirt outlet region $190_1$, and a downstream end $232_3$ connected to second dirt outlet region $190_2$. In alternative embodiments, third dirt outlet region $190_3$ may be spaced apart from (e.g. discontiguous with) one or both of first and second dirt outlet regions $190_1$, $190_2$ such that two or 3 discrete outlets are provided. FIG. 17 shows an example in which third dirt outlet region 190₃ is oriented parallel to cyclone longitudinal axis 204. FIGS. 18-19 show examples in which third dirt outlet region 190₃ is oriented non-parallel to cyclone longitudinal axis 204 (e.g. neither perpendicular nor parallel to cyclone longitudinal axis 204, as shown).

In other embodiments, first dirt outlet region 190₁ may be spaced apart from (e.g. discontiguous with) second dirt outlet 190₂, as illustrated in the examples of FIGS. 3-13.

Referring to FIG. 4, any or all of dirt outlet regions 190 may be formed in cyclone sidewall 202. For example, a dirt outlet 190 may include an aperture (e.g. hole or slot) in cyclone sidewall 202 that allows separated dirt particles to exit cyclone chamber 154 towards dirt collection chamber 156. In the illustrated example, dirt outlet regions 190 are formed in a portion of cyclone sidewall 202 that is common to dirt collection chamber 156. An advantage of this design is that it provides the shortest travel distance from dirt outlet 190 to dirt collection chamber 156, which may mitigate dirt particles collecting in an intervening passage. However, in alternative embodiments dirt outlet region 190 may provide an entrance to a passage leading to dirt collection chamber 156. This may provide greater flexibility in the location of dirt collection chamber 156 relative cyclone chamber 154, such as to optimize apparatus 100 for compactness. Embodiments having a dirt outlet passage are discussed below.

Figure 20:
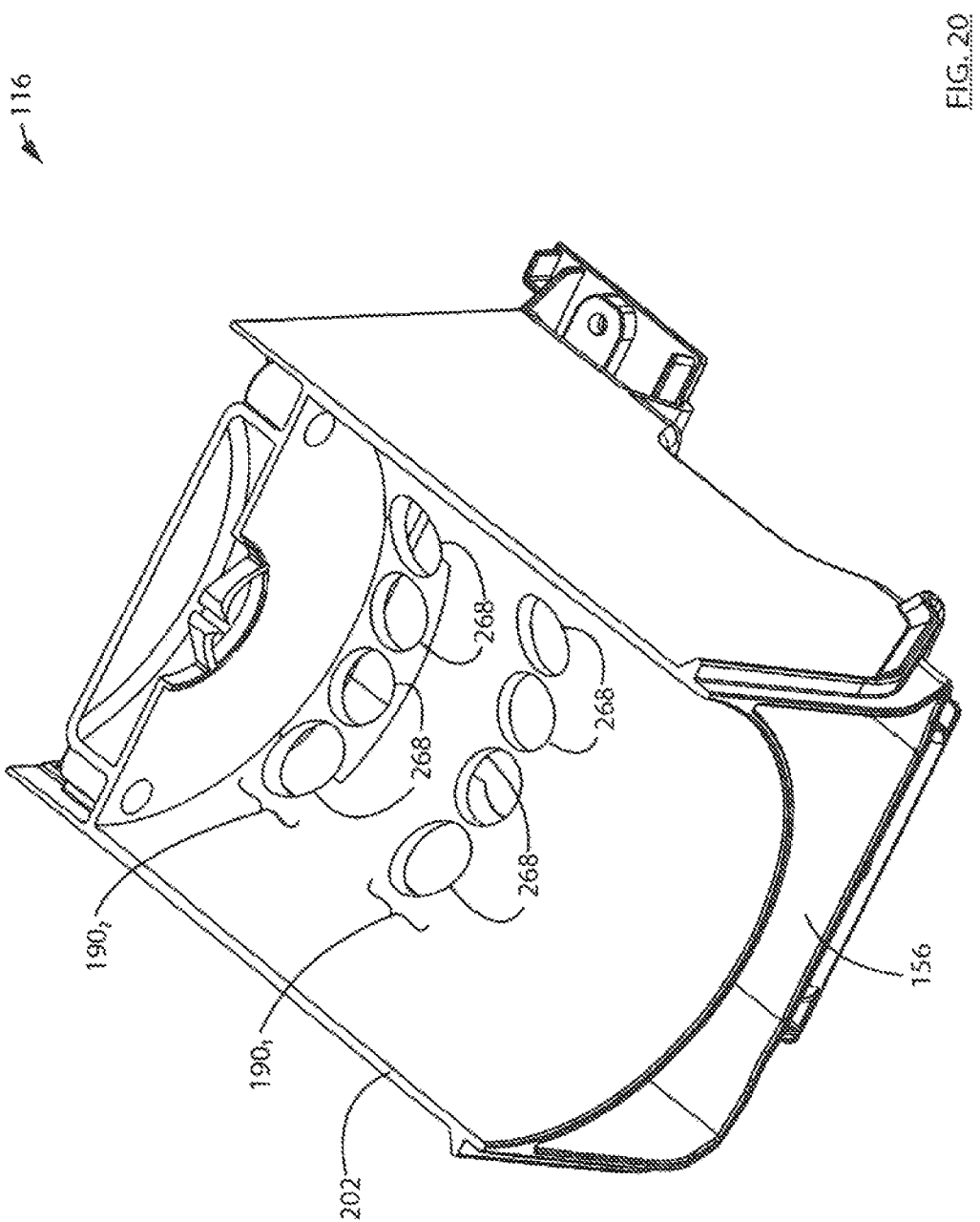

FIG. 4 shows an example in which dirt outlet regions 190 are formed as slots in cyclone sidewall 202 (e.g., an open having a long dimension that extends circumferentially around a portion of the sidewall). As shown in FIG. 20, a dirt outlet region 190 may be formed as an array of 4 or more closely arranged discrete apertures 268 that collectively define the dirt outlet region 190. As compared to a slot, an array of apertures 268 may provide many smaller apertures that are discontiguous with each other. This may help to reduce the amount of the air flow which diverts into dirt collection chamber 156, which in turn may reduce the backpressure and re-entrainment of collected dirt that can result from such divergence. A dirt outlet region 190 may be composed of an array of 4 or more (e.g., 5, 6, 7, 8, 9 or 10) closely arranged apertures 268 organized in any pattern. In the illustrated embodiment, each dirt outlet region 190 is formed as 4 equally sized apertures 268 arranged linearly in a single row. In other embodiment, each dirt outlet region 190 may be formed from more than 4 apertures, which may be the same or differently sized, and which may be arranged in one or many rows (or in a different non-linear pattern). It is expressly contemplated that any embodiment described or shown herein as a slot may also be formed in another embodiment as an array of apertures.

Cyclonic Air Treatment Member with a Plurality of Apertures

Embodiments herein relate to an improved cyclonic air treatment member that may have a plurality of small dirt outlets, which may be referred to as "apertures" or "perforations". The features in this section may be used by themselves in any surface cleaning apparatus or in any combination or sub-combination with any other feature or features described herein. For example, a cyclone may have a plurality of apertures as well as one or more slots as described herein. If a combination of a slot and apertures are used, the apertures may be provided in one or more group of apertures, and one or more groups of apertures may be provided at or proximate a location of the slot or spaced therefrom. If a combination of slots and apertures are used, the apertures may be provided in one or more group of apertures, and one or more groups of apertures may be provided at or proximate a location of each slot or spaced therefrom. For example, a group of apertures may be positioned between a pair of spaced apart slots. Alternately, a cyclone may have only a plurality of apertures as the dirt outlet.

Figure 21:
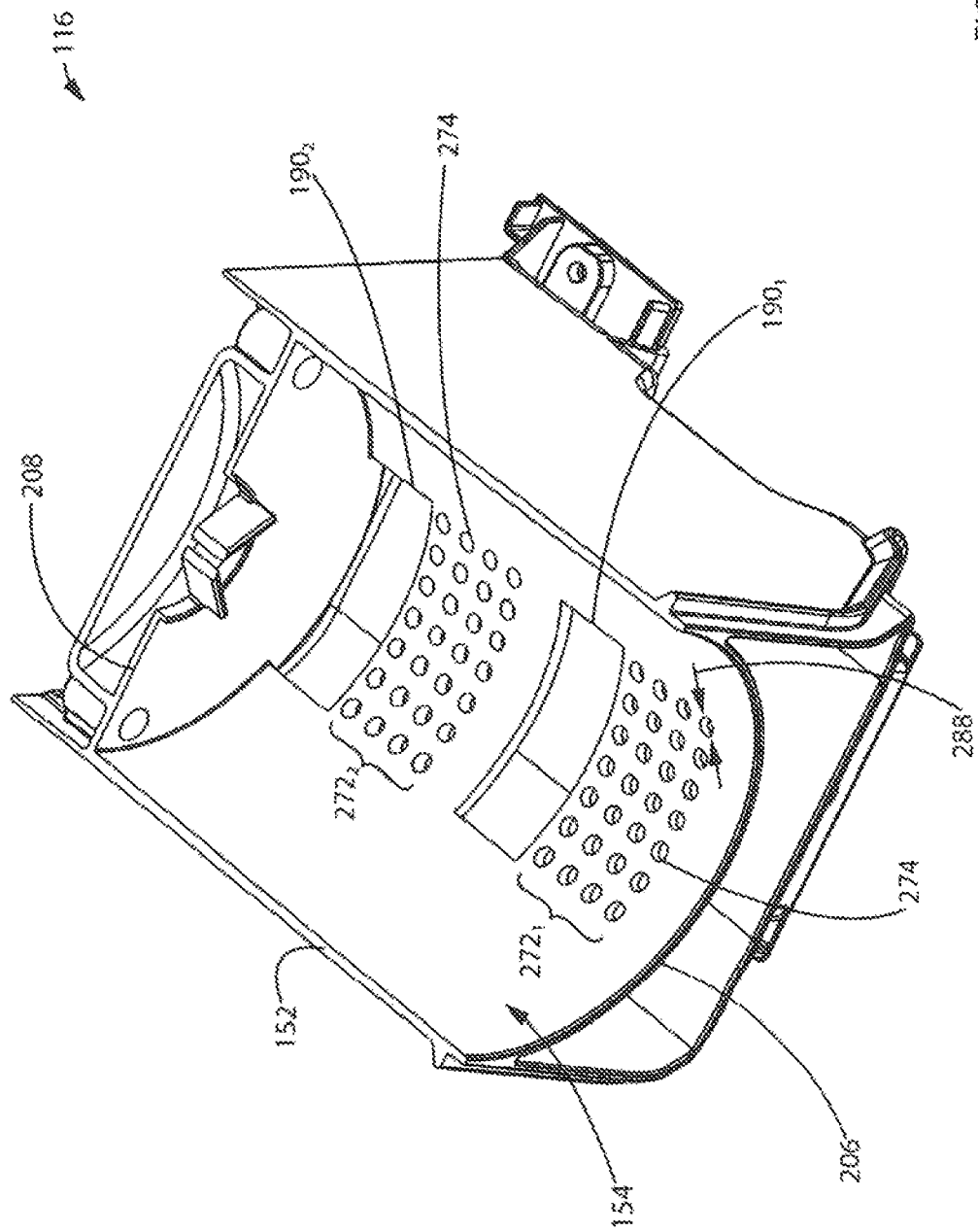
Figure 22:
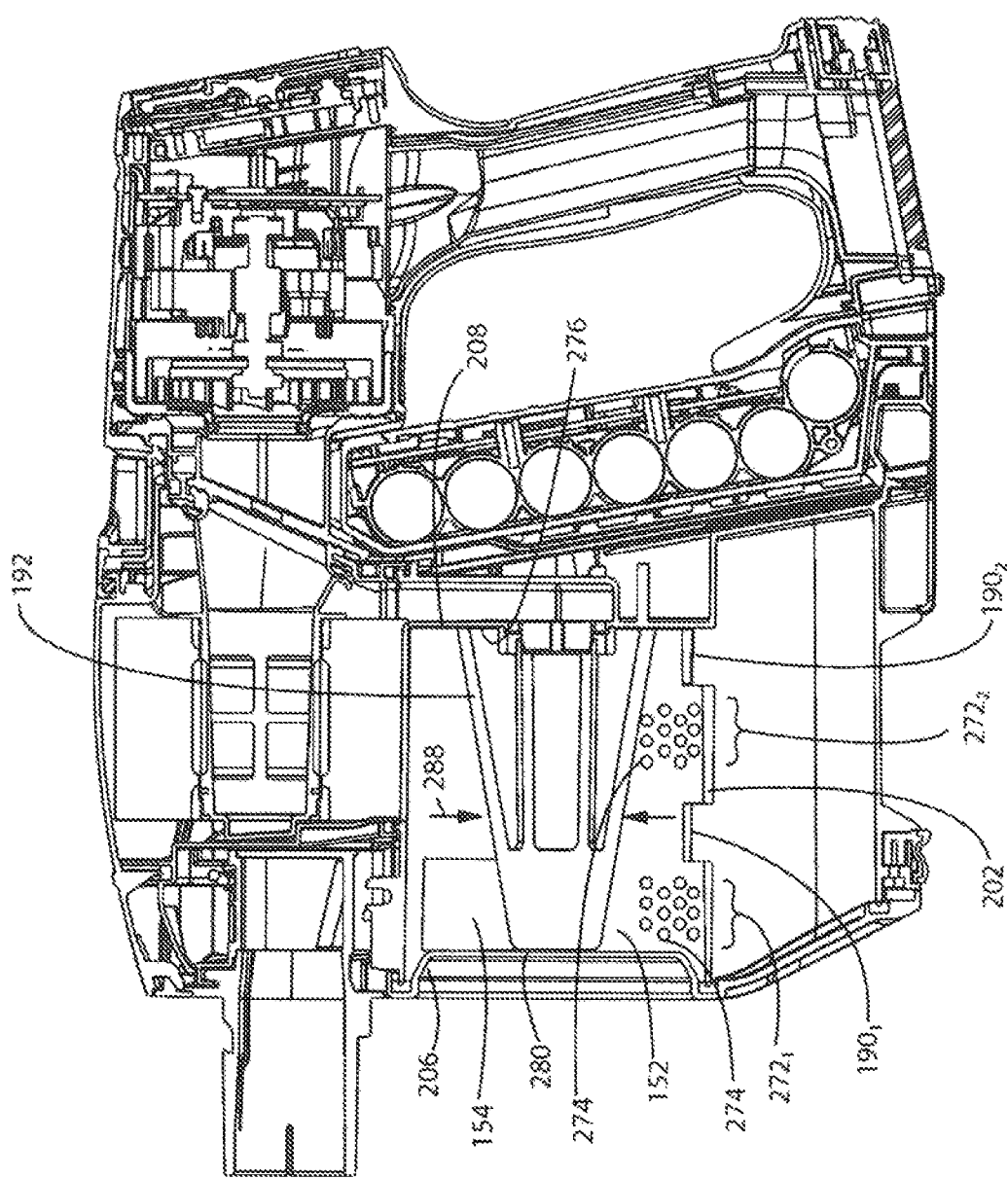
FIG. 22 is a cross-sectional view taken along line 2-2 in FIG. 1, in accordance with another embodiment.
Figure 23:
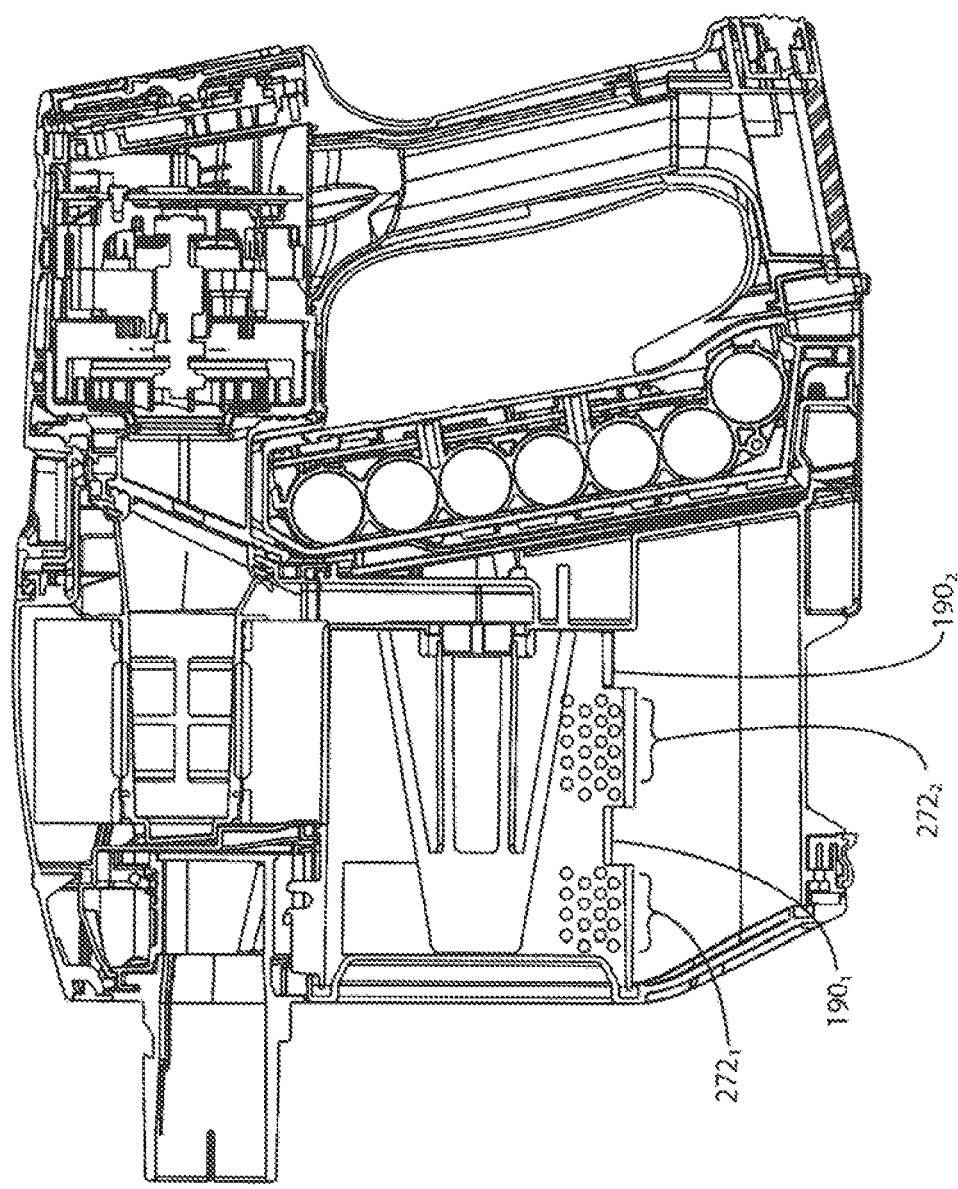
FIG. 23 is a cross-sectional view taken along line 2-2 in FIG. 1, in accordance with another embodiment.

As exemplified in FIGS. 21-22, in some embodiments cyclone 152 includes one or more groups 272 of small apertures 274 (e.g. 10 or more apertures 274) adjacent one or more (or all) of dirt outlet regions 190. For example, a group 272 may be located towards cyclone first end 206 relative to the adjacent dirt outlet region 190 (e.g. upstream of the adjacent dirt outlet region 190). Aperture group 272 may provide an exit for small dirt particles which remain open in the event that the adjacent dirt outlet region 190 becomes clogged. As shown, each group 272 may be angularly aligned (e.g. circumferentially aligned) with its respective adjacent dirt outlet region 190. The illustrated embodiment shows a first group 272₁ of apertures adjacent dirt outlet region 190₁ and located between first dirt outlet region 190₁ and cyclone first end 206, and a second group 272₂ of apertures adjacent dirt outlet region 190₂ and located between second dirt outlet 190₂ and first dirt outlet 190₁. As shown, first group 272₁ may be axially spaced from first end 206 and second group 272₂ may be axially spaced from first dirt outlet 190₁. FIG. 23 shows an alternative embodiment in which second group extends from proximate second dirt outlet region 190₂ to proximate first dirt outlet 190₁.

Returning to FIG. 21, each aperture 274 may have a size (e.g. width, length, and/or area) that is substantially smaller than the associated adjacent dirt outlet region 190. In some embodiments, aperture 274 may have a width 288 of between 0.10 inches to 0.20 inches. This may provide a size that accommodates most small dirt particles collected in domestic (e.g. residential and commercial) environments. More generally, apertures 274 may each have a width 288 of between 0.010 inches and 0.500 inches. Apertures 274 having a width 288 of between 0.010 inches and 0.10 inches may provide exits suitable for very fine particles, and may minimize the amount of the air flow that diverts from the cyclone chamber 154 through apertures 274. Apertures 274 having a width 288 of between 0.20 inches and 0.50 inches may provide exits suitable for relatively larger particles, although somewhat more of the air flow may divert from cyclone chamber 154 through apertures 274. This may provide an acceptable trade-off where the dirt particles targeted for collection by apparatus 100 tend to be larger.

As exemplified in FIGS. 72-79, in some embodiments, the cyclone chamber 154 may include dirt outlet that is a group of small apertures 272. It will be appreciated that there may be any number of apertures 274 in the group of apertures 272. For example, the group of apertures 272 may have 10, 20, 30, or more apertures 274. As exemplified, the group of small apertures 272 may be in communication with the dirt collection chamber 156 such that a separate dirt outlet region 190 is not needed to transfer dirt from the cyclone chamber 154 to the dirt collection chamber 156. It will be appreciated that by using only apertures as the dirt outlet, larger dirt particles and elongate material (e.g., hair) will be retained in the cyclone chamber 154. Accordingly, cyclone chamber 154 may function as a dirt collection chamber provided that screen 197 has openings therein which inhibit dirt remaining in cyclone chamber 154 from exiting via the cyclone air outlet.

As described previously, it will be appreciated that the group of apertures 272 may be positioned anywhere within the cyclone chamber 154. For example, the apertures 274 may be positioned at the cyclone air outlet end of the cyclone chamber 154. The cyclone air outlet end may be provided at the cyclone second end 206, while the cyclone air inlet may be provided at the cyclone first end 208.

In some embodiments, as described previously, the apertures 274 may be provided in a lower portion of the cyclone sidewall. Positioning the apertures 274 in the lower portion of the cyclone sidewall may allow gravity to assist with the removal of dirt from the cyclone chamber 154. As exemplified in FIGS. 72-79, the dirt collection chamber 156 may underlie the cyclone chamber 154, such that particles that exit the cyclone chamber 154 by passing through the cyclone sidewall 202, through the apertures 274, and into the dirt collection chamber or chambers 156 that may underlie the cyclone chamber 152.

In some embodiments, the surface cleaning apparatus 100 may include a second stage cyclone $152_2$ downstream from the first stage cyclone $152_1$. It will be appreciated that each of the cyclone stages may include one or more cyclones in series and/or in parallel. The first stage cyclone $152_1$ may be in communication with the second stage cyclone $152_2$ such that air exits the first stage cyclone $152_1$ and enters the second stage cyclone chamber $154_2$ of the second stage cyclone $152_2$.

As described previously, the surface cleaning apparatus 100 may have a dirt collection chamber 156. In some embodiments, the dirt collection chamber 156 may collect dirt from one or more cyclones of a single cyclonic stage or different cyclonic stages. For example a dirt chamber 156 may collect dirt from the first stage cyclone $152_1$ and the second stage cyclone $152_2$. Alternately, each cyclonic stage may have one or more dirt collection chambers. For example, as exemplified in FIGS. 72-79, a surface cleaning apparatus may have two or more cyclonic stages, each of which comprises one or more cyclones and one or more dirt collection chambers 156. As exemplified, the first stage cyclone $152_1$ is in communication with a first dirt collection chamber $156_1$ and the second stage cyclone $152_2$ is in communication with a second dirt collection chamber $156_2$. As exemplified, the dirt collection chambers $156_1$ and $156_2$ are external to the cyclone chambers.

Figure 75:
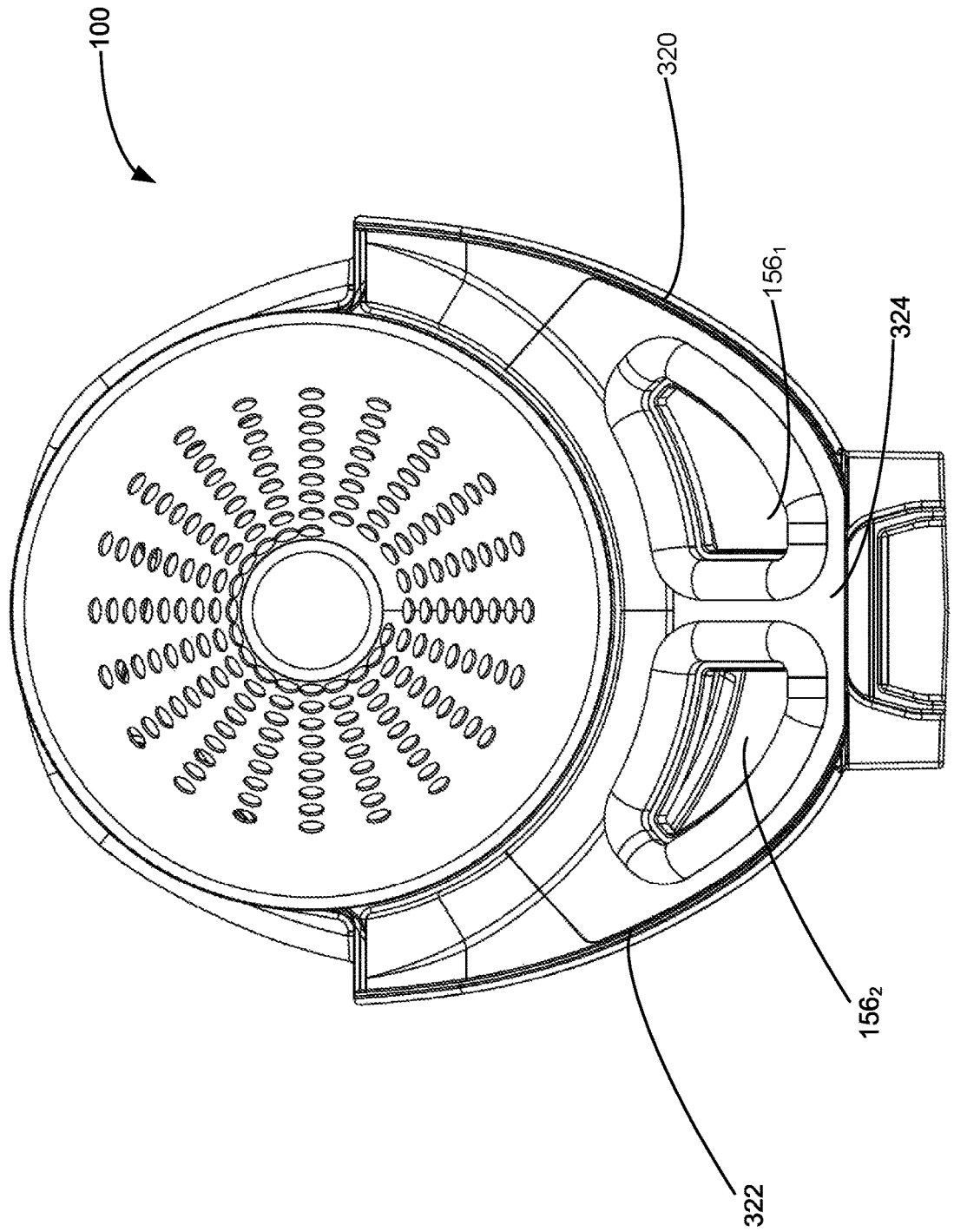
FIG. 75 is a front view of the openable portion of the surface cleaning apparatus of FIG. 72
Figure 76:
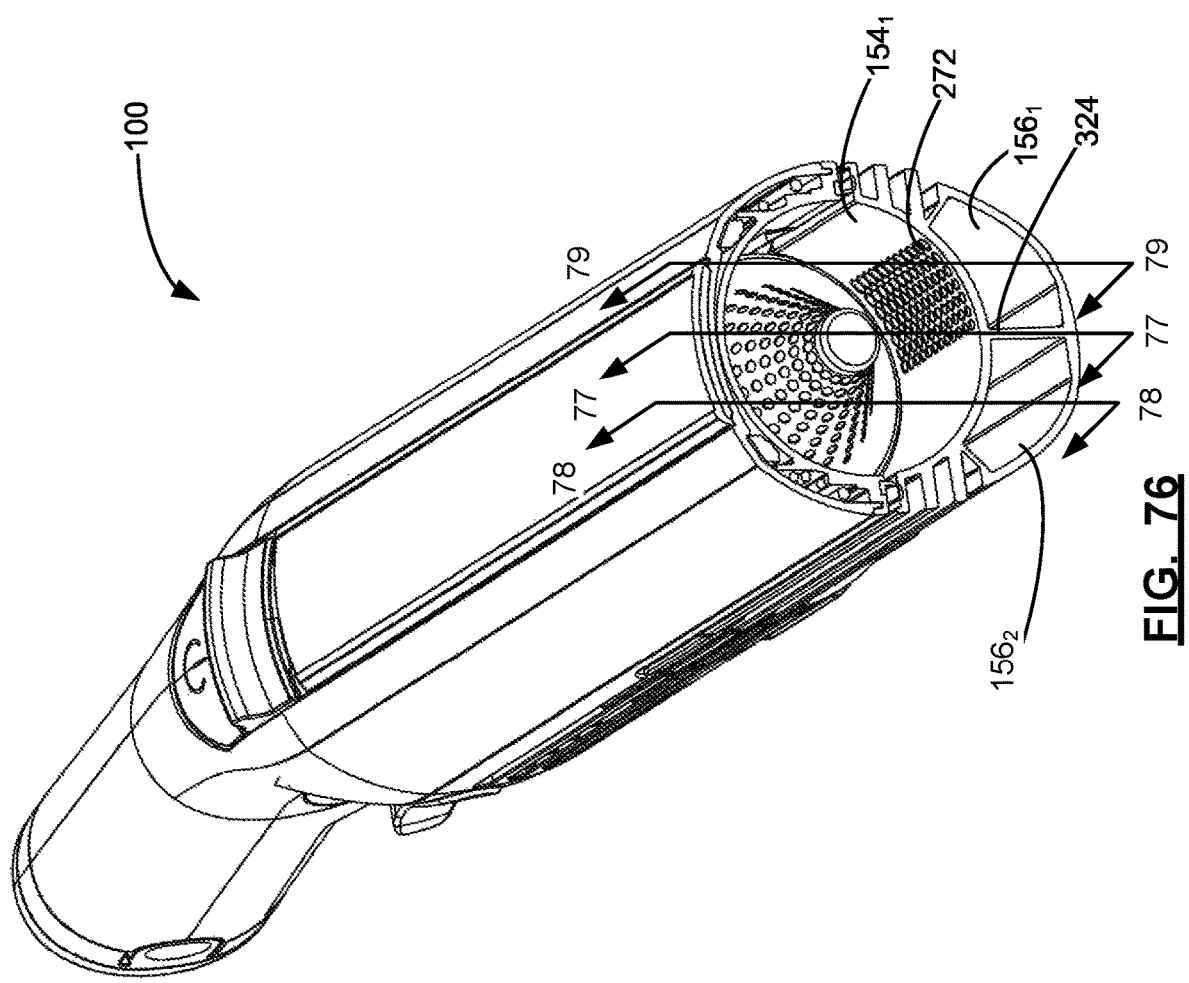
FIG. 76 is a cross-sectional perspective view of the surface cleaning apparatus of FIG. 72, sectioned along line 76-76 in FIG. 73, with the openable portion closed.
Figure 77:
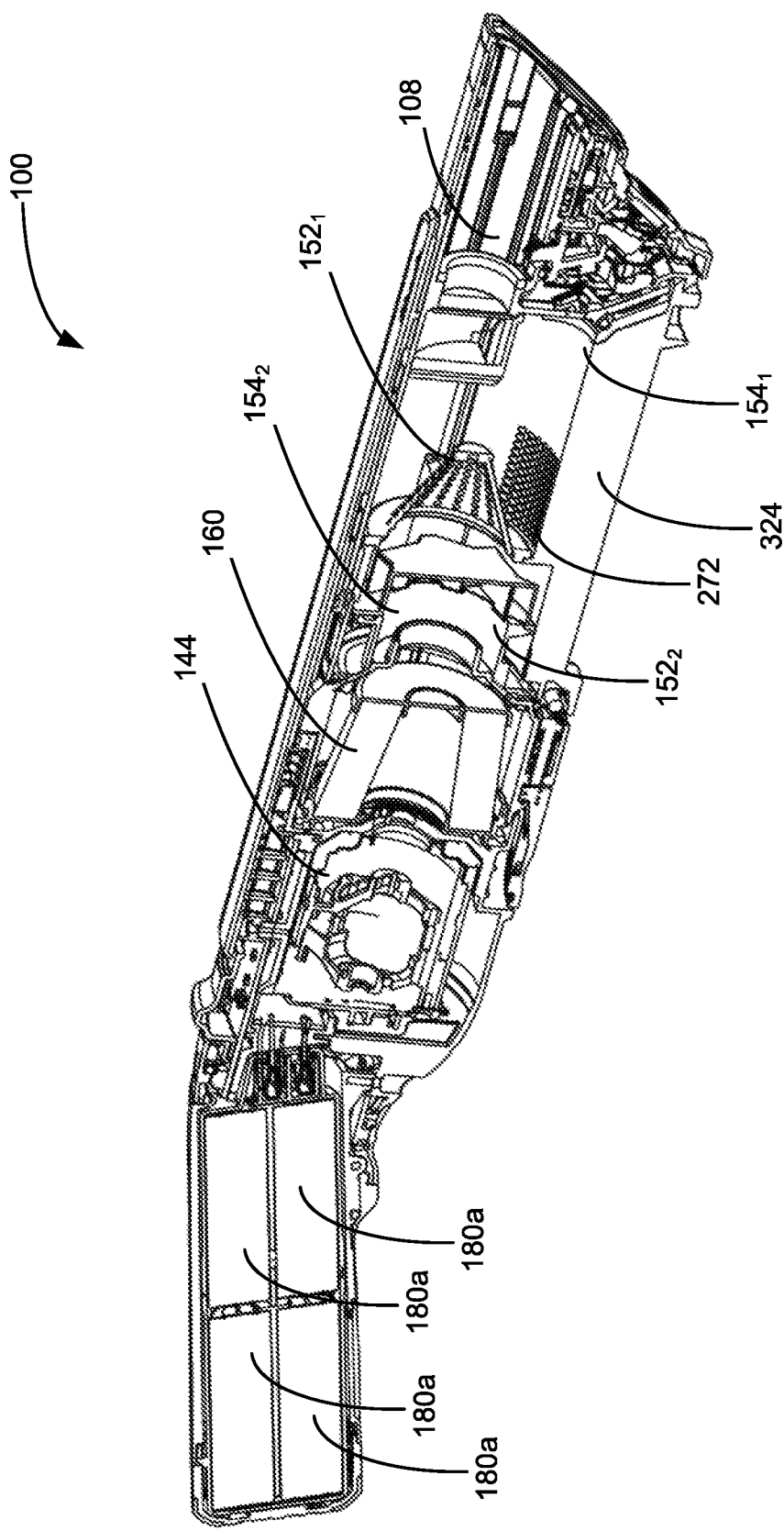
FIG. 77 is a cross-sectional perspective view of the surface cleaning apparatus of FIG. 72, sectioned along line 77-77 in FIG. 76, with the openable portion closed.
Figure 78:
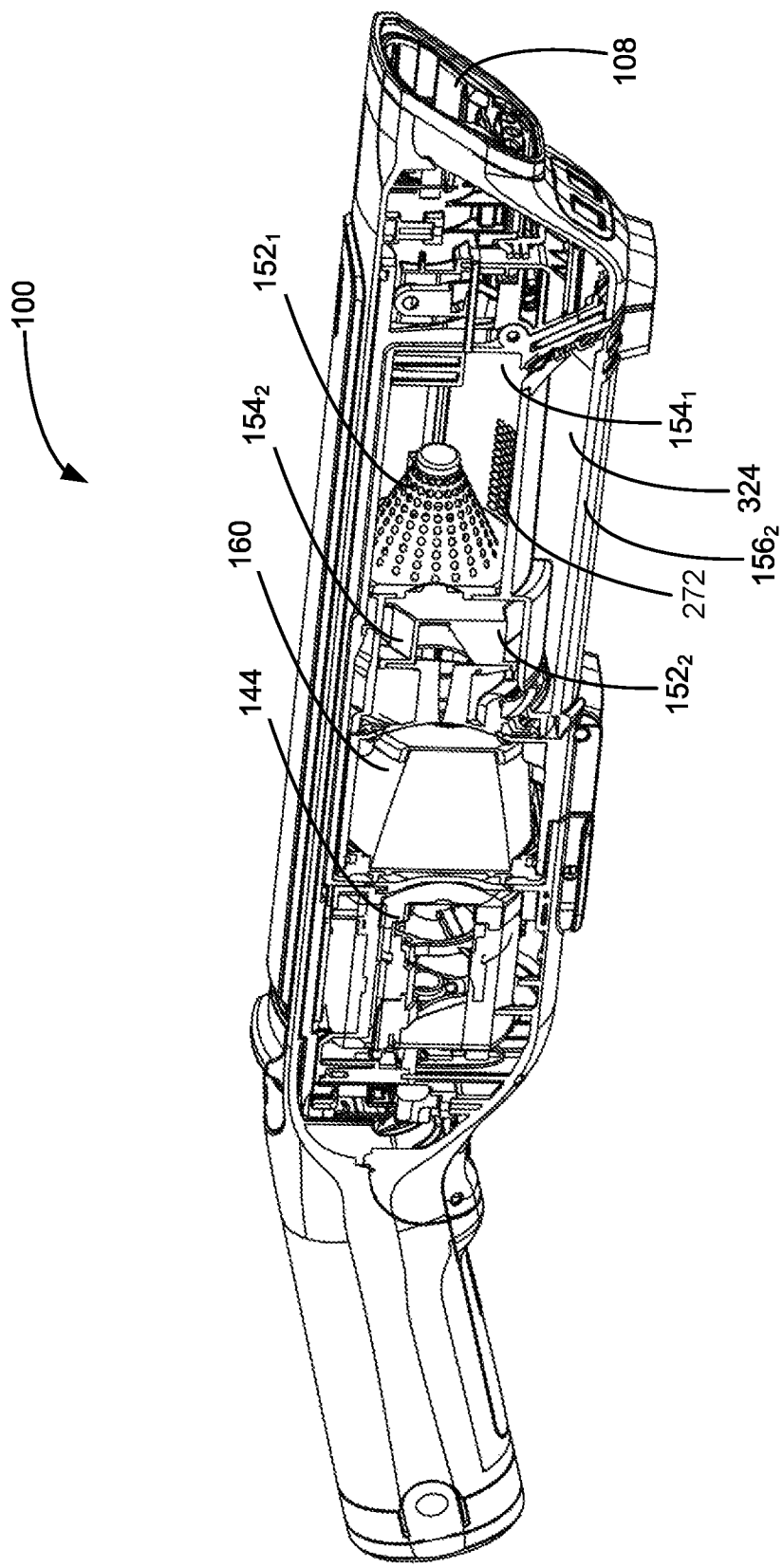
FIG. 78 is a cross-sectional perspective view of the surface cleaning apparatus of FIG. 72, sectioned along line 78-78 in FIG. 76, with the openable portion closed; and, FIG. 79 is a cross-sectional perspective view of the surface cleaning apparatus of FIG. 72, sectioned along line 79-79 in FIG. 76, with the openable portion closed.
Figure 79:
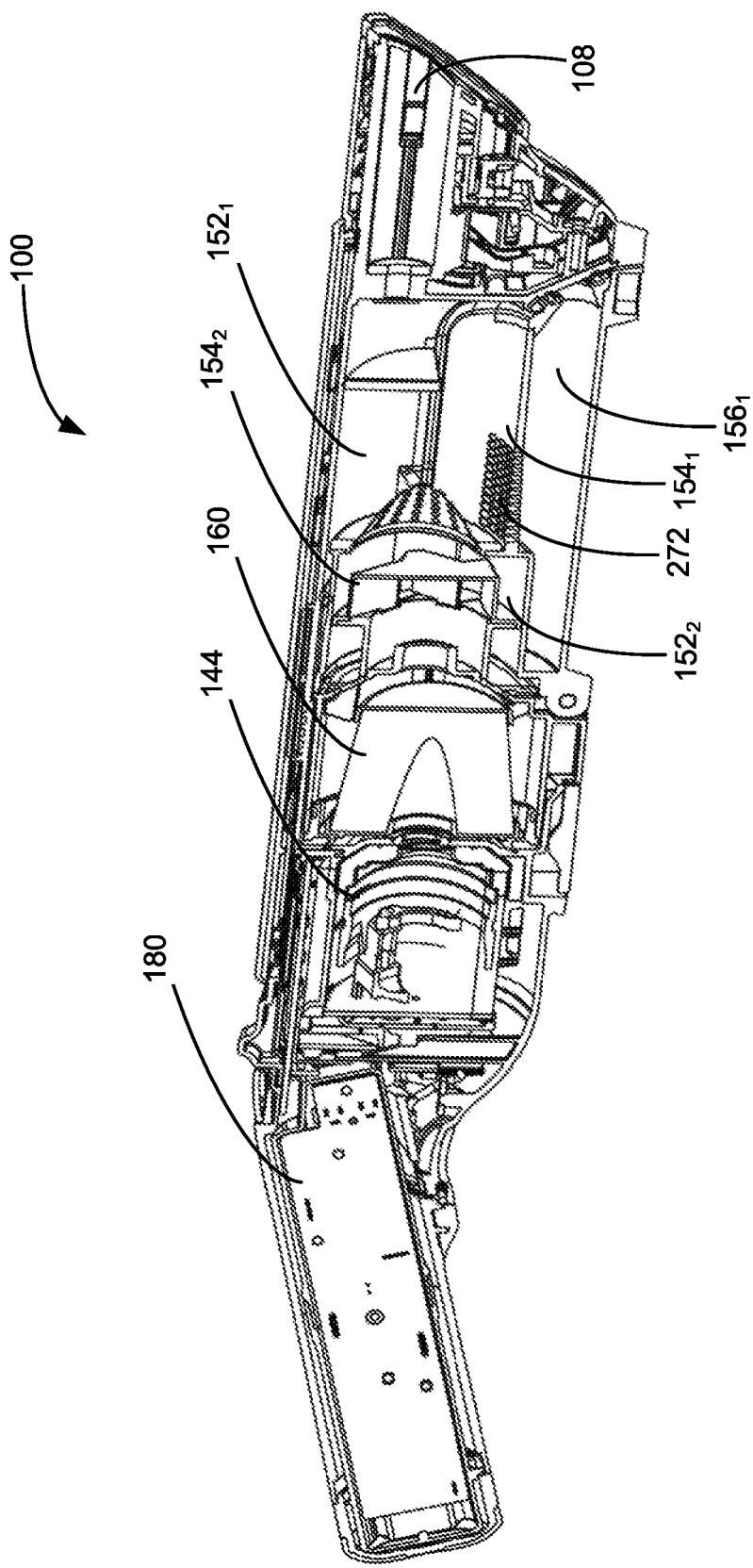

It will be appreciated that all or a portion of each of the first dirt collection chamber $156_1$ and the second dirt collection chamber $156_2$ may underlie a cyclone chamber. As exemplified in FIGS. 72-79, all or a portion of each of the first dirt collection chamber $156_1$ and the second dirt collection chamber $156_2$ may underlie cyclone chamber 154. Accordingly, for example, the cyclone chamber 154 may have a first lateral side 320 that extends radially outwardly from centrally positioned cyclone longitudinal axis 204 in a first direction (e.g., the right side when viewed from the front as shown in FIG. 75) and a second lateral side 322 that extends radially outwardly from the cyclone longitudinal axis 204 in a second direction opposed to the first direction (e.g., the left side when viewed from the front as shown in FIG. 75).

As exemplified, the first dirt collection chamber $156_1$ may be positioned on the first lateral side 320, while the second dirt collection chamber $156_2$ may be positioned on the second lateral side 322. The two chambers $156_1$, $156_2$ may be separated by a partition 324. The partition 324 may also be used to separate the first lateral side 320 from the second lateral side 322. As exemplified in FIGS. 72-29, all of the first dirt collection chamber $156_1$ underlies the first cyclone chamber $154_1$ and the forward portion of the second dirt collection chamber $156_2$ (which comprises a majority of the volume of the second dirt collection chamber) may underlie the first cyclone chamber $154_1$.

It will be appreciated that the apertures 272 may be positioned on the first lateral side 320, the second lateral side 322, or both, depending upon the dirt collection chamber with which they communicate. In the embodiment exemplified in FIG. 75, the first stage cyclone $152_1$ is located on the first lateral side 320 and the apertures 272 are located only on the first lateral side 320, as exemplified in FIGS. 72-79 and more clearly shown in FIG. 76. Positioning the apertures 272 only on the first lateral side 320 enables the apertures to only communicate with the first stage cyclone $152_1$. Accordingly, it will be appreciated that the apertures of the first stage cyclone chamber may be provided at any location which enables the apertures to communicate only with the first stage cyclone 152.

As described above, the group of apertures 272 in the first cyclone chamber $154_1$ may be positioned on the first lateral side 320. Accordingly, when the surface cleaning apparatus 100 is in operation, dirt separated in the first cyclone $152_1$ and of a size to pass through the apertures 274 may exit the first cyclone chamber $154_1$ through the apertures 274 and may enter the first dirt chamber $156_1$. Dirty air may pass downstream from the first stage cyclone $152_1$ into the second stage cyclone $152_2$. The second stage cyclone $152_2$ may separate dirt from the air, depositing dirt in the second dirt collection chamber $156_2$, which is located on the second lateral side 322. As exemplified, the surface cleaning apparatus is a hand vacuum cleaner which, in use, may be angled with the dirty air inlet 108 angled downwardly. Therefore, in use, dirt will tend to travel to a forward portion of each of the dirt collection chambers 156.

Dirt that is larger than apertures 274 and smaller than the openings of the cyclone air outlet will remain in the first cyclone chamber $154_1$, and, accordingly, first cyclone chamber $154_1$ is used as a dirt collection chamber. As exemplified in FIGS. 72-79, the surface cleaning apparatus 100 is a hand vacuum cleaner. Using the first stage cyclone chamber $154_1$ as a dirt collection chamber may allow for the reduction in size of the hand vacuum cleaner 100 while maintaining the storage capacity.

Optionally, the dirt collection chambers $156_1$ and $156_2$ are concurrently emptyable, optionally concurrent with emptying the first stage cyclone chamber 154. Accordingly, each of the dirt collection chambers $156_1$ and $156_2$ may have an openable end that are opened concurrently. Alternately, or in addition, the first stage cyclone chamber 154 may have a portion that opens by itself or concurrently with one or both of the dirt collection chambers $156_1$ and $156_2$.

Figure 72:
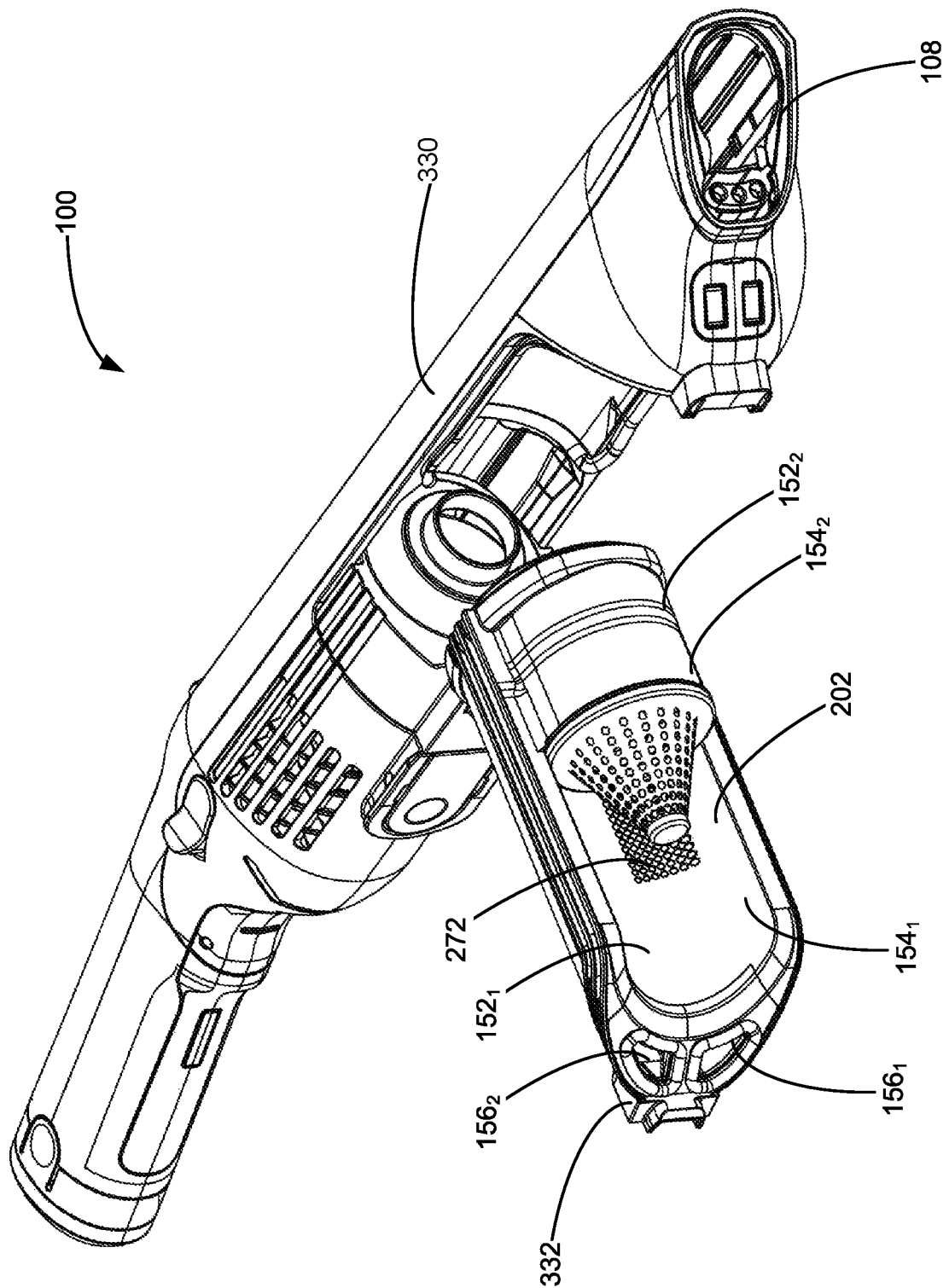
FIG. 72 is a perspective view of a surface cleaning apparatus in accordance with another embodiment, in an open position.
Figure 73:
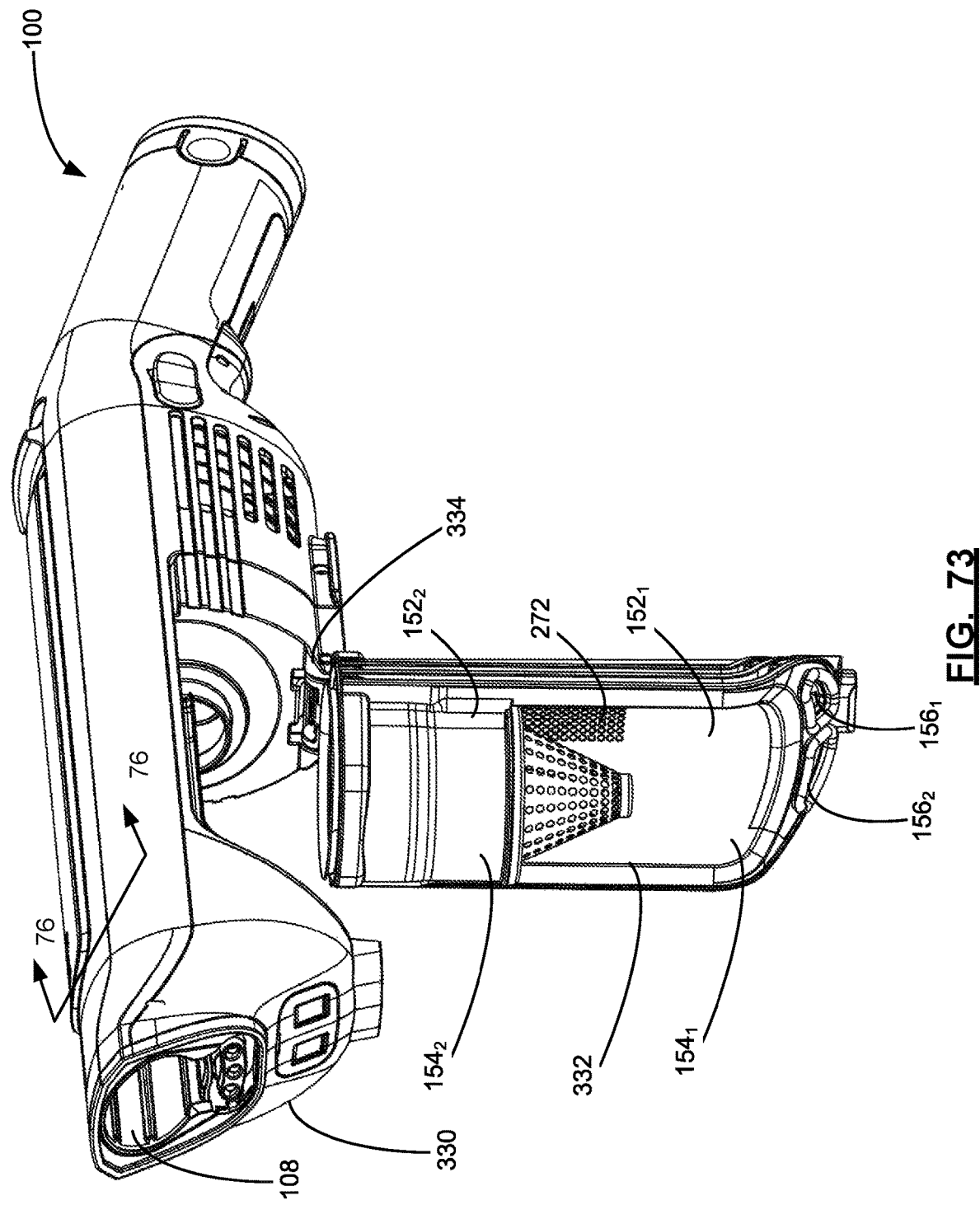
FIG. 73 is another perspective view of the surface cleaning apparatus of FIG. 72.
Figure 74:
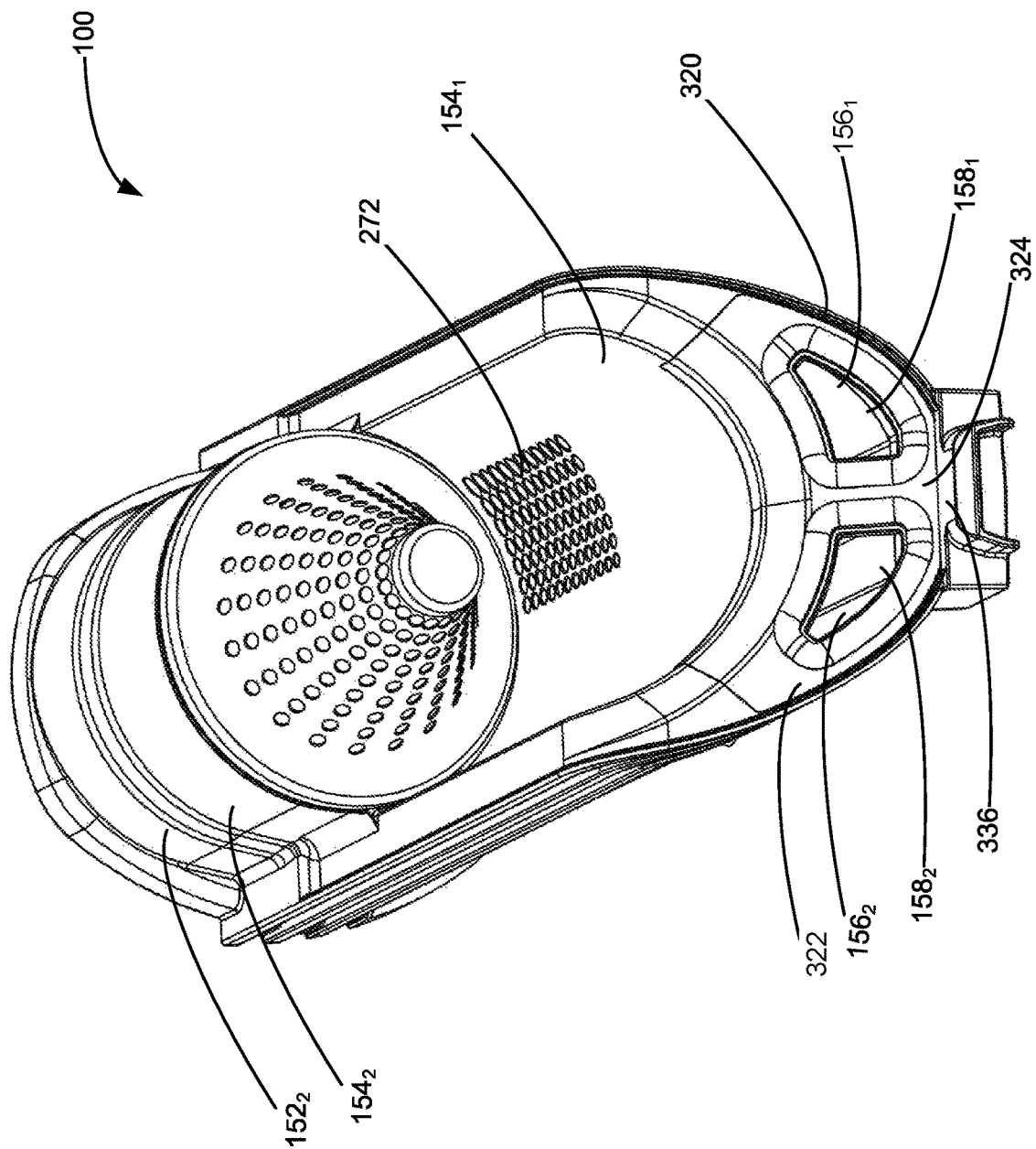
FIG. 74 is a top perspective view of an openable portion of the surface cleaning apparatus of FIG. 72.

As exemplified in FIGS. 72 and 73, the first cyclone $152_1$ has an openable front. As exemplified, the first cyclone $152_1$ has a stationary portion 330 and an openable portion 332 and the openable portion 332 is moveably mounted by a mount 334. As exemplified, the openable portion 332 may be a part of the lower end of the surface cleaning apparatus 100. For example, the mount 334 may be a hinge and/or pivot. The openable portion 332 may be movable between a closed position (see for example FIGS. 76-79), in which the first cyclone chamber $154_1$ and the first dirt collection chamber $156_1$ are closed, and an open position, in which the first cyclone chamber $154_1$ and the first dirt collection chamber $156_1$ are open (see for example FIGS. 72 and 73).

Optionally, as exemplified, the openable portion 332 includes a portion of the cyclone sidewall 202 (e.g., the sidewall may be part of each of the openable and stationary portions).

Each of the dirt collection chambers has a port 158, which as exemplified may be at the front end of the openable portion (e.g., they may be provided in a front face 336 thereof). Accordingly, during use, the openable portion 332 may be opened (e.g., it may be rotated so that front face 336 faces downwardly. In this orientation the contents of the first dirt collection chamber $156_1$, and the second dirt collection chamber $156_2$ may concurrently be emptied, such as under the influence of gravity. If cyclone chamber 154 opens concurrently with the dirt chambers, then the cyclone chamber the first cyclone chamber $154_1$, the first dirt collection chamber $156_1$ and the second dirt collection chamber $156_2$ may be concurrently emptied by orienting the moveable portion such that front face 366 faces downwardly.

Cyclonic Air Treatment Member with One or More Dirt Outlets Extending Axially on the Cyclone Chamber Sidewall Embodiments herein relate to an improved cyclonic air treatment member that may have one or more dirt outlets which extend in a generally axial direction along at least a portion of the cyclone chamber sidewall. The features in this section may be used by themselves in any surface cleaning apparatus or in any combination or sub-combination with any other feature or features described herein.

As discussed previously, FIGS. 14-19 exemplify embodiments wherein a portion of the dirt outlet extends axially or generally axially. In accordance with the feature discussed in this section, and as exemplified in FIGS. 28-34, a cyclone 152 may have one or more dirt outlets 190, each of which extends axially or generally axially. Accordingly, the dirt outlet may not include a portion that extends angularly around the cyclone chamber sidewall as discussed previously.

Figure 29:
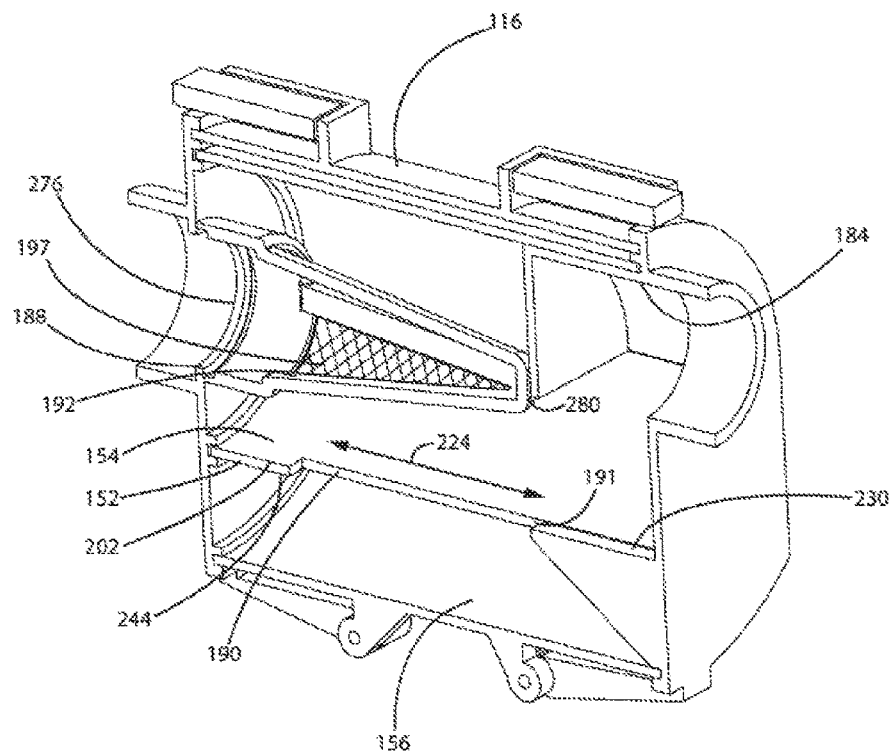
FIG. 29 is a perspective view of an air treatment member of the apparatus of FIG. 28, sectioned along line 29-29 in FIG. 28, in accordance with an embodiment.
Figure 30:
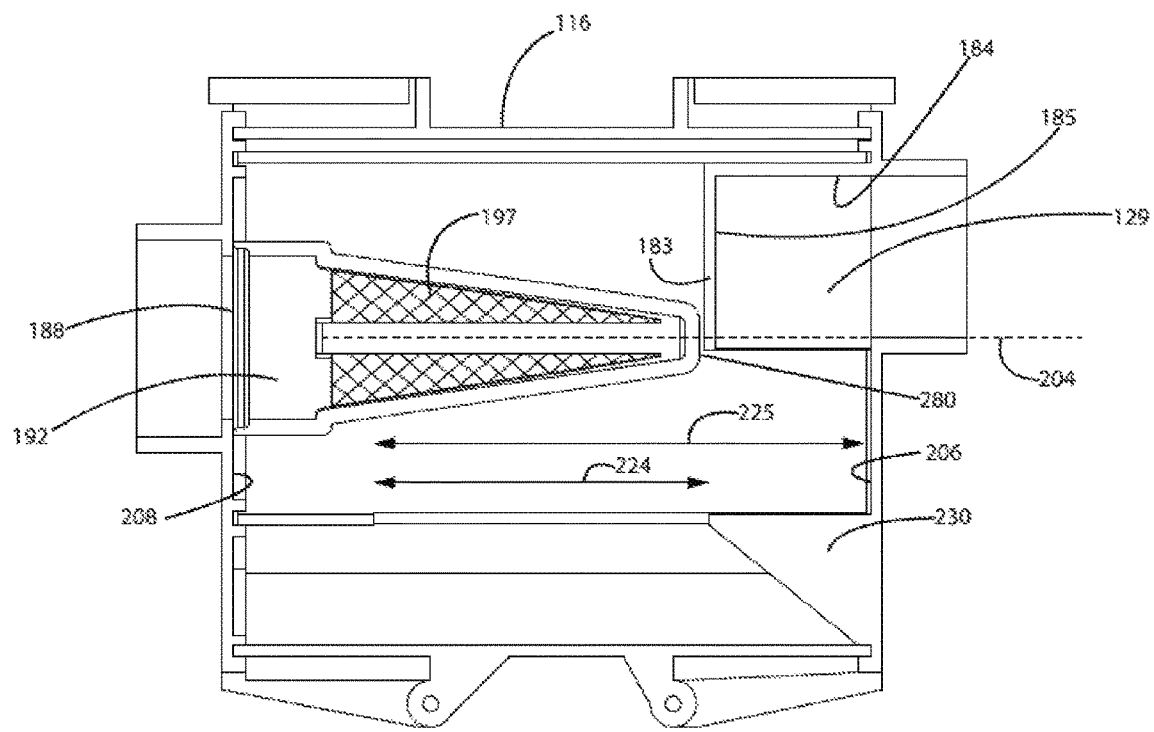
FIG. 30 is a cross-sectional view of the air treatment member of FIG. 29, sectioned along line 29-29 in FIG. 28, in accordance with the embodiment of FIG. 29.

As exemplified in FIGS. 29 and 30, dirt outlet 190 may have a length 224 that extends linearly in the axial direction generally parallel to the cyclone axis 204. Alternately, similar to outlet $190_1$ of FIGS. 15 and 16 and outlet $190_3$ of FIGS. 18, 19 the dirt outlet 190 may extend in a direction that is offset or slightly offset from the direction of the longitudinal axis 204, e.g. by ±about 20° or ±10°. The dirt outlet 190 may extend linearly as exemplified in FIGS. 29 and 30 or angularly as similar to outlet $190_1$ of FIGS. 15 and 16 and outlet $190_3$ of FIGS. 18, 19.

Figure 32:
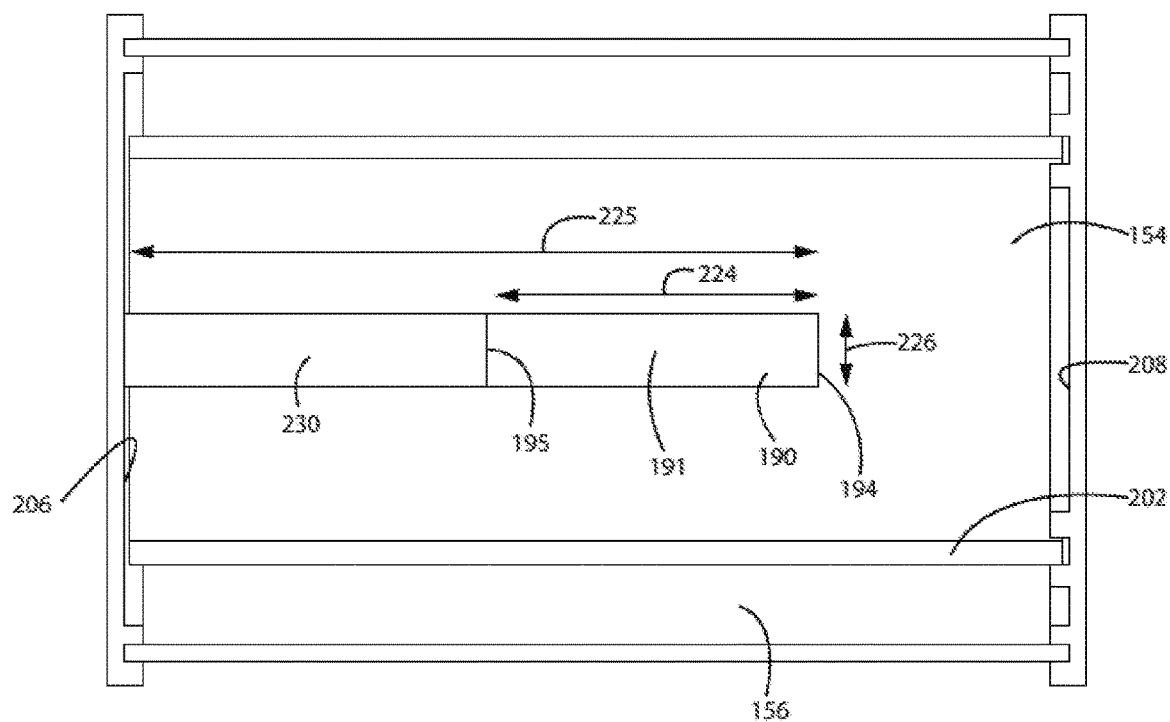
FIG. 32 is a cross-sectional view of the air treatment member of FIG. 29, sectioned along line 32-32 in FIG. 28, in accordance with the embodiment of FIG. 29.
Figure 34:
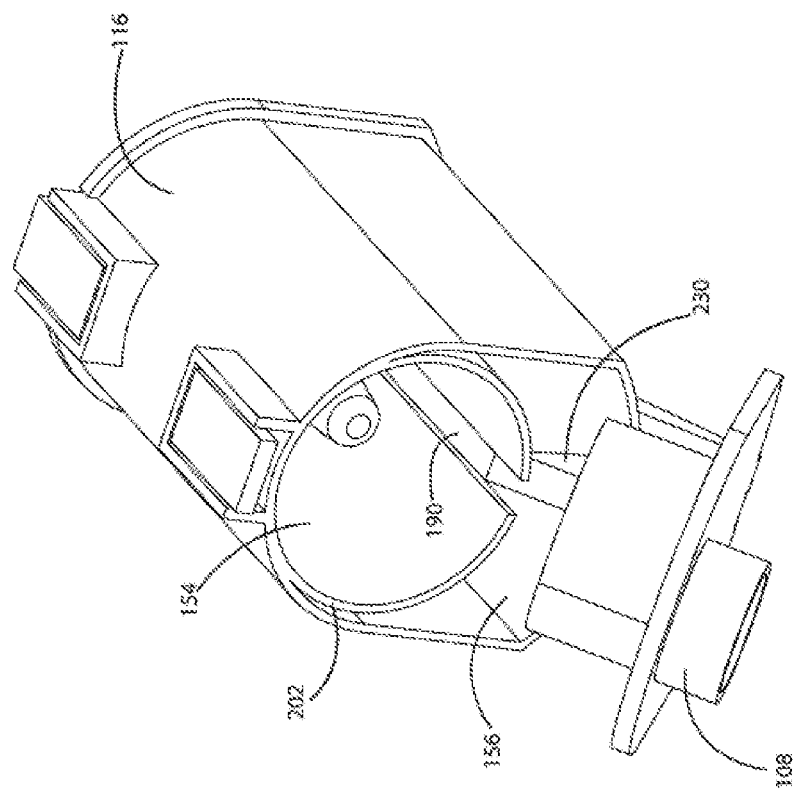
FIG. 34 is a perspective view of the air treatment member of FIG. 29 with a front wall in a partially open position, in accordance with the embodiment of FIG. 29.
Figure 33:
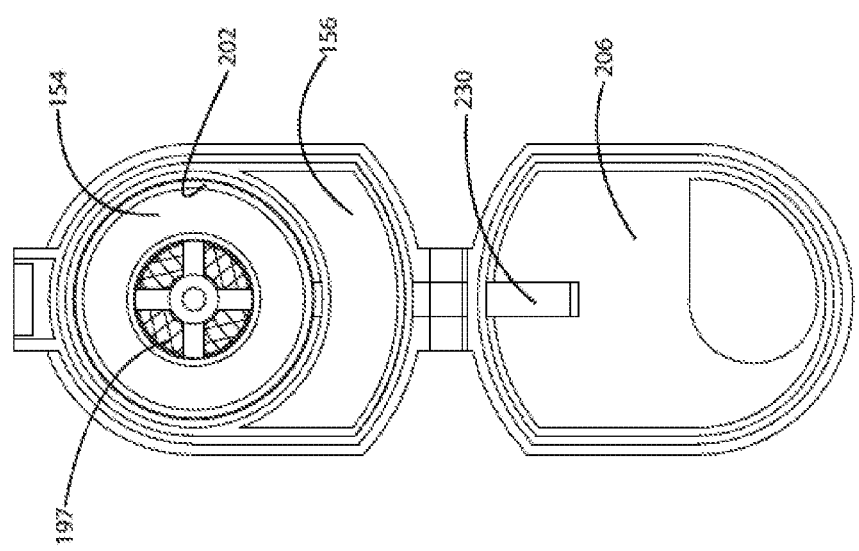
FIG. 33 is a front view of the air treatment member of FIG. 29 with the front wall in the open position, in accordance with the embodiment of FIG. 29.

The dirt outlet 190 has a transverse width 226 that extends in a circumferential direction of the cyclone chamber 154. As shown in the example of FIG. 32, the length 224 is greater than the width 226 (e.g., the length 224 may be 5, 10, 15 or 20 times the width 226). As the air rotates within a cyclone chamber, the air will tend to stay in a band. The band may have an axial length about the axial length of a tangential air inlet. Accordingly, the dirt outlet 190 may have an axial length that is at least as long as the axial length of a tangential cyclone inlet, which may allow the dirt outlet 190 to underlie the axial length of an entire band of air in a turn of the cyclonic air flow path through cyclone chamber 154. If the axial length of the dirt outlet is longer, then the dirt outlet 190 may underlie more than one turn of the air, e.g., it may underlie 1.5 or 2 turns of the air.

In some embodiments, as exemplified in FIGS. 28-34, the cyclone dirt outlet may be formed as an opening or gap in the cyclone chamber sidewall 202. In the illustrated embodiment, dirt outlet 190 is formed as a rectangular aperture in the sidewall 202. In alternative embodiments, dirt outlet 190 may have other shapes (e.g. elliptical, triangular, irregular shapes) in which the length 224 is greater than the width 226.

In some embodiments, the dirt outlet 190 is provided at a bottom end 244 of cyclone sidewall 202 as shown. This may help dirt which remains in the cyclone chamber 154 after termination of operation of the vacuum cleaner 100 to fall into the dirt collection chamber 156 when the vacuum cleaner 100 is held with the cyclone 152 extending horizontally (and possibly slightly upwardly).

The dirt outlet extends between dirt outlet first or upstream end 193 and dirt outlet second or downstream end 194. The dirt outlet upstream end 193 may be located at any location along the axial length of the cyclone 152. For example, as exemplified in FIG. 31, the dirt outlet upstream end 193 may be located at the front end of the cyclone 152 (cyclone first end 206). Alternately, as exemplified in FIG. 47, the dirt outlet upstream end 193 may be located axially inwardly from the front end of the cyclone 152. For example, the dirt outlet upstream end 193 may be located at or axially inwardly (rearwardly) from the axially inner extent of the cyclone air inlet (see, e.g., FIG. 46). As shown in FIGS. 28-34, the cyclone air inlet 184 includes a conduit 129 that extends into, and is located interior to the cyclone chamber 154. The open portion of the dirt outlet 190 may extend from a position located at or, e.g., about 0.01-0.2 inches axially inward from the axially inner side 185 of the air inlet conduit 129 towards the cyclone second end 208.

Similarly, the dirt outlet downstream end 194 may be located at any location along the axial length of the cyclone 152. For example, the dirt outlet downstream end 194 may be located at the rear end of the cyclone 152 (cyclone second end 208). Alternately, as exemplified in FIG. 30, the dirt outlet downstream end 194 may be located axially inwardly from the rear end of the cyclone 152. For example, the dirt outlet downstream end 194 may be located at passage second end 276 or axially inwardly (forwardly) from the axially inner extent of the solid portion of the outlet passage 192 (see, e.g., FIG. 30).

Accordingly, the dirt outlet 190 may be provided by an axially extending slot 191, which is formed in the sidewall 202, which extends longitudinally along at least a portion of the cyclone chamber 154 in a direction generally parallel to the cyclone axis 204 between dirt outlet upstream end 193 and dirt outlet downstream end 194. As exemplified in FIGS. 29-31, the length 225 of slot 191 may be greater than the open length 224 of the dirt outlet 190. This may occur if, for example, the slot extends forwardly of the cyclone air inlet. In such a case, an insert member 230 may be provided to limit the forward extent of the slot 191 when the surface cleaning apparatus is in operation (i.e., the length of the slot 191 may be reduced due to insert member 230 to provide a dirt outlet upstream end 193 that is positioned at a selected forward extent of the cyclone 152).

Figure 31:
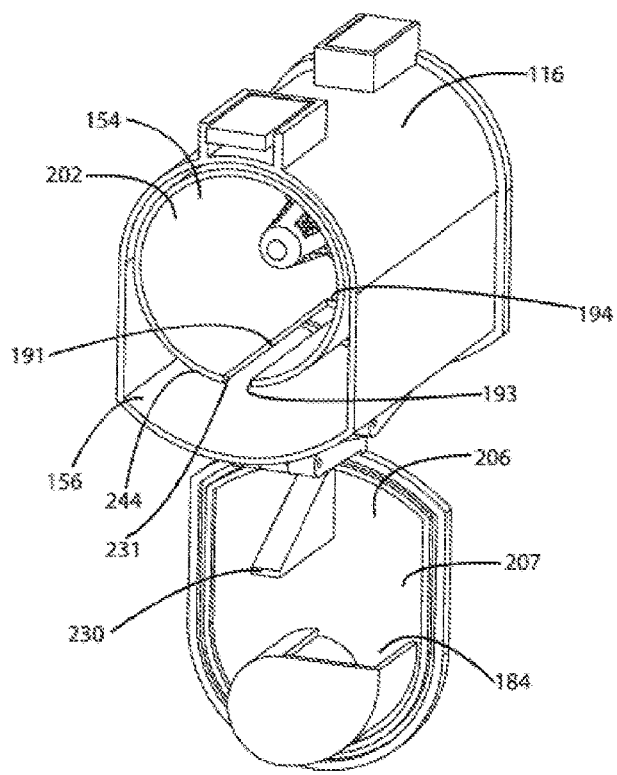
FIG. 31 is a perspective view of the air treatment member of FIG. 29 with a front wall in an open position, in accordance with the embodiment of FIG. 29.

FIGS. 29-31 exemplify an embodiment wherein the slot 191 extends from a position at the cyclone first end 206 rearward towards the cyclone second end 208. In this embodiment, the second end 194 of the slot 191 is axially spaced apart from the first end 193 and is located inwardly (forwardly) of the cyclone second end 208. As shown in FIG. 30, the slot 191 is positioned under cyclone air inlet 184. Accordingly, air entering the cyclone 152 at the axial location of the cyclone air inlet 184 (i.e., between the forward and rearward extent of) could enter the slot 191.

Optionally, as exemplified, an insert member 230 may be provided, and may be removably received in a slot portion 231 of the slot 191 proximate the cyclone first end 206 as shown. When the insert member 230 is received in the slot 191, the insert member 230 can occupy the slot portion 231 and prevent dirt from exiting the cyclone chamber 154 via slot portion 231. The open portion of the dirt outlet 190 may thus extend between the second end 194 and an open outlet end 195. As a result, in operation the open length 224 of the dirt outlet 190 may be less than the overall length 225 of the slot 191.

Figure 35:
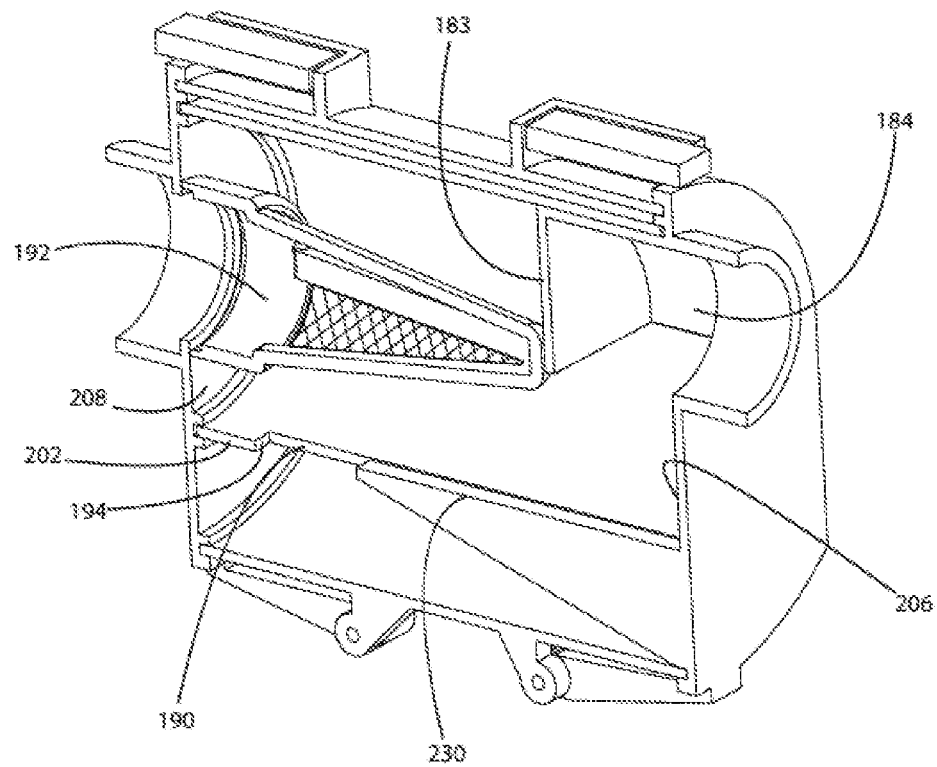
FIG. 35 is a perspective view of an alternate embodiment of the air treatment member of the apparatus of FIG. 28, sectioned along line 29-29 in FIG. 28, in accordance with another embodiment.
Figure 36:
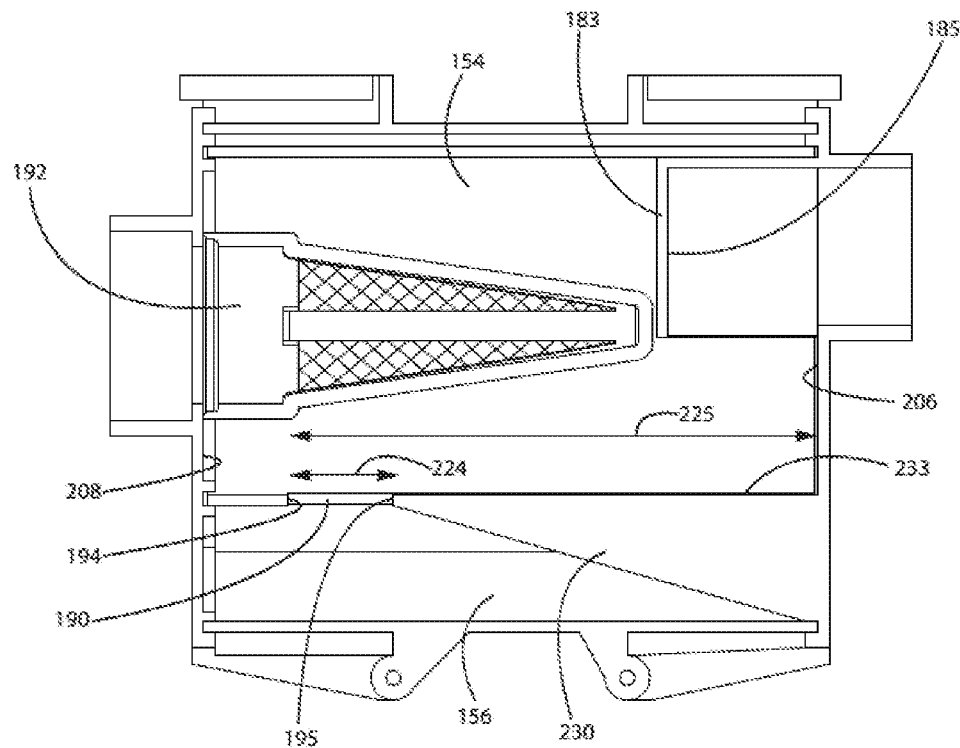
FIG. 36 is a cross-sectional view of the alternate air treatment member of FIG. 35, sectioned along line 29-29 in FIG. 28, in accordance with the embodiment of FIG. 35.

The insert member may extend from the front end 206 of the cyclone rearwardly any desired amount. As exemplified in FIGS. 29-31, the open outlet end 195 may be positioned proximate an axially inner side 185 of the tangential air inlet 184. Accordingly, the insert member may extend inwardly to a position at the location of the axially inner side 185 and, optionally, rearwardly thereof (see for example FIG. 35).

As exemplified in FIG. 2, in some embodiments, first end 280 of passage 192 may be solid (i.e., it may not be porous). In such a case, the insert member 230 may extend to the inner end of the solid portion of screen 197, and, optionally, rearwardly thereof such that the open outlet end 195 may be spaced axially inwardly (towards cyclone second end 208) from the axially inner side 185. Alternately, if the solid portion of screen 197 extends to the front end 206 of the cyclone, then an insert member 230 may not be provided.

Alternately, the passage first end 280 may be positioned longitudinally adjacent to the inner side 185 of the air inlet 184. If the cyclone air inlet 184 is provided inside the cyclone chamber 154, then the cyclone outlet passage 192 may extend to a position longitudinally adjacent (e.g., within 0.01, 0.05, 0.1 or 0.125 inches) to the end 185 of the tangential inlet 184 closest to the outlet end of the cyclone chamber 154.

As shown in FIG. 30, the passage first end 280 can be axially spaced inwardly from the inner side 185 of air inlet conduit 129. For example, the first end 280 of the cyclone outlet passage 192 may terminate at about 0.01-0.75 or about 0.05-0.375 inches inwardly from the inner side 185 of the air inlet 184 in some embodiments. Alternately, in some embodiments, the first end 280 of the cyclone outlet passage 192 may abut the downstream wall 183 of the air inlet conduit 129.

As discussed subsequently, in some embodiments, the cyclone outlet passage 192 may be tapered between the passage second end 276 and the passage first end 280. As shown in FIG. 30, the transverse width of the cyclone outlet passage 192 may increase gradually between passage first end 280 and passage second end 276. This may provide a greater radial distance between the cyclone chamber sidewall 202 and the cyclone outlet passage 192 at the air inlet end of the cyclone chamber 154 thereby inhibiting dirt from contacting the screen 197 as it enters the cyclone chamber 154.

In some embodiments, the cyclone first end 206 may be openable. As shown in FIG. 31, the cyclone first end 206 may be defined by an openable front wall 207. The front wall 207 may be movable between a closed position (shown for example in FIGS. 28-30) and an open position (shown in FIG. 31). As illustrated, when the front end 206 is moved to the open position, the cyclone chamber 154 and the dirt collection chamber 156 are each opened. This may facilitate emptying dirt and debris from the cyclone 152.

Alternately or in addition, the cyclone chamber 154 and dirt collection chamber 156 may be separately openable.

As exemplified in FIG. 31, if an insert member 230 is provided, then the insert member 230 can be mounted to the front wall 207. Accordingly, as the cyclone front end 206 is moved to the open position, the insert member can be removed from the dirt outlet portion 231. This may provide additional access to dirt collection chamber 156 to facilitate emptying.

As shown, the cyclone outlet passage 192 can be tapered. The reduction in width of the passage 192 moving from the second end 176 to the first end 280 may allow the insert member 230 to have a greater axial length while still permitting the insert member 230 to be withdrawn from the dirt outlet slot 191.

It will be appreciated that, instead of providing an insert member 230 to close part of slot 191, slot 191 may have the same dimensions as dirt outlet 190. Such an embodiment is exemplified in FIGS. 45-47, wherein the cyclone 152 is not provided with an insert member 230. Rather, as exemplified, the dirt outlet 190 may be defined entirely by a gap/slot 191 in the cyclone chamber sidewall 202. The cyclone chamber sidewall 202 may include a section 203 that extends from proximate the front end 206 to the dirt outlet first end 193. A gap 191 in the sidewall 202 extending rearward from the dirt outlet first end 193 (the open outlet end 195) may then define the dirt outlet 190. Accordingly, the dirt outlet first end 193 can be positioned at the same location as discussed with respect to the open outlet end 195, i.e., it may be positioned proximate to the second end 185 of the tangential air inlet 184.

FIGS. 35-38 exemplify an embodiment wherein the open portion of the dirt outlet 190 is axially spaced apart (inwardly) from the second end 185 of the air inlet 184 towards the cyclone second end 208. This may also reduce the re-entrainment of collected dirt from the dirt collection chamber 156, particularly if outlet passage 192 is not tapered.

In the example shown in FIGS. 35-38, the insert member 230 extends axially from the cyclone first end 206 towards the cyclone second end 208 for a distance beyond the inner side 185 of the air inlet conduit 129. As a result, the open outlet end 195 is axially spaced apart from the inner side 185 of the air inlet conduit 129. In operation, the open length 224 of the dirt outlet 190 is thus much less than the overall length 225 of the slot 191.

Figure 37:
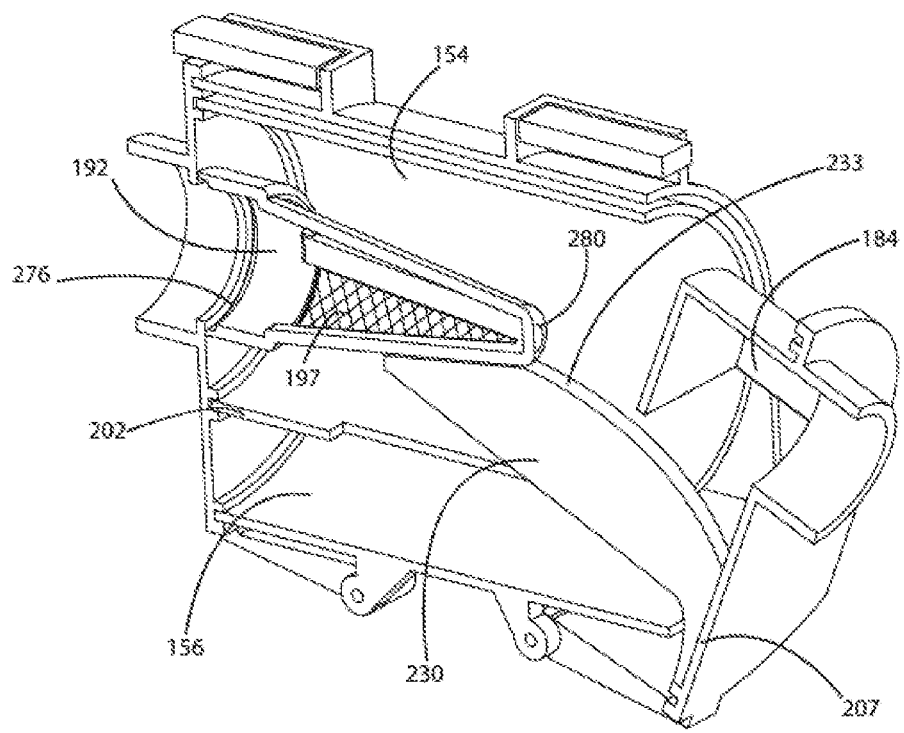
FIG. 37 is a perspective view of the alternate air treatment member of FIG. 35, sectioned along line 29-29 in FIG. 28, with a front wall in a first partially open position in accordance with the embodiment of FIG. 35.
Figure 38:
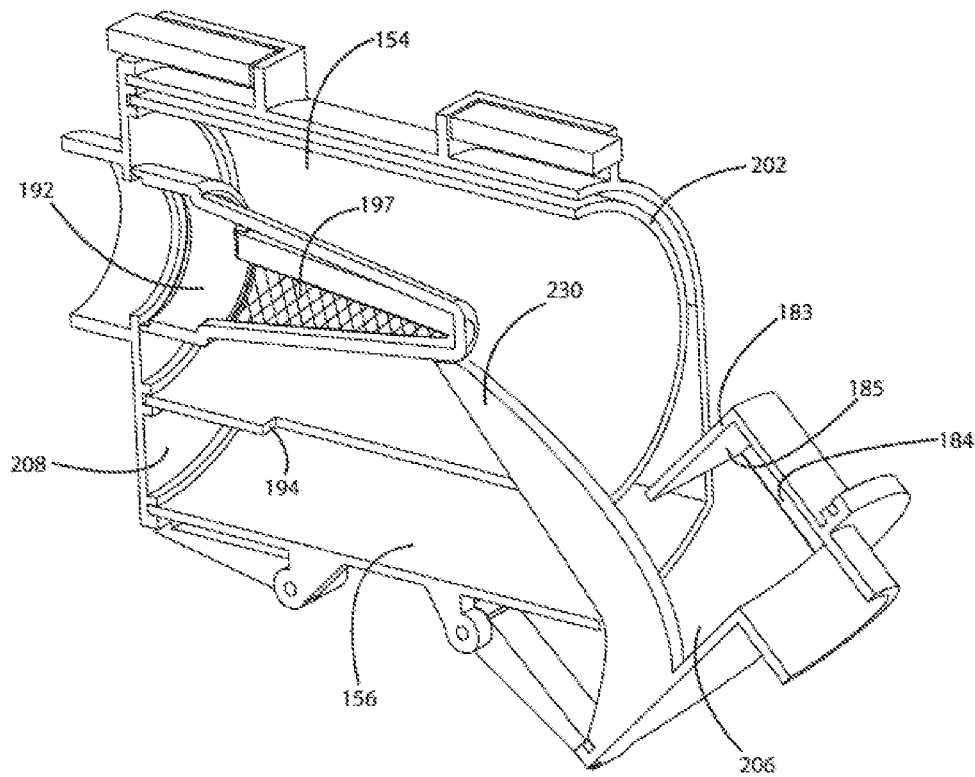
FIG. 38 is a perspective view of the alternate air treatment member of FIG. 35, sectioned along line 29-29 in FIG. 28, with a front wall in a second partially open position in accordance with the embodiment of FIG. 35.

Depending upon the length of the insert member 20, the diameter of the cyclone chamber 154 and the diameter of the passage 192, the top side 233 of the insert member 230 may contact the cyclone outlet passage 192 and may brush against the screen 197 when the insert member 230 is removed from the cyclone chamber when the cyclone front end 206 is moved to the open position (see for example FIGS. 37-38). In such an embodiment, the insert member 230 may thus help dislodge dirt and debris from the screen 197 to facilitate cleaning thereof. To facilitate the removal of the insert member 230 in such an embodiment, the insert member may be flexible or bendable (e.g., it may be made of a resilient material) and/or the outlet passage 192 may be tapered and or shorter.

As exemplified, if the insert member 230 extends past the cyclone inlet, then the cyclone outlet passage 192 can be tapered. The reduction in width of the passage 192 moving from the second end 176 to the first end 280 may allow the insert member 230 to be more easily withdrawn from the dirt outlet slot 191.

Optionally, the insert 230 may be flexible or bendable. As the front end 206 is opened, the insert member 230 may contact the cyclone outlet passage 192 and press on the screen 197. As shown in FIGS. 37-38, insert member 230 can flex in response to pressing against the outlet passage 192 to allow the insert member 230 to be removed without damaging or displacing the outlet passage 192, while still assisting in cleaning the screen 197.

In the example shown in FIGS. 35-38, the insert member 230 has a generally triangular shape. The triangular shape of the insert member 230 may support the insert member 230 and prevent flexing or bending in response to air flow in the cyclone chamber 154.

Figure 39:
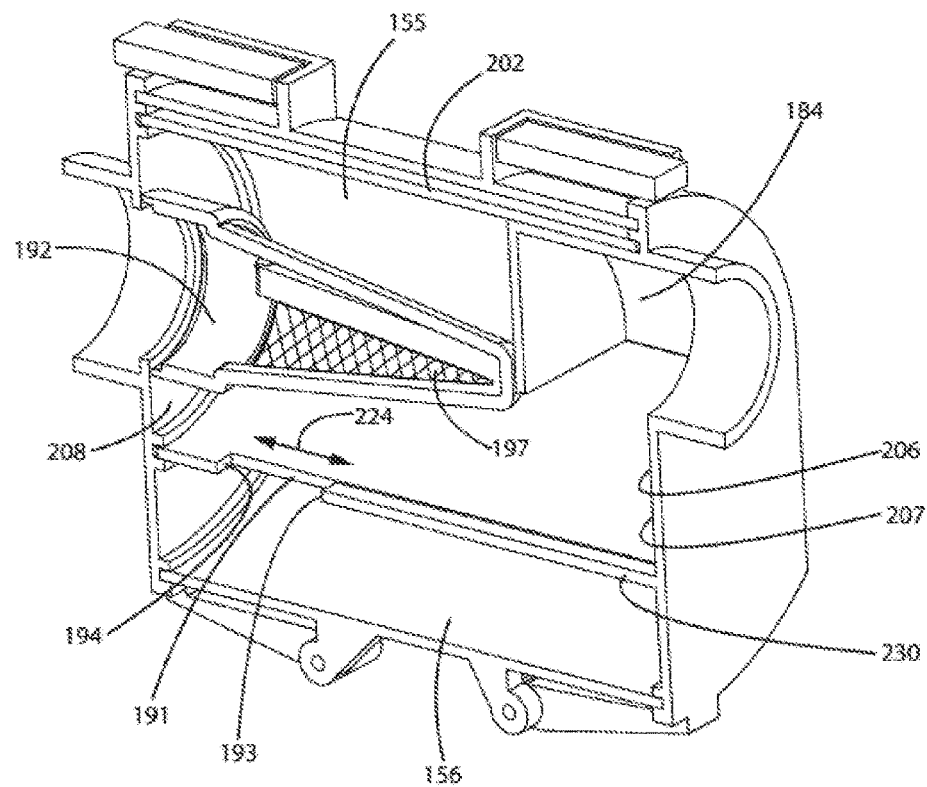
FIG. 39 is a perspective view of an alternate embodiment of the air treatment member of the apparatus of FIG. 28, sectioned along line 29-29 in FIG. 28, in accordance with another embodiment.
Figure 40:
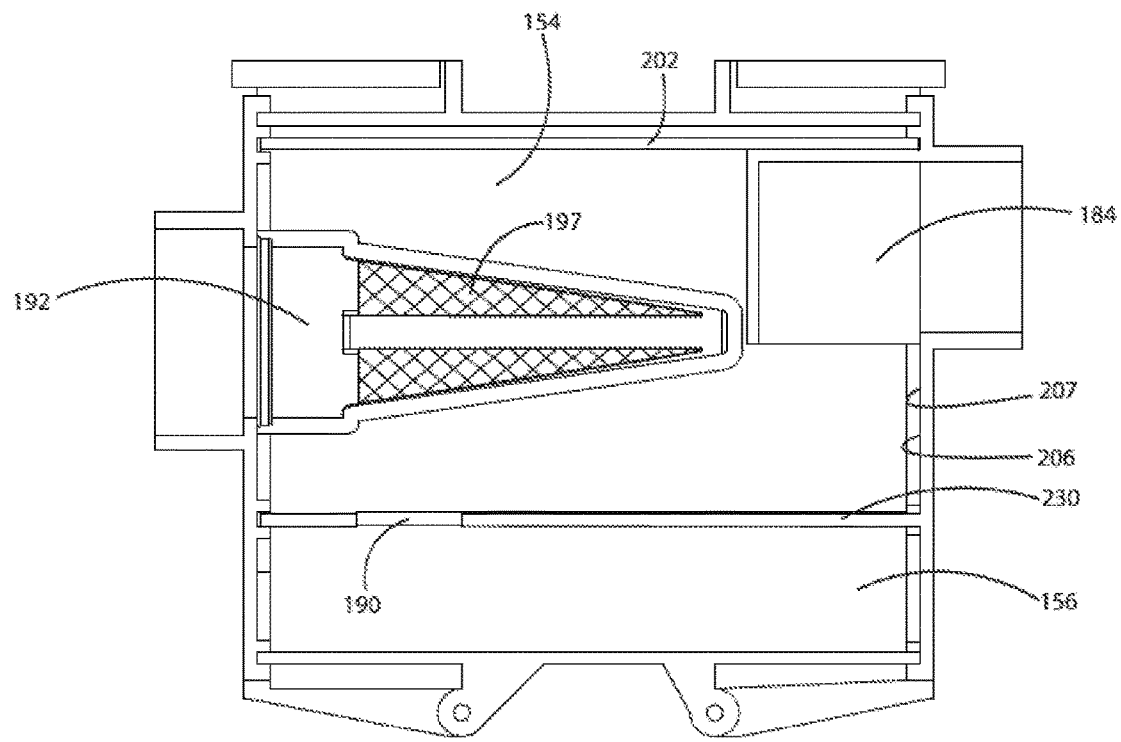
FIG. 40 is a cross-sectional view of the alternate air treatment member of FIG. 39, sectioned along line 29-29 in FIG. 28, in accordance with the embodiment of FIG. 39.
Figure 41:
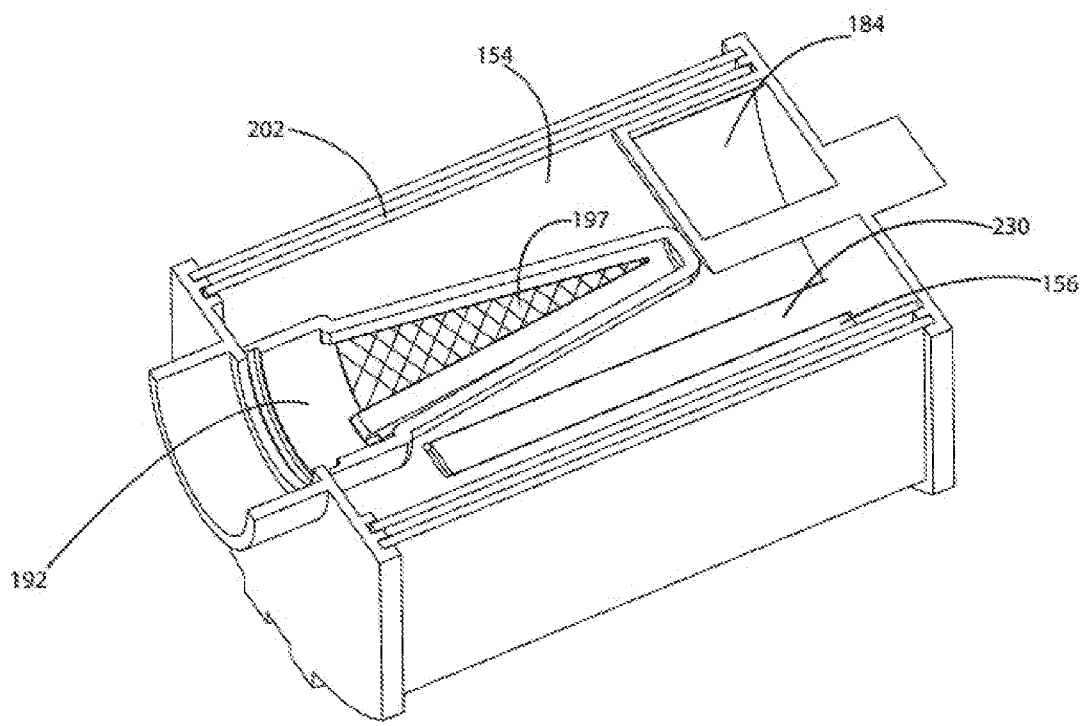
FIG. 41 is a perspective view of the alternate air treatment member of FIG. 39, sectioned along line 41-41 in FIG. 28, in accordance with the embodiment of FIG. 35.

Alternately, other shapes of insert member 230 may be used. Referring to FIGS. 39-41, shown therein is another example of a cyclone 152 with a rectangular insert member 230. The rectangular insert member 230 shown in FIGS. 39-41 may occupy less space allowing for increased capacity in the dirt collection chamber 156.

Figure 42:
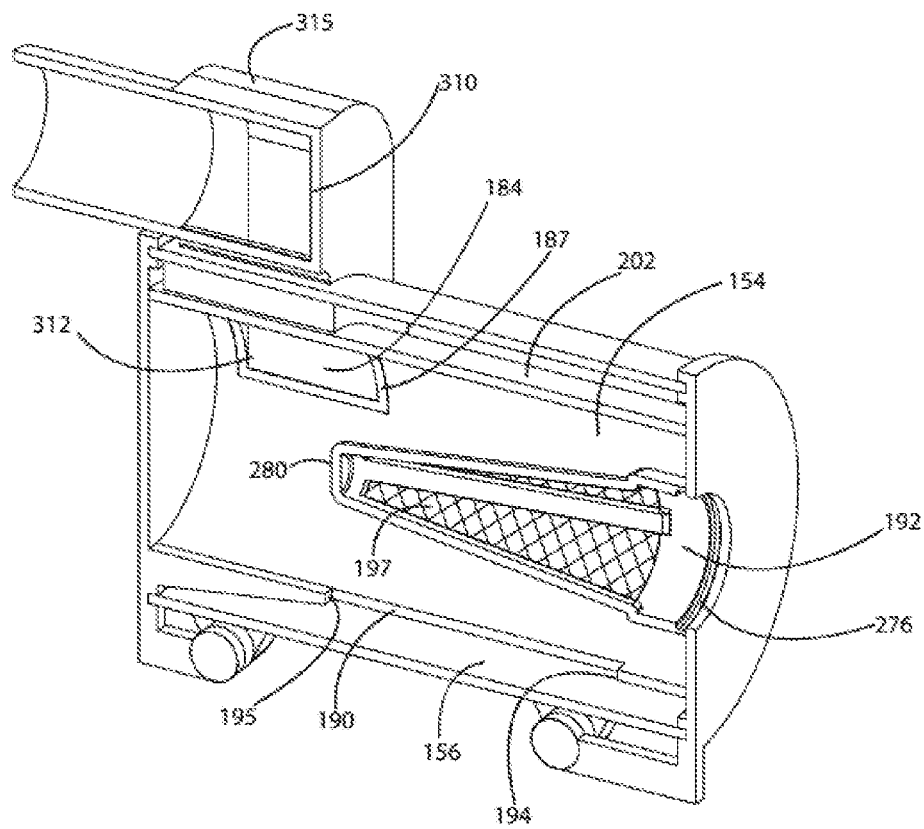
FIG. 42 is a perspective view of an alternate embodiment of the air treatment member of the apparatus of FIG. 28, sectioned along line 42-42 in FIG. 28, in accordance with an embodiment.
Figure 43:
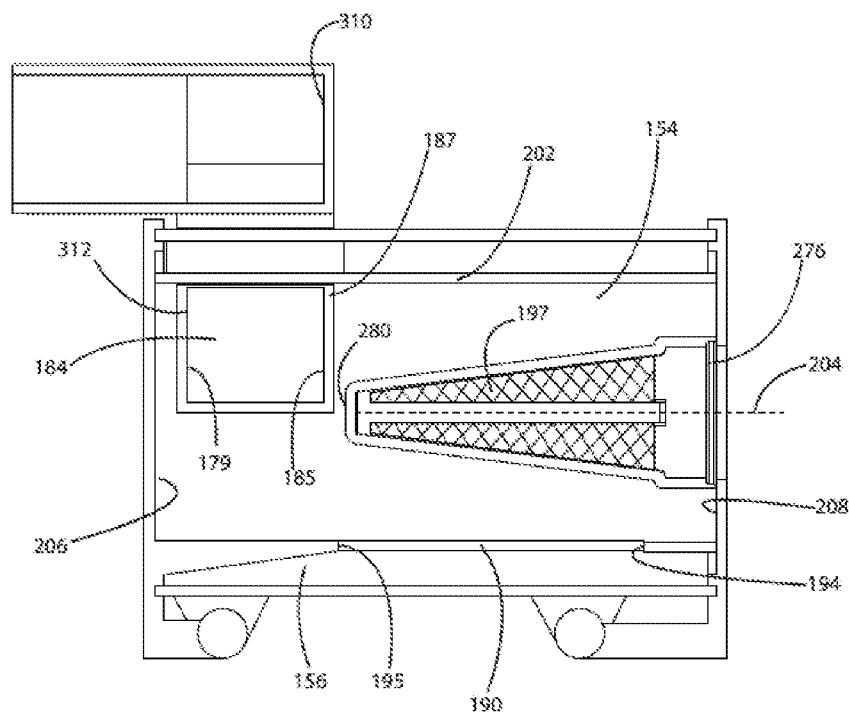
FIG. 43 is a cross-sectional view of the alternate air treatment member of FIG. 42, sectioned along line 42-42 in FIG. 28, in accordance with the embodiment of FIG. 42.
Figure 44:
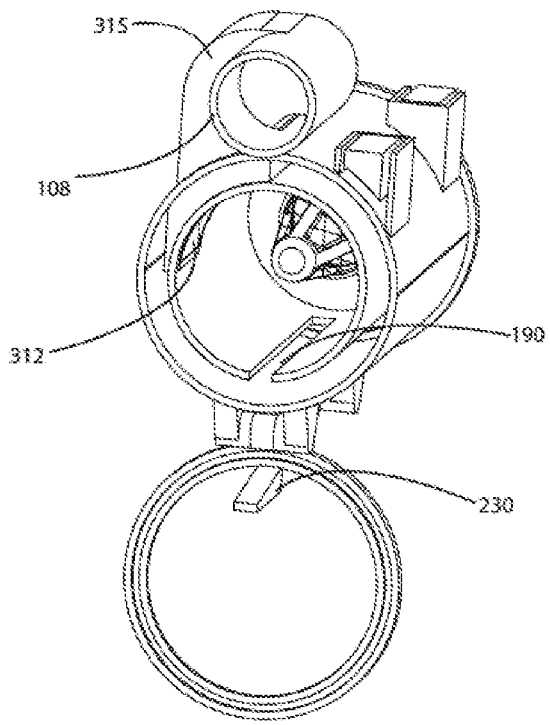
FIG. 44 is a front view of the alternate air treatment member of FIG. 42 with a front wall in an open position, in accordance with the embodiment of FIG. 42.

As exemplified in FIGS. 42-44, in some embodiments the cyclone air inlet 184 may terminate at a cyclone inlet port 187 formed in the sidewall 202 of the cyclone chamber 154. In the example illustrated, the cyclone inlet port 187 is the terminal end of a tangential inlet and is an opening formed in the longitudinally extending sidewall 202. The cyclone air inlet 184 extends from a cyclone air inlet upstream end 310 to a cyclone air inlet downstream end 312. The cyclone air inlet downstream end 312 may be oriented to direct air substantially tangentially to the inner surface of sidewall 202.

In the illustrated example of FIGS. 42-44, cyclone air inlet 184 is formed as a curved passage 315 extending from a cyclone air inlet upstream end 310 to a cyclone air inlet downstream end 312. The curved passage 315 may provide a gradual change of direction for the air passing through the cyclone air inlet 184, which may reduce backpressure through the cyclone air inlet 184.

The cyclone air inlet 184 has an inlet width that extends between a first inlet side 179 and a second inlet side 185. In the example illustrated, the first inlet side 179 and second inlet side 185 are spaced apart in a longitudinal axial direction generally parallel to the cyclone axis of rotation 204. The second inlet side 185, or downstream inlet side, is positioned closer to the cyclone second end 208 than the first inlet side 179.

As exemplified, where the cyclone air inlet 184 terminates at a port 187 in the cyclone chamber sidewall 202 such as exemplified in FIGS. 42-44, the first end 208 of the passage 192 may be located at the second inlet side 185 or, alternately, it may be located axially inwardly of the second side 185 of the tangential air inlet 184 (i.e., towards cyclone second end 208), for example, 0.01, 0.05, 0.1 or 0.125 inches inwardly of second inlet side 185.

In alternate embodiments, the first end 208 of the cyclone outlet passage 192 may extend to a position at or adjacent (e.g., within 0.01, 0.05, 0.1 or 0.125 inches) of the first end 206 of the cyclone chamber 154. For example, the passage first end 280 may terminate at about 0.01-0.75 inches or about 0.05-0.375 inches from the cyclone first end 206 in some embodiments. In such a case, the portion of cyclone outlet passage that is axially co-extensive with port 187 may be solid.

Figure 48:
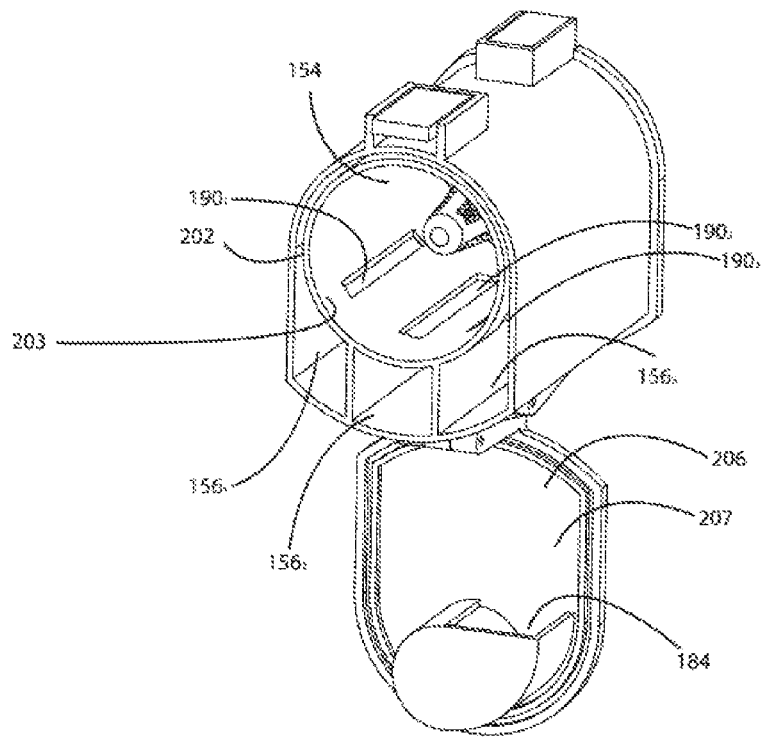
FIG. 48 is a front perspective view of an alternate embodiment of the air treatment member of the apparatus of FIG. 28, with a front wall in an open position, in accordance with an embodiment.
Figure 49:
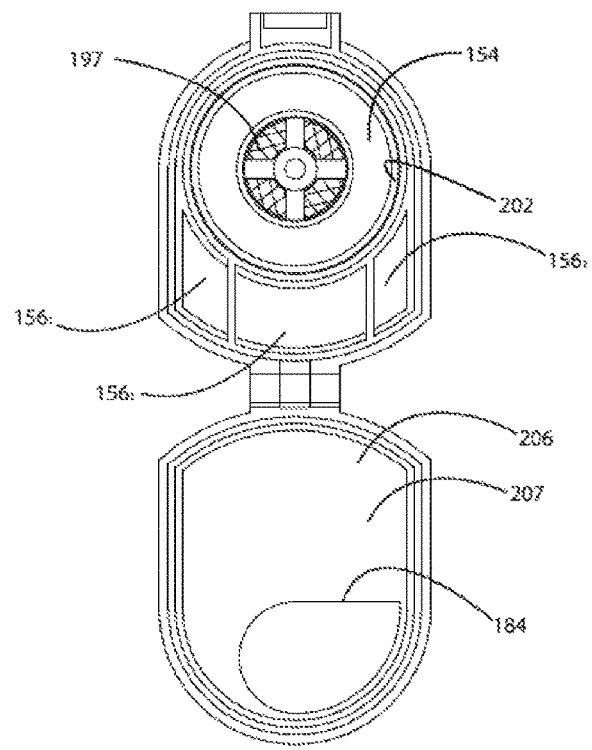
FIG. 49 is a front view of the alternate air treatment member of FIG. 48 with a front wall in an open position, in accordance with the embodiment of FIG. 48.

As exemplified in FIGS. 48-49, in some embodiments the cyclone 152 may include a plurality of axially extending dirt outlet $190_1$, $190_2$, and $190_3$. This may allow the dirt outlets to intersect the air flow path through the cyclone chamber 154 at different locations, which may expose the dirt outlets $190_1$, $190_2$, and $190_3$ to dirt particles having a wider range of residency time and particle velocities in the cyclonic flow.

Each of dirt outlets $190_1$, $190_2$, and $190_3$ may be the same or different. Each dirt outlet $190_1$, $190_2$, and $190_3$ may be of any design discussed herein.

Figure 45:
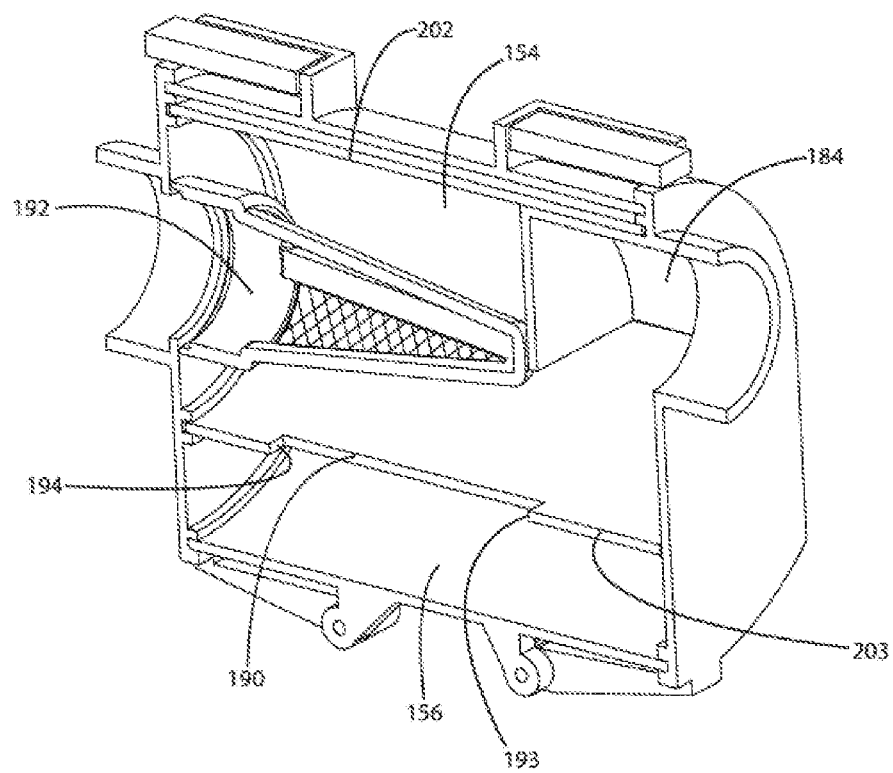
FIG. 45 is a perspective view of an alternate embodiment of the air treatment member of the apparatus of FIG. 28, sectioned along line 29-29 in FIG. 28, in accordance with another embodiment.
Figure 46:
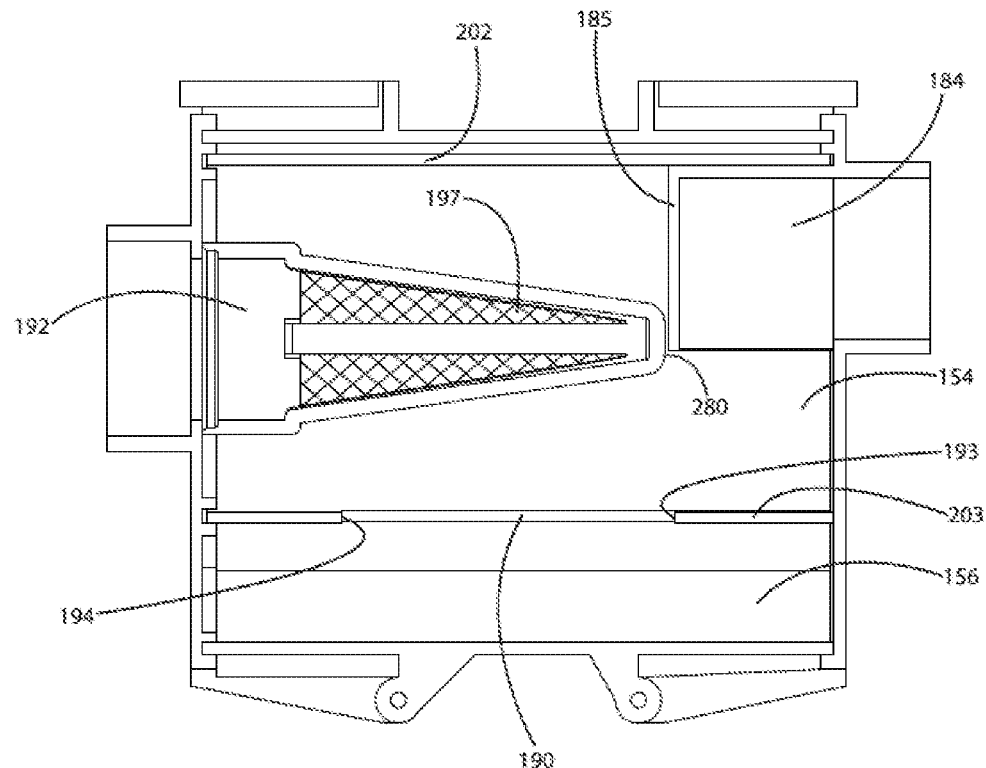
FIG. 46 is a cross-sectional view of the alternate air treatment member of FIG. 45, sectioned along line 29-29 in FIG. 28, in accordance with the embodiment of FIG. 45.
Figure 47:
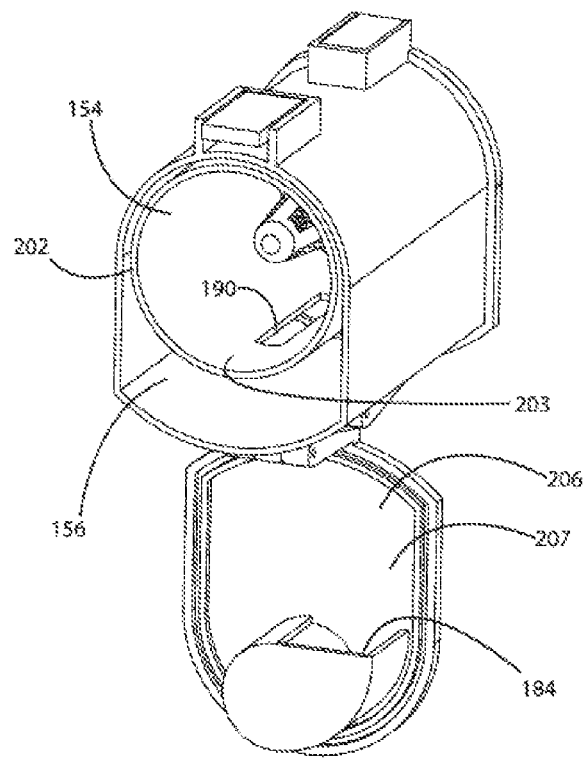
FIG. 47 is a front perspective view of the alternate air treatment member of FIG. 45 with a front wall in an open position, in accordance with the embodiment of FIG. 45.

In the example illustrated in FIGS. 48 and 49, the cyclone 152 omits and insert member 230 and a section 203 of the cyclone chamber sidewall 202 extends to the dirt outlets $190_1$, $190_2$, and $190_3$, similar to the embodiment of FIGS. 45-47, so that the dirt outlets $190_1$, $190_2$, and $190_3$ can be positioned proximate the downstream end of the air inlet 184. Alternately, an insert member may be used to define the extent of the dirt outlets $190_1$, $190_2$, and $190_3$. Alternately, the dirt outlets $190_1$, $190_2$, and $190_3$ may extend to the front end of cyclone 152.

In the example shown in FIGS. 48-49, each dirt outlet $190_1$, $190_2$, and $190_3$ connects the cyclone chamber 154 to a separate dirt collection chamber $156_1$, $156_2$, and $156_3$. This may reduce the amount of the air flow which diverts into each dirt collection chamber 156, which in turn may reduce the re-entrainment of collected dirt that can result from such divergence.

Alternately, the plurality of dirt outlets 190 may be connected to a single dirt collection chamber 156. This may provide an increased dirt collection volume and ensure that the entire dirt collection volume can be used instead of having the empty the dirt collection chambers $156_1$, $156_2$, and $156_3$ when one becomes filled.

Cyclone Air Outlet

Embodiments herein relate to an improved cyclonic air outlet. The features in this section may be used by themselves in any surface cleaning apparatus or in any combination or sub-combination with any other feature or features described herein.

As exemplified in FIG. 2, cyclone chamber outlet passage 192 may have any shape that can provide an outlet passage for air exiting cyclone chamber 154. Cyclone chamber outlet passage 192 may extend longitudinally from a passage second end 276 at cyclone second end 208 towards cyclone first end 206 (e.g. in parallel with cyclone longitudinal axis 204) to a passage first end 280. As shown, cyclone chamber outlet passage 192 may be spaced apart from cyclone sidewall 202 to define a surrounding annular region between cyclone chamber outlet passage 192 and cyclone sidewall 202 that promotes cyclonic air flow through cyclone chamber 154.

In the illustrated embodiment, cyclone chamber outlet passage 192 has a transverse width 288 (e.g. diameter) that is substantially constant (e.g. varies by less than 10%) between passage first end 280 and passage second end 276. Depending on the size and shape of cyclone sidewall 202, this may provide the air flow path through cyclone chamber 154 with a relatively constant cross-sectional area.

In accordance with this feature, as exemplified in FIG. 22, cyclone chamber outlet passage 192 may have a transverse width 288 that increases between passage first end 280 and passage second end 276 towards passage second end 276. In other words, cyclone chamber outlet passage 192 may taper in transverse width 288 towards passage first end 280. Depending on the size and shape of cyclone sidewall 202, this may provide the air flow path through cyclone chamber 154 with a shrinking cross-sectional area as the air flow travels from cyclone air inlet 184 towards cyclone second end 208. As a result of the inverse relationship between cross-sectional area and velocity, the progressive reduction in cross-sectional flow area may increase the flow velocity towards cyclone second end 208. This may mitigate a loss of velocity and cyclonic degradation that may develop towards cyclone second end 208 particularly when operating at low flow rates (e.g. in a lower power mode). Consequently, the tapered cyclone chamber outlet passage 192 may promote greater overall separation efficiency for cyclone 152.

As shown, transverse width 288 may increase continuously between passage first end 280 and passage second end 276. In some embodiments, transverse width 288 may increase by at least 10% (e.g. by 10% to 200%, 25% to 175%, 40% to 125% or 60% to 90%) between passage first end 280 and passage second end 276. In the illustrated embodiment, transverse width 288 increases by about 125% between passage first end 280 and passage second end 276.

As exemplified, passage first end 280 may be solid and may have an axial length that is at least as long as, or longer than, the axial inward extent of the cyclone air inlet. Accordingly, air that enters the cyclone chamber may not directly enter the outlet passage 192, as the first end 280 is solid.

Figure 24:
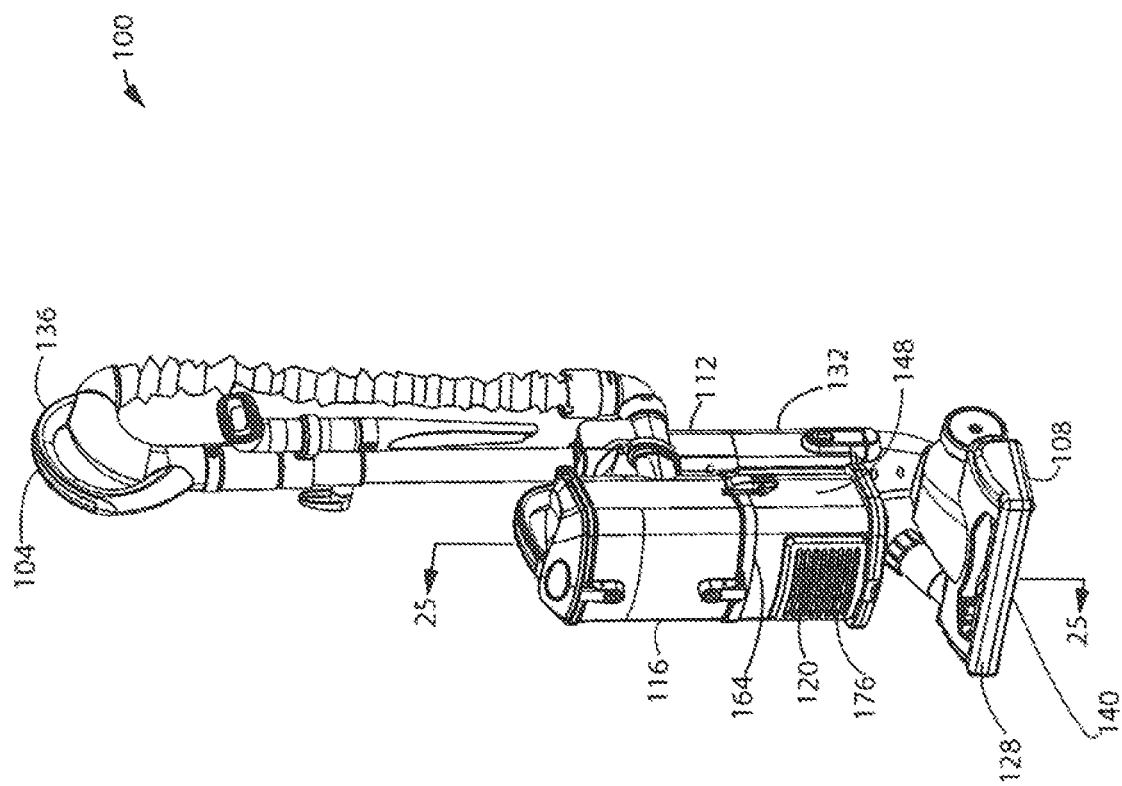
FIG. 24 is a perspective view of an upright surface cleaning apparatus in accordance with an embodiment.
Figure 25:
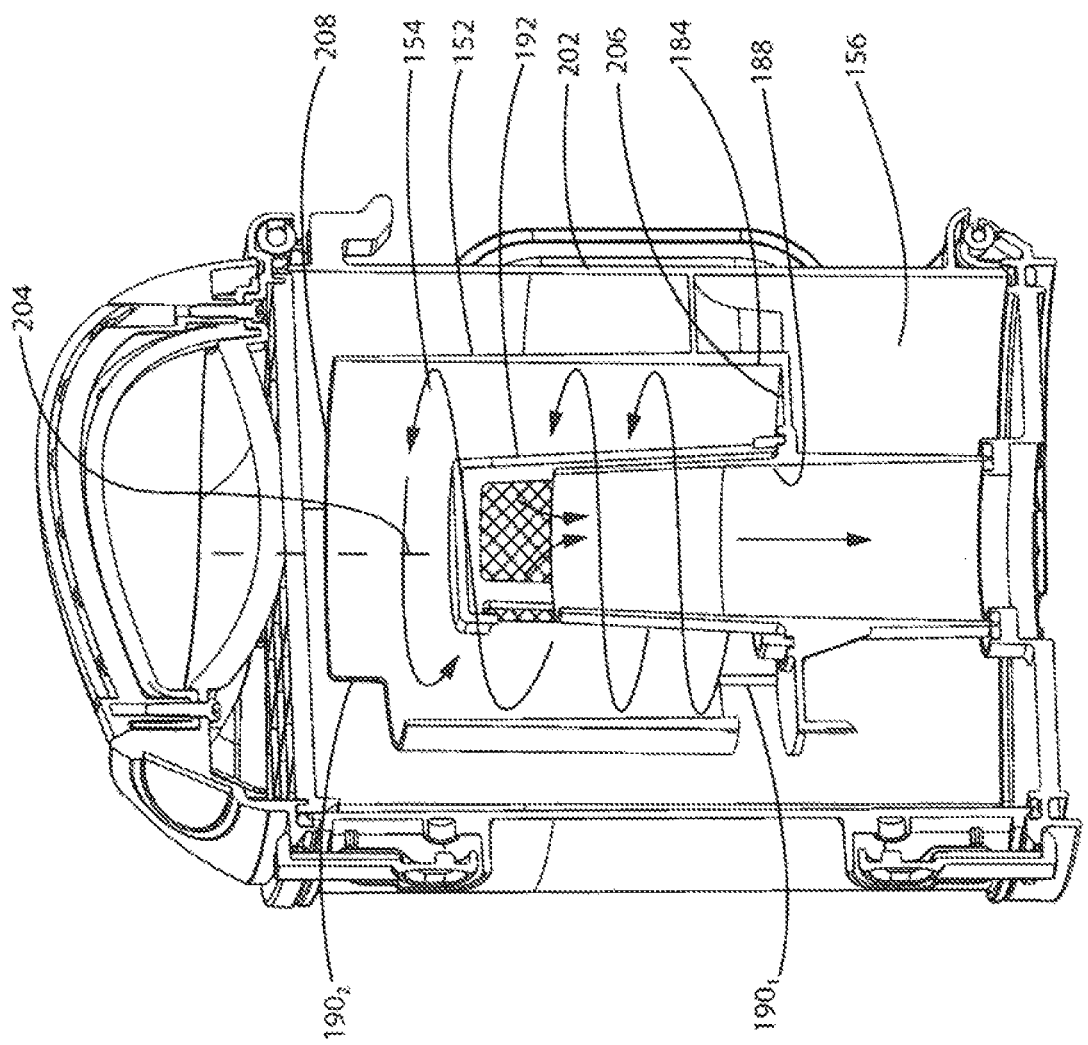
FIG. 25 is a cross-sectional view taken along line 25-25 in FIG. 24, in accordance with another embodiment.

Although many of the figures illustrate concepts and embodiments applied to an exemplary handvac, all of the embodiments described herein apply equally to other surface cleaning apparatus (e.g. upright vacuums, canister vacuums, etc.). Further, although many of the figures illustrate a uniflow cyclone that is horizontally oriented, all embodiments disclosed here are also applicable to other cyclone configurations and orientations. As an example, FIGS. 24-25 show an upright vacuum 100 having a cyclonic air treatment member 116 with an inverted cyclone 152. As shown, cyclone 152 has a central longitudinal axis 204 that is vertically oriented, a plurality of dirt outlet regions 190 (which may have any configuration disclosed in any embodiment herein), a cyclone chamber air outlet passage 192 (which may have any configuration disclosed in any embodiment here), and both the cyclone air inlet 184 and outlet 188 are located at cyclone first end 206.

Figure 26:
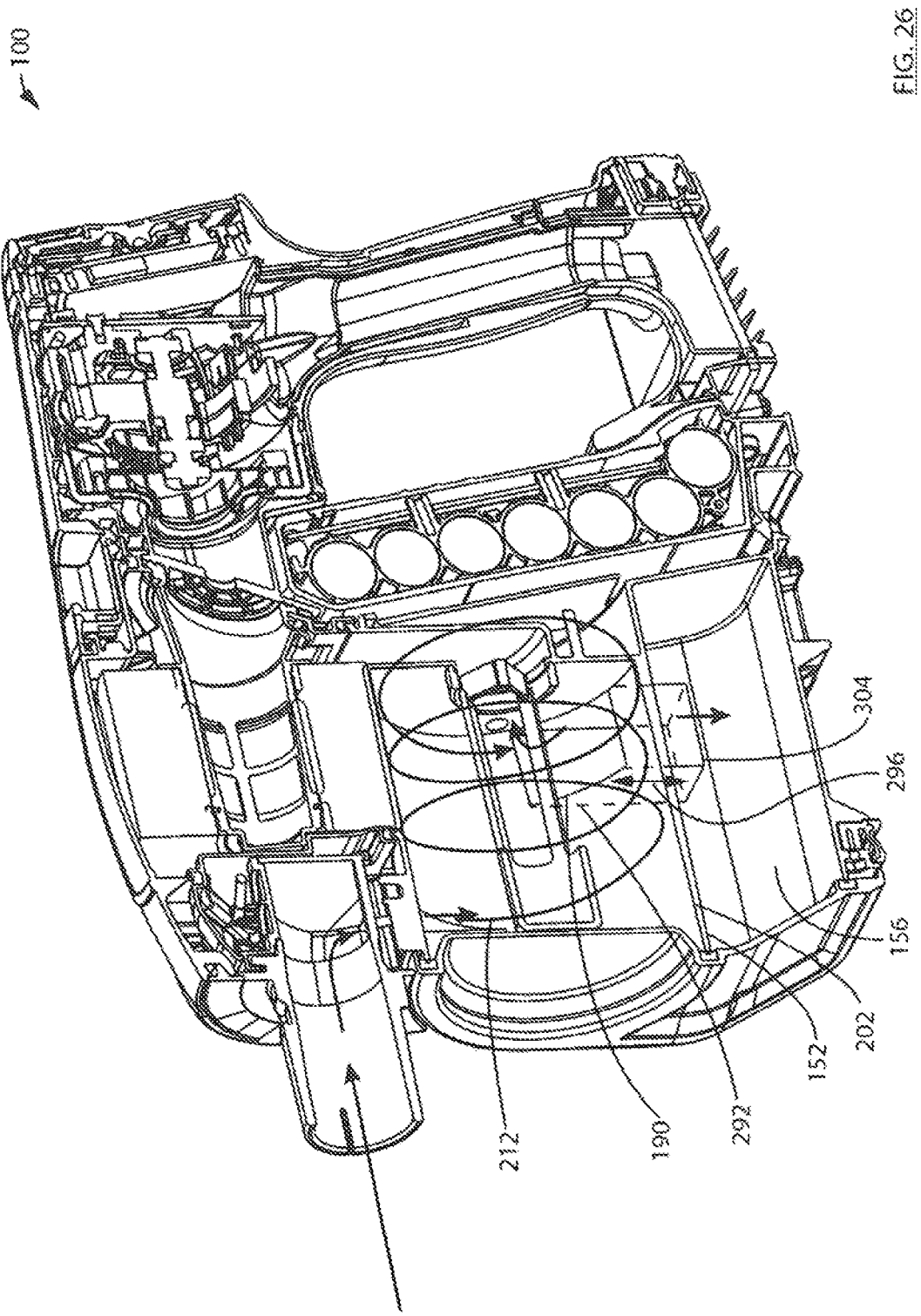
FIG. 26 is a perspective view of the surface cleaning apparatus of claim 1 sectioned along line 2-2, in accordance with another embodiment.
Figure 27:
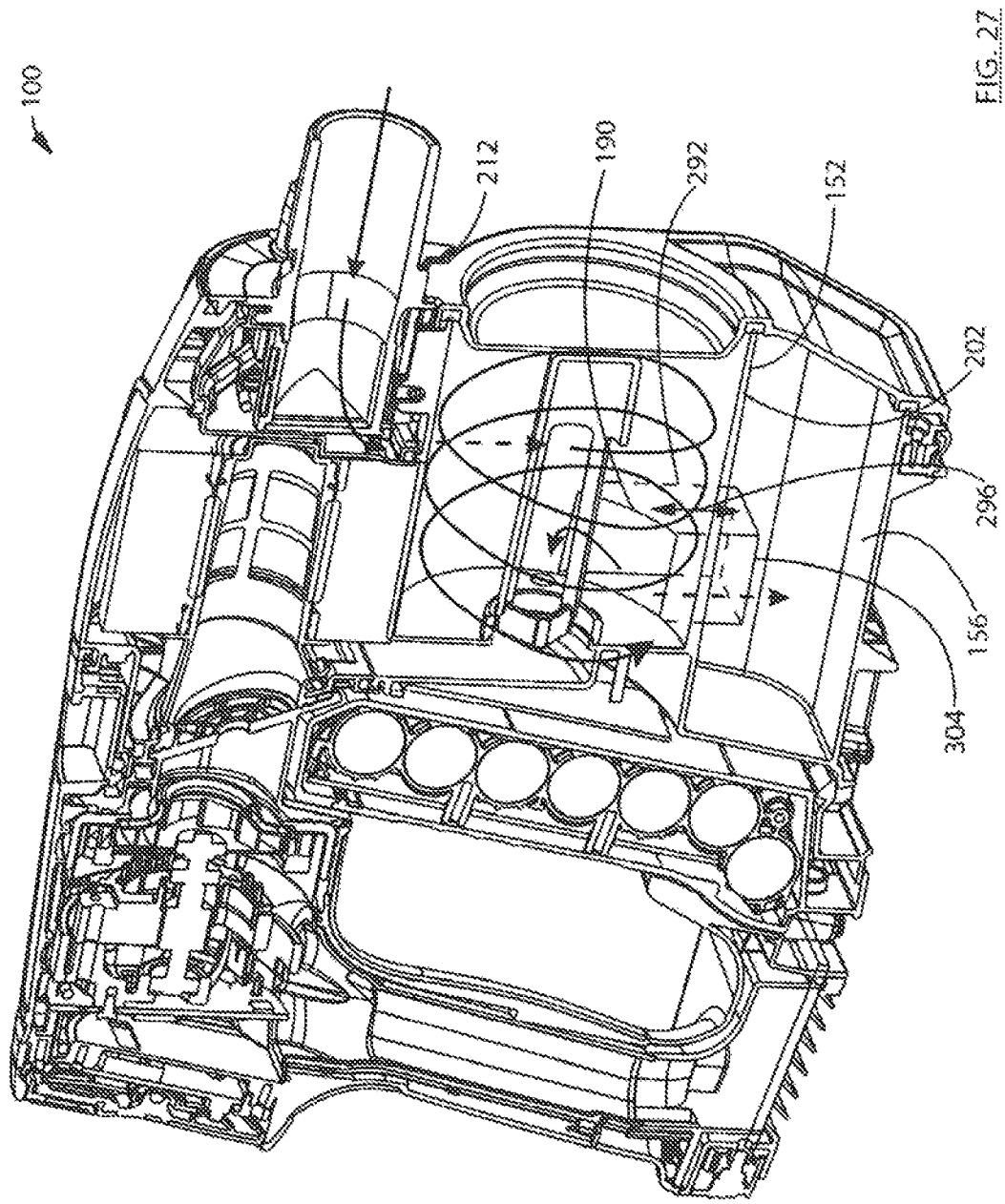
FIG. 27 is a perspective view of the surface cleaning apparatus of claim 1 sectioned along line 27-27, in accordance with another embodiment.

Reference is now made to FIGS. 26-27. In some embodiments, a dirt outlet region 190 may provide an entryway to a dirt outlet passage 292 leading to dirt collection chamber 156. This may be the case for the only dirt outlet region 190 of a cyclone 152 as shown, or for one or more (or all) dirt outlet regions 190 of a cyclone 152 having many dirt outlet regions 190 (e.g. as in any embodiment disclosed herein having two or more dirt outlets 190). An advantage of providing a dirt outlet passage 292 between a dirt outlet region 190 and the dirt collection chamber 156 is that it may reduce the amount of air flow that diverts from the cyclone chamber 154 into the dirt collection chamber 156. Diverted air flow can produce a pressure drop in the air flow through cyclone 152, which may result in less suction and possibly lower dirt separation efficiency all else being equal. By mitigating pressure drops, a smaller, lighter, less expensive suction motor may be used to achieve the same suction, or greater suction may be achieved with the same suction motor. Further, diverted air flow may disturb dirt that has collected in dirt collection chamber 156, which may lead to that dirt re-emerging into the cyclone chamber 154 through the dirt outlet region 190. A dirt outlet passage 292 may help to mitigate dirt collected in dirt collection chamber 156 from returning to cyclone chamber 154.

Dirt outlet passage 292 has a length 296 extending from dirt outlet region 190 to passage outlet 304. Passage outlet 304 may be located inside dirt collection chamber 156 as shown, or may be formed in a sidewall of dirt collection chamber 156 (e.g., the outlet end may be a port provided in a sidewall of the dirt collection chamber 156). Passage outlet 304 may have any passage length 296 suitable for directing dirt exiting from cyclone chamber 154 at a dirt outlet region 190 to dirt collection chamber 156. Preferably, passage length 296 is greater than a thickness of cyclone chamber sidewall 202. For example, passage length 296 may be greater than 5 mm (e.g. between 5 mm and 300 mm, 25-250 mm, 50-200 mm or 75-150 mm). A passage length 296 closer to 5 mm may be appropriate where, for example, cyclone chamber 154 and dirt collection chamber 156 share a common dividing wall 202. A passage length much greater than 5 mm (e.g. 50 mm or more) may be appropriate where, for example, cyclone chamber 154 and dirt collection chamber 156 are spaced apart.

Dirt outlet passage 292 may extend in any direction from dirt outlet region 190 towards dirt collection chamber 156. In some embodiments, dirt outlet passage 292 is oriented tangential to cyclone chamber 154. FIG. 26 shows an example in which dirt outlet passage 292 is oriented tangential cyclone chamber 154 in alignment with the direction of cyclone air flow path 212 where cyclone air flow path 212 crosses dirt outlet region 190. An advantage of this design is that dirt outlet passage 292 may be oriented in the same direction as the direction of dirt particles at dirt outlet 190. This may increase particle separation efficiency by reducing the number of dirt particles which cross over dirt outlet region 190 without exiting cyclone chamber 154. However, such tangential alignment may also lead to a somewhat greater amount of the air flow diverting from cyclone chamber 154 into dirt collection chamber 156. FIG. 27 shows an example in which dirt outlet passage 292 is oriented tangential to cyclone chamber 154 but extending in a direction opposed to the direction of cyclone air flow path 212 where cyclone air flow path 212 crosses dirt outlet 190. An advantage of this design is that it may reduce the amount of air that diverts from cyclone chamber 154 to dirt collection chamber 156, although a somewhat greater number of dirt particles may pass over dirt outlet 190 without exiting.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A vacuum cleaner comprising an air flow path extending from a dirty air inlet to a clean air outlet with a first cyclonic cleaning stage and a suction motor positioned in the air flow path, the first cyclonic cleaning stage comprising a first cyclone chamber and a first dirt collection chamber external to the first cyclone chamber, the first cyclone chamber having a cyclone first end, an opposed cyclone second end, a cyclone sidewall extending between the cyclone first end and the cyclone second end, a cyclone air inlet, a cyclone air outlet provided at the cyclone second end, a cyclone dirt outlet in communication with the first dirt collection chamber and a cyclone longitudinal axis extending from the cyclone first end to the cyclone second end, wherein the dirt outlet comprises a plurality of apertures, wherein the cyclone air outlet extends inwardly a first distance from the cyclone second end towards the cyclone first end, and wherein the cyclone sidewall extends angularly 360° around the cyclone longitudinal axis and a portion of the cyclone sidewall having the plurality of apertures extends angularly only part way around the cyclone longitudinal axis and wherein the portion of the sidewall extends inwardly into the cyclone chamber a distance that is up to about the first distance.

2. The vacuum cleaner of claim 1 wherein the plurality of apertures comprises more than 10 apertures.

3. The vacuum cleaner of claim 1 wherein the plurality of apertures comprises more than 20 apertures.

4. The vacuum cleaner of claim 2 wherein the apertures have a width of 0.10 inches to 0.20 inches.

5. The vacuum cleaner of claim 2 wherein the apertures have a width of 0.010 inches to 0.10 inches.

6. The vacuum cleaner of claim 1 wherein the apertures are provided at a cyclone air outlet end of the first cyclone chamber.

7. The vacuum cleaner of claim 6 wherein the cyclone air outlet end is the cyclone second end and the cyclone air inlet is provided at the cyclone first end.

8. The vacuum cleaner of claim 1 wherein the vacuum cleaner is a hand vacuum cleaner having an upper end and a lower end, the upper end has the dirty air inlet and, when the hand vacuum cleaner is oriented with the upper end above the lower end, the apertures are provided in a lower portion of the cyclone sidewall.

9. The surf vacuum cleaner ace cleaning apparatus of claim 8 wherein the cyclonic cleaning stage comprises a stationary portion and an openable portion, the openable portion is part of the lower end of the hand vacuum cleaner and comprises a portion of the cyclone sidewall and the openable portion is moveably mounted by a mount between a closed position in which the first cyclone chamber and the first dirt collection chamber are closed and an open position in which the first cyclone chamber and the first dirt collection chamber are open and the apertures are provided in the openable portion.

10. The vacuum cleaner of claim 8 wherein, when the hand vacuum cleaner is oriented with the upper end above the lower end, the first dirt collection chamber underlies the first cyclone chamber.

11. The vacuum cleaner of claim 1 wherein the first cyclone chamber has a first lateral side that extends radially outwardly from the cyclone longitudinal axis in a first direction and a second lateral side that extends radially outwardly from the cyclone longitudinal axis in a second direction that is opposed to the first direction and the apertures are provided only on the first lateral side of the first cyclone chamber.

12. The vacuum cleaner of claim 1 further comprising a second cyclonic cleaning stage downstream from the first cyclonic cleaning stage, the second cyclonic cleaning stage having a dirt collection region wherein, when the hand vacuum cleaner is oriented with the upper end above the lower end, the first dirt collection chamber and the dirt collection region each underlie the first cyclone chamber.

13. The vacuum cleaner of claim 12 wherein the second cyclonic cleaning stage comprises a second cyclone chamber and a second dirt collection chamber external to the second cyclone chamber and the second dirt collection chamber comprises the dirt collection region.

14. The vacuum cleaner of claim 13 wherein the first cyclone chamber has a first lateral side that extends radially outwardly from the cyclone longitudinal axis in a first direction and a second lateral side that extends radially outwardly from the cyclone longitudinal axis in a second direction that is opposed to the first direction and the apertures are provided only on the first lateral side of the first cyclone chamber, the first dirt collection chamber is located on the first lateral side and the dirt collection region is located on the second lateral side.

15. A vacuum cleaner comprising:
  (a) a front end having a dirty air inlet, a rear end, and first and second laterally opposed sides, each laterally opposed side extends in a forward/rearward direction;
  (b) an air flow path extending from a dirty air inlet provided at the front end to a clean air outlet with a suction motor positioned in the air flow path;
  (c) a first air treatment stage positioned in the air flow path downstream from the dirty air inlet, the first air treatment stage comprising a first air treatment chamber and a first dirt collection chamber external to the first air treatment chamber; and,
  (d) a second air treatment stage positioned in the air flow path downstream from the first air treatment stage and rearward of the first air treatment chamber, the second air treatment stage comprising a second air treatment chamber and a second dirt collection chamber external to the second air treatment chamber,
  wherein the first dirt collection chamber is provided on the first lateral side and underlies the first air treatment chamber and the second dirt collection chamber is provided on the second lateral side and underlies the first air treatment chamber, and
wherein the first dirt collection chamber and the second dirt collection chamber are emptyable concurrently.

16. The vacuum cleaner of claim 15 wherein the first air treatment chamber has a dirt outlet in communication with the first dirt collection chamber and the dirt outlet comprises a plurality of apertures.

17. The vacuum cleaner of claim 16 wherein the plurality of apertures comprises more than 10 apertures.

18. The vacuum cleaner of claim 16 wherein the plurality of apertures comprises more than 20 apertures.

19. The vacuum cleaner of claim 17 wherein the apertures have a width of 0.10 inches to 0.20 inches.

20. The vacuum cleaner of claim 17 wherein the apertures have a width of 0.010 inches to 0.10 inches.

* * * * *